US 6,587,127 B1

(12) United States Patent
Leeke et al.

(10) Patent No.: US 6,587,127 B1
(45) Date of Patent: *Jul. 1, 2003

(54) CONTENT PLAYER METHOD AND SERVER WITH USER PROFILE

(75) Inventors: Steven D. Leeke, Rolling Meadows, IL (US); Gregory B. Mackintosh, Naperville, IL (US); Edward Stojakovic, Chicago, IL (US)

(73) Assignee: Motorola, Inc., Schaumburg, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/198,732

(22) Filed: Nov. 24, 1998

(Under 37 CFR 1.47)

Related U.S. Application Data

(63) Continuation-in-part of application No. 08/976,971, filed on Nov. 25, 1997, now abandoned.

(51) Int. Cl.[7] .................................................. G06F 3/00
(52) U.S. Cl. ........................ 345/765; 345/733; 345/747; 345/764
(58) Field of Search ................................. 345/700, 716, 345/733, 742, 744, 745, 747, 762, 764, 765, 866, 961, 962, 978; 707/500.1

(56) References Cited

U.S. PATENT DOCUMENTS

| 5,583,561 | A | * | 12/1996 | Baker et al. ................... 725/93 |
| 5,699,089 | A | * | 12/1997 | Murray ........................ 345/823 |
| 5,710,884 | A | * | 1/1998 | Dedrick ................... 345/866 X |
| 5,721,827 | A | * | 2/1998 | Logan et al. ................ 709/217 |
| 5,822,537 | A | * | 10/1998 | Katseff et al. .............. 709/231 |
| 6,005,561 | A | * | 12/1999 | Hawkins et al. ......... 707/500.1 |
| 6,018,768 | A | * | 1/2000 | Ullman et al. .............. 709/218 |

* cited by examiner

Primary Examiner—John Cabeca
Assistant Examiner—X. L. Bautista
(74) Attorney, Agent, or Firm—James E. Gauger; Hisashi D. Watanabe

(57) ABSTRACT

A method of operation of a server (102) interacting with users (104, 106) to provide personalized content to each of the users. Personalized content is sent to a first user by communicating first audio or other content associated with a broadcast to a first user location. Second content is selected and a first signal is communicated to the first user location dependent on the user profile. The second content can include second audio content selected in dependence upon the first user profile, in which case playback of the second audio content is synchronized with respect to playback of the first audio content.

20 Claims, 33 Drawing Sheets

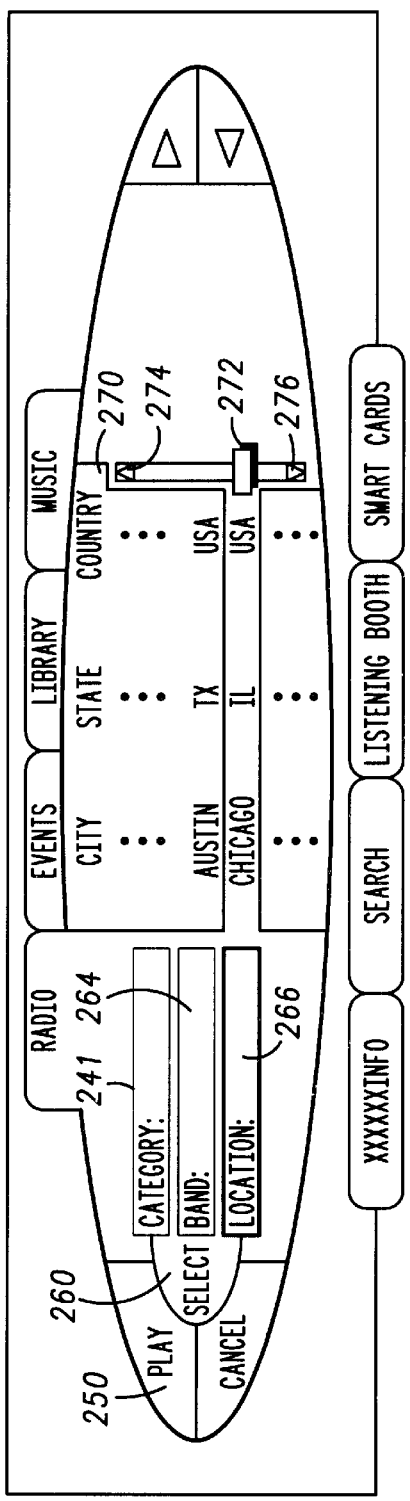
FIG. 3
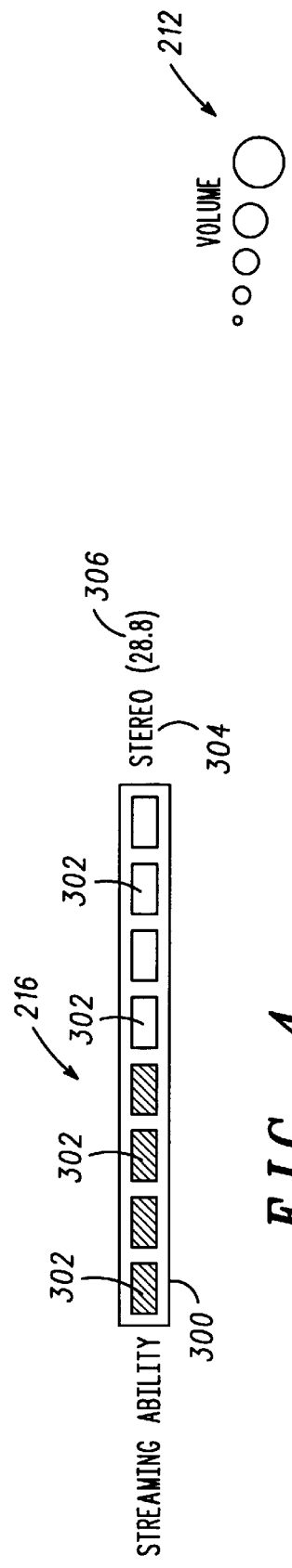
FIG. 4
FIG. 5

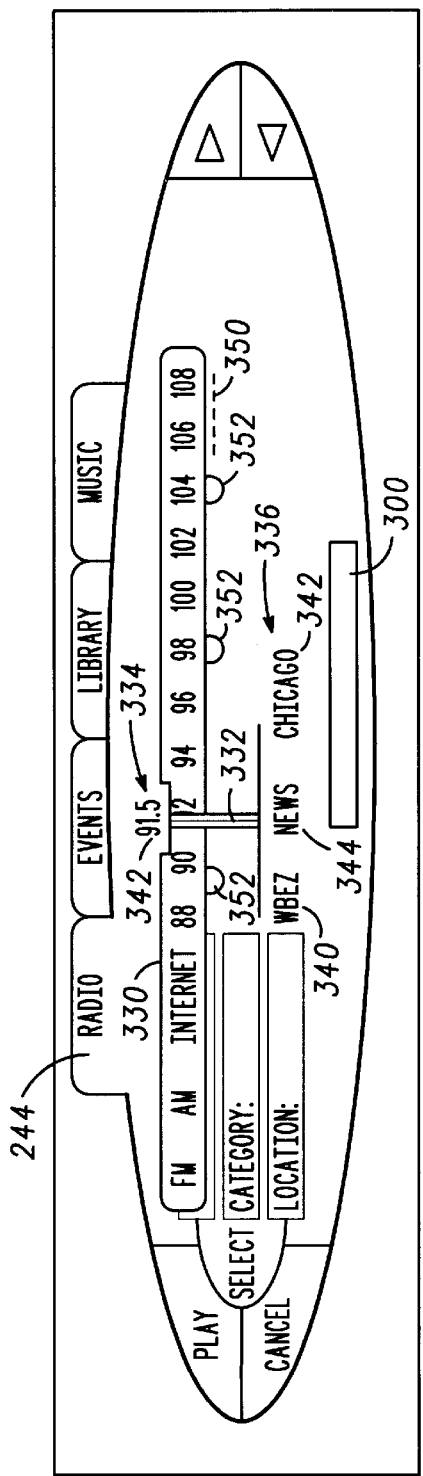

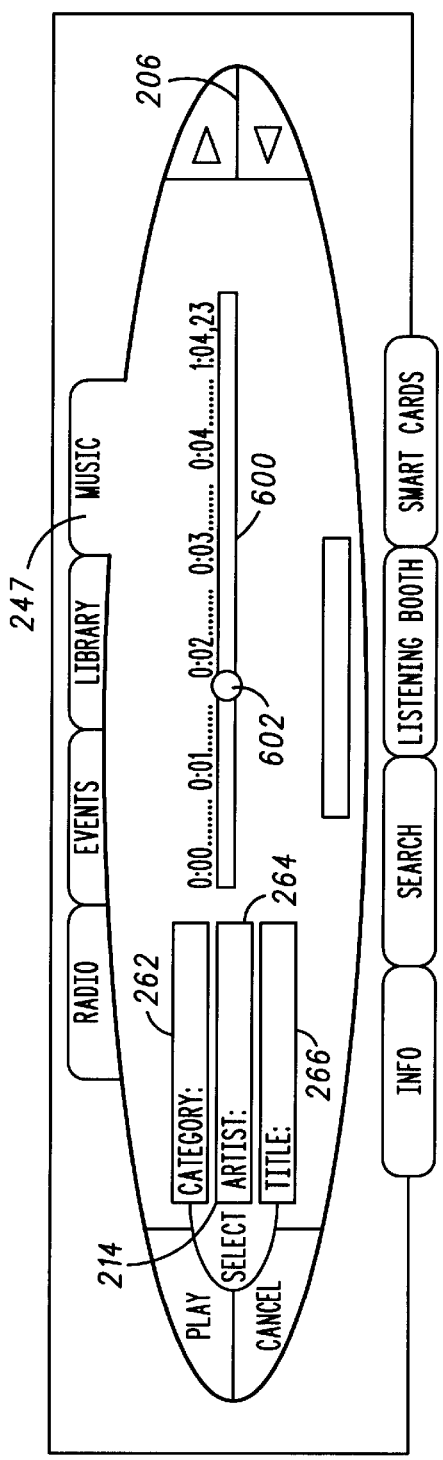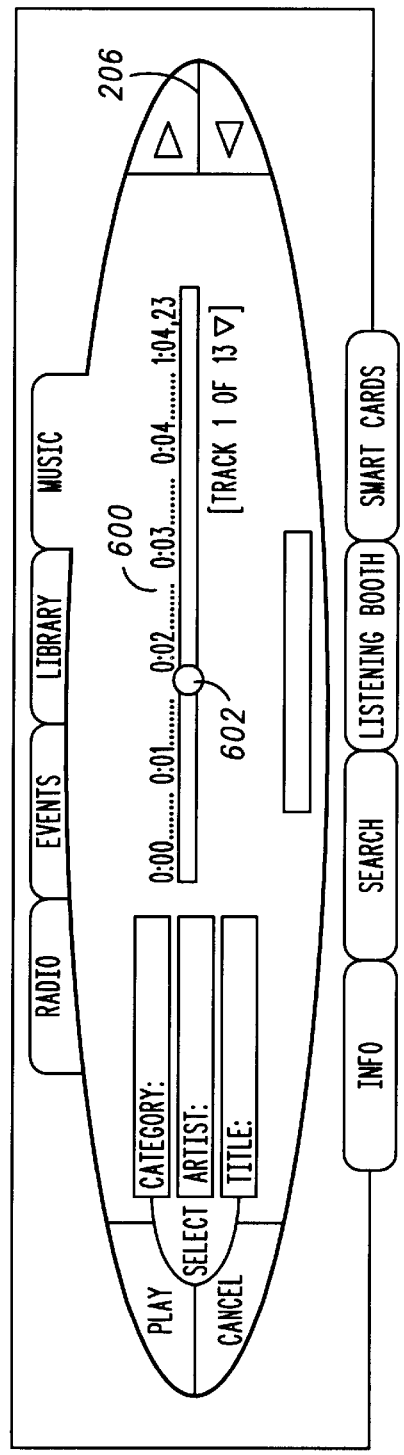

CONTENT PLAYER METHOD AND SERVER WITH USER PROFILE

RELATED APPLICATION(S)

This is a continuation-in-part of U.S. patent application Ser. No. 08/976,971 filed on Nov. 25, 1997, now abandoned.

TECHNICAL FIELD

The present invention relates to methods and systems for distributing and playing content such as audio content.

BACKGROUND OF THE INVENTION

An increasing number of audio content items are becoming accessible via the Internet. Many radio stations now simulcast their over-the-air broadcast via the Internet. Some television networks are also simulcasting their over-the-air or cable broadcasts via the Internet. In addition, archived items such as archived radio programs, speeches, and music are also available via the Internet.

An audio content item is communicated to an end user's computer using either streamed data or a data file. The end user's computer decodes the streamed data or the data file using audio player software. Examples of audio player software include RealPlayer from Real Networks and Netscape Media Player from Netscape. The audio player software directs the computer to play back the audio content item.

Services such as AudioNet (whose Internet domain name is registered to AudioNet, Inc. of Santa Clara, Calif., U.S.A., and administered by Yahoo! Inc. of Sunnyvale, Calif., U.S.A.) and Timecast (whose Internet domain name is registered to Progressive Networks, Inc. of Seattle, Wash., U.S.A.) provide directories for audio content items available via the Internet. Using these services, the end user can select an audio content item for playback using his/her computer. However, interaction between the audio player software and the service may be limited to that necessary to play back the audio content item.

User feedback to movies and music is also currently of interest. Movie Critic (whose Internet domain name is registered to Songline Studios, Macromedia, Inc., of San Francisco, Calif., U.S.A.) recommends movies of potential interest to an end user in return for the end user's rating of a movie he/she has seen. Billboard magazine and its associated Web site provide music rankings based on sales and air play.

Broadcast Architecture provides a service for testing audio playlists. A methodology employed by Broadcast Architecture comprises physically assembling one or more listeners to test a playlist, playing one or more songs to the listeners, and receiving rating signals from the listeners. The rating signals are generated by listeners turning up or down a dial depending on whether they like or dislike a song. The rating signals can be plotted in a time series to interpret the results.

BRIEF DESCRIPTION OF THE DRAWINGS

The invention is pointed out with particularity in the appended claims. However, other features of the invention are described in the following detailed description in conjunction with the accompanying drawings in which:

FIG. 3 is a display of a portion of the graphical user interface including selection attribute indicators;

FIG. 4 is an illustration of an embodiment of a streaming indicator;

FIG. 5 is an illustration of an embodiment of volume controls;

FIG. 6 is an illustration of an example of a portion of a display window upon receiving a user-initiated selection of a radio category control;

FIG. 7 is an illustration of an example of a graphical radio dial for selecting Internet or other electronic network broadcasts;

FIG. 20 is an illustration of an example of a portion of the interface displayed upon receiving a user-initiated selection of a music category control;

FIG. 21 shows an indicator of which track is current and the number of tracks that exist;

DETAILED DESCRIPTION OF PREFERRED EMBODIMENTS

Figure 1:
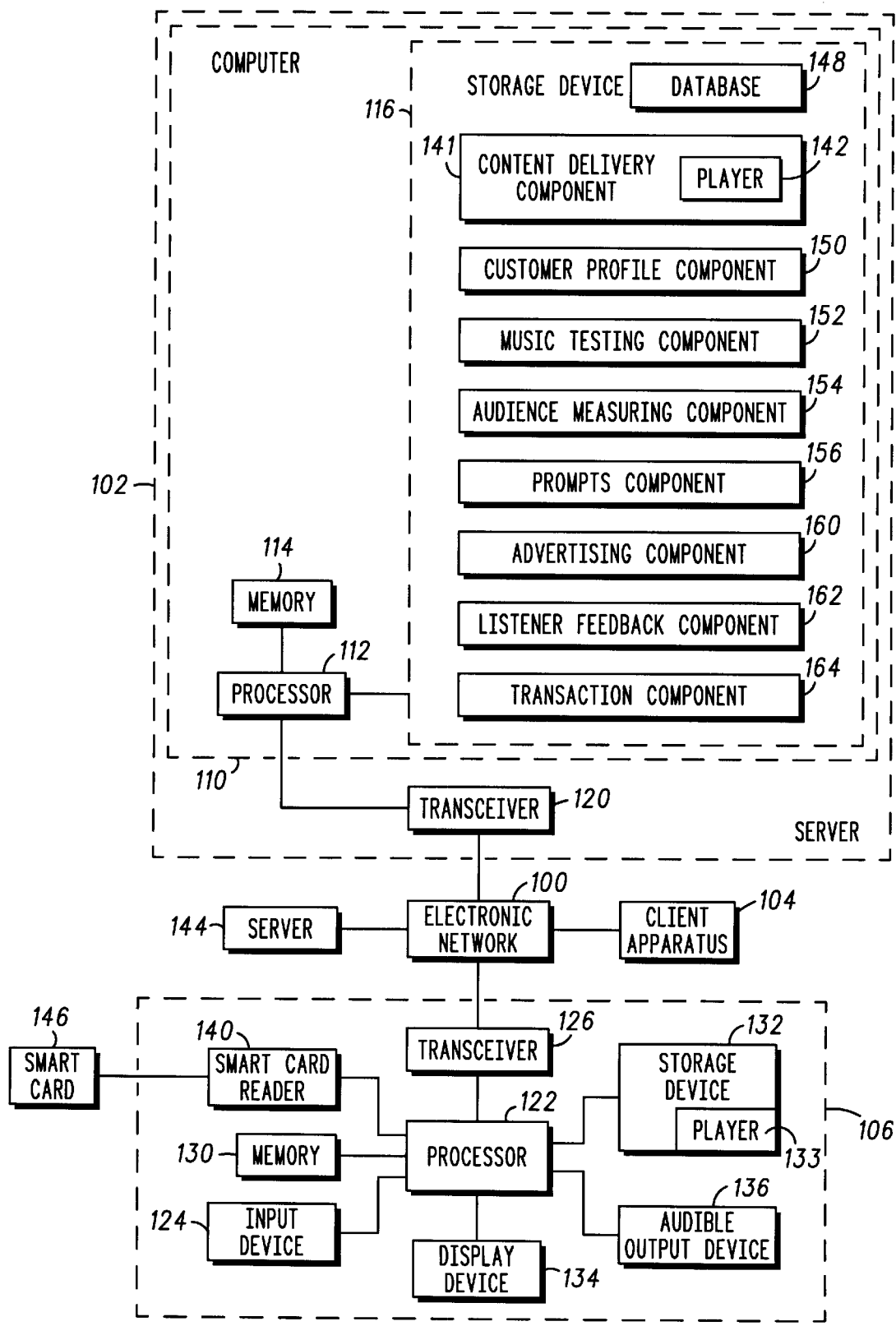
FIG. 1 is a block diagram of an embodiment of a system for providing audio content via an electronic network.

FIG. 1 is a block diagram of an embodiment of a system for providing audio content via an electronic network 100. Preferably, the electronic network 100 includes the Internet, the World Wide Web, an intranet, an extranet, or an on-line service such as America Online or WebTV.

The system comprises a server 102 which communicates with a plurality of client apparatus 104 including a client apparatus 106 via the electronic network 100. The server 102 includes a computer 110 having a processor 112, a memory 114, and a storage device 116. The server 102 has a transceiver 120 such as a modem, a network adapter, or a wireless transceiver which interfaces with the electronic network 100.

The client apparatus 106 can have a variety of forms, including but not limited to, a general purpose computer, a network computer, a network television, an Internet television, and a wireless device. Regardless of its form, the client apparatus 106 typically includes a processor 122 in communication with at least one input device 124, a transceiver 126, a memory 130, at least one storage device 132, a display device 134, and an audible output device 136. Optionally, the client apparatus 106 includes a smart card reader 140.

The processor 122 can include a microprocessor, an application-specific integrated circuit, or another suitable integrated circuit. The memory 130 can include a read-only memory and/or a random access memory in communication with the processor 122. The transceiver 126 can include a modem, a network adapter, or a wireless transceiver to communicate signals via the electronic network 100. The at least one input device 124 can include a keyboard, a pointing device, and/or a touch screen for receiving user-initiated events, actions, and selections from an end user. The at least one storage device 132 can include a floppy disk drive, a PC card storage device, an optical drive, a Digital Video Disk (DVD) drive, a Compact Disk Read Only Memory (CD-ROM) drive, or a hard drive to store computer-readable data. The display device 134 can include a monitor such as a liquid crystal display or a cathode ray tube to display a graphical user interface. The audible output device 136 can include a sound card and/or one or more speakers to play audio content to the end user.

A content delivery component 141, including a player 142, resides on the server 102 to assist in selecting, retrieving, and playing the audio content. The player 142 includes a computer program or other form of software or firmware which directs the server 102 and the client apparatus 106 to provide a graphical user interface for selecting, retrieving, and playing back audio content. More particularly, the computer program is operative to process and respond to user-initiated events, actions, and selections made using the at least one input device 124, to select, retrieve, and playback the audio content using the audio output device 136. Preferably, the computer program includes one or more of Hyper Text Marking Language (HTML) code, an applet (e.g. a JAVA applet), and animation plug-in code (e.g. Shockwave code) to provide the graphical user interface. The player 142 is accessible via the electronic network 100 by a dedicated electronic address such as a URL (Uniform Resource Locator).

The player 142 accesses audio content either locally from the server 102 or remotely from a server 144, and communicates the audio content to the client apparatus 106 using streaming technology. The server 144 can include, for example, a server from which AudioNet content is accessible.

The player 142 is operable in two modes: a browse mode and a search mode. The search mode provides a user-invoked function for performing a key-word, text-based search for content. The browse mode supports a categorical search for content using a visual interface. The content is categorized into a plurality of categories of content to assist in browsing for content. Preferably, the categories include a radio category, an events category, a library category, and a music category.

The player 142 is responsive to either a smart card 146 or a virtual smart card stored at one or more of the client apparatus 106 and the server 102. The actual or virtual smart card can be used to separate access to content from the content itself. Further, the actual or physical smart card can act as a preference key to uniquely personalize a player for an individual in a consistent manner across all entry points or platforms. For a virtual smart card in this case, the client side provides a key to the server side of the preferences.

Optionally, the player 142 can provide a second visual interface having a smaller window that appears in the background. The smaller window provides a subset of the controls of the full graphical user interface. The subset of controls can include controls for selecting between programmed presets. For example, the smaller window can illustrate the presets.

The player 142 can cooperate with a browser program and/or a streaming audio plug-in program executed by the client apparatus 106. Examples of the browser program include, but are not limited to, Netscape Navigator and Microsoft Internet Explorer. Examples of the streaming audio plug-in program include, but are not limited to: RealAudio and RealPlayer from Real Networks, VxTreme and Netshow from Microsoft Corporation, VDOnet from VDO, TrueStream from Motorola, LiquidAudio, and other active streaming formats. Alternatively, the player 142 can include a stand-alone, application-based software program that is executed by the client apparatus 106. In this case, it is preferred that the software program be operable without requiring interaction with a browser program. The software program cooperates with a network access routine executed by the client apparatus 106.

It is noted that in general, the system can include a plurality of servers such as the server 102. Each of the servers is identified by a corresponding site identification code. Each of the servers can include a database 148 for managing and monitoring the operation of the system. In this case, each database 148 can include a set of global parameters stored in its storage device 116. One global parameter includes a listening time threshold parameter. If an end user listens to an audio item for a duration that attains or exceeds the listening time threshold, a listenership entry is recorded in the database 148; otherwise, no entry is recorded. Other global parameters include user permission parameters, and parameters for system level performance reports.

In general, some parameters are maintained for all of the databases. These parameters include those necessary to the operation and the performance of the system. Here, a parameter generated at one database site can be communicated to each of the other database sites. Each parameter change is entered with time and date stamps to reference its value at a specified time and date. This information can be of use in generating system reports.

To provide additional features, the server 102 includes a customer profile component 150, a music testing component 152, an audience measuring component 154, a promotions component 156, an advertising component 160, a listener feedback component 162, and a transactions component 164. Each of these components includes a computer program module or other form of software or firmware to direct the server 102 to provide its associated feature.

The customer profile component 150 stores and manages a table of end user data. The end user data includes a record comprising one or more of a name, an address, a login, an electronic mail address, preferences, and demographics for each end user. Examples of end users include listeners and other consumers, broadcasters, and promoters (e.g. record labels). Optionally, the customer profile component 150 purges a record after a predetermined period of inactivity of its associated end user.

Each record in the table has a unique identification code, herein referred to as CustomerID, to identify its associated end user. The customer profile component 150 performs a check to ensure that only one CustomerID is created for each user. The CustomerID is used throughout the system to identify a particular end user. Each end user enters his/her unique login to access his/her preferences when using the player 142.

Several levels of customer profiles can exist. In a guest level, a generic CustomerID is created without requesting profile information. A message allowing a user to create a profile is presented whenever a customizing feature or a music testing capability is used. Listener feedback and advertising information is tracked for guests who do not create a profile. All such responses for guests are grouped together.

In a basic customer level, a CustomerID is created to provide the preferences capabilities of the system using a basic profile. A unique login name and password is included in the end user record. The login name and password is entered by the end user to access his/her profile. Specific demographic information may be requested from the end user before gaining basic customer status.

In a preferred customer level, a CustomerID is created with a more detailed profile than the basic customer level. In addition to the profile information in the basic customer level, the preferred customer level can require that an address of the end user be maintained in the end user record. In return, the end user is provided with exclusive features such as being enabled for promotions described herein.

The customer profile component 150 is provided to allow preferences to be available regardless of where the end user is accessing the system. For example, the end user can access the player 142 at either the client apparatus 106 or a client apparatus 104 using his/her preferences in the customer profile component 150.

The music testing component 152 provides a user interface (also referred to herein as a listening booth or a rating room feature) for a music testing service. The music testing service allows record labels and other promoters to test new music releases. The music testing component 152 manages the mechanics of the testing.

The audience measuring component 154 monitors and records data associated with a listening behavior of each end user when using the player 142. Based upon the data, one or more audience measurement reports are generated. The audience measurement reports may be of particular interest to music directors of radio stations. The audience measuring component 154 can provide a "Arbitron-like" rating system for radio on the Internet that is familiar to terrestrial radio broadcasters.

The promotions component 156 tracks the performance of promotions offered to elicit responses using the music testing component 152. The promotions component 156 further manages the administration of the music testing component 152 in providing a delivery vehicle for promotional items such as rated albums.

The advertising component 160 manages audible and visible advertisements presented by the player 142. The audible advertisements can be inserted into the audio stream to replace audible advertisements played by a broadcaster (e.g. a radio station). The visible advertisements can be displayed in any of several areas of the display device 134.

The listener feedback component 162 receives and manages feedback messages from end users. The feedback messages can pertain to the system for providing audio content, the broadcasters (e.g. radio stations), the content (e.g. events), or advertising. Preferably, the feedback messages are entered using the player 142. The listener feedback component 162 identifies the content and/or the broadcaster presented to the end user at the time his/her feedback message was generated. Using this information, a suitable destination for routing the feedback message is determined. The listener feedback component 162 can include an electronic mail server to route the feedback messages. The listener feedback component 162 can further generate reports based upon the feedback.

The transactions component 164 is used to process transactions performed by end users and clients. Examples of transactions include end users purchasing content, and clients purchasing on-line reports. The transactions component 164 includes a database to record the transactions, and to process credit card information.

Figure 2:
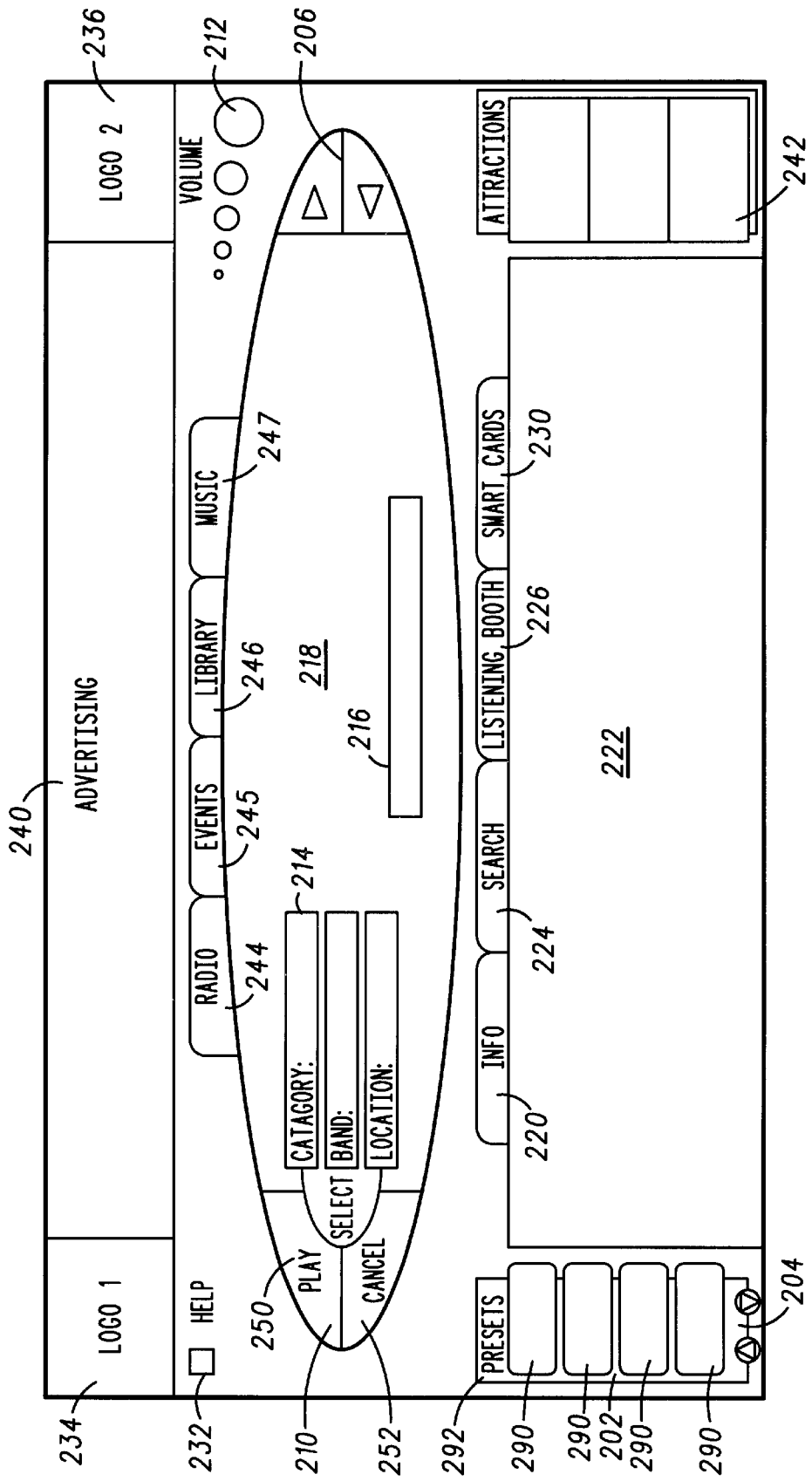
FIG. 2 is a first display window in an embodiment of a graphical user interface.

FIG. 2 is a first display window in an embodiment of the graphical user interface. As with the other herein-described display screens, display windows, and display regions, the first display window is displayed by the display device 134. The first display window provides a primary browsing window to offer basic features including basic content selection control and playback control to the end user.

The first display window includes categorical selection controls 200, preset selection indicators 202, preset selection controls 204, advance/review controls 206, playback controls 210, volume controls 212, selection attribute indicators 214, a streaming indicator 216, a first display region 218, an information control 220, a second display region 222, a search control 224, a user feedback control 226, a smart card control 230, a help mode control 232, a first logo 234, a second logo 236, an advertising window 240, and an attractions window 242.

Preferably, each of the aforementioned controls includes a hot spot region or a graphical button designated for receiving user-initiated selections and actions from the at least one input device 124. Examples of user-initiated actions include, but are not limited to, point-and-click operations with a pointing device such as a mouse, a trackball, or a touchpad, and touch actions using a touchscreen or a keyboard.

The categorical selection controls 200 are designated to receive user-initiated actions to choose a content category within which audio content can be selected. The categorical selection controls 200 include a radio category control 244, an events category control 245, a library category control 246, and a music category control 247. Each of the categorical selection controls 200 is displayed as a graphical tab.

The radio category includes content available from over-the-air broadcasts (including but not limited to AM and FM broadcasts) and Internet broadcast material encoded and distributed through the electronic network 100. The events category includes content from special occurrences, conventions, announcements, news, and sports events, for example, distributed by a scheduler or an event manager. The events category includes scheduled broadcasts of either live or archived material that is made available over the electronic network 100 at a scheduled time. The library category includes content from stored audio of books, archived speeches, spoken audio, and other content that appears without reference to a particular broadcast. The music category includes collections of music such as albums and other audio releases.

The radio category and the events category include content associated with a particular time, such as a live broadcast. The library category and the music category include content generally unreferenced to a particular time.

If, while material is active in a first content category, the end user proceeds to a second content category, the tab associated with the first content category is displayed with blinking text. In this case, the end user can proceed to the second content category using a point-and-click operation with the tab associated with the second content category or by use of the smart card. For example, if the radio category is active when the end user selects the music category tab, the radio category tab blinks until the end user returns to the radio category or until new material is streamed. When new material is chosen, the tab returns to its idle state.

To easily identify the active function, each of the four content categories are color coded. Preferably, the CMYK values of each content category is as follows: radio 0-49-96-0, events 23-96-100-9, library 79-7-100-0, and music 88-80-0-0.

If there is no selection of a content category, the text "INFO" is displayed in the information control 220. In this case, the text "INFO" is displayed in a color such as grey rather than a second color such as black when a content category is selected. Alternatively, the information control 220 can be selected to display a guide on how to make a selection in the current mode.

The playback controls 210 includes a play button 250 and a cancel button 252. The play button 250 is designated to receive a user-initiated action to initiate a playback of an audio selection. Text within the play button 250 is redisplayed in a reverse color upon receiving the user-initiated action. The reverse color indicates to the end user that the action has been received.

The default for the play button 250 is to automatically play titles and stations whenever available. If a title or a station cannot be played with chosen attributes, at least a portion of the play button 250 including the text "PLAY" is displayed in a first color such as grey. If a title or a station can be played with chosen attributes, the portion of the play button 250 including the text "PLAY" is redisplayed in a second color such as black. If an event has not yet occurred, the play button 250 displays the word "SCHEDULE".

During playback, the play button 250 is designated to receive a user-initiated action to pause the playback of the audio selection. Once paused, the play button 250 can receive a subsequent user-initiated action to continue the playback.

The cancel button 252 is designated to receive a user-initiated action to cancel an activity of the player. For example, when selecting items using a selection table (which is subsequently described in detail), the cancel button 252 can be selected to exit from the selection table. As another example, when playing an audio selection, the cancel button 252 can be selected to stop the playback of the audio selection and to reset the player to keep the audio selection chosen.

The advertising window 240 provides advertising images. The advertising window 240 can further provide backward and forward navigation of advertisements.

FIG. 3 is a display of a portion of the graphical user interface including the selection attribute indicators 214. The selection attribute indicators 214 include a select button 260 and three attribute fields 262, 264, and 266. The select button 260 is designated to receive user-initiated actions to alternate between the three attribute fields 262, 264, and 266.

For radio content, the three attribute fields 262, 264, and 266 include a category attribute field, a band attribute field, and a location attribute field. For events, the three attribute fields 262, 264, and 266 include a category attribute field, a time attribute field, and an event attribute field. For library content, the three attribute fields 262, 264, and 266 include a category attribute field, an author attribute field, a title attribute field. For music content, the three attribute fields 262, 264, and 266 include a category attribute field, an artist attribute field, and a title attribute field.

A selection of the select button 260 directs the next attribute field to be displayed along with its associated options. For example, clicking the select button 260 while the band attribute field 264 is active causes the location attribute field 266 to become active, as illustrated.

A list of options 270 associated with an active attribute is displayed next to the three attribute fields 262, 264, and 266. The end user can scroll through the list using a scroll bar 272, an up scroll control 274, and/or a down scroll control 276. The end user can also navigate to an option by entering either a letter or a number of an item in the list of options 270.

When an intended option is highlighted (such as "Chicago" as illustrated), the end user can select the option by either: (i) double clicking on the option; (ii) clicking on the select button 260; (iii) selecting another attribute to choose; or (iv) clicking on the play button 250 if all the attributes are chosen. Once chosen, the intended option is displayed in its respective one of the three attribute fields 262, 264, and 266. If the cancel button 252 is selected at any time in this operation, no attribute is chosen and the player is reset to either a previous state or to an idle state.

Optionally, attributes can be selected from a personalized set of options so that a list of likely choices is smaller than a full set of options, and is filled with items more likely of interest.

It is noted that, except where noted, the list of options for each attribute includes an "ALL" option. Content is unfiltered with respect to an attribute having the "ALL" option. If a user-initiated selection of the select button 260 is received without receiving a user-initiated selection of an option from the list of options 270, the attribute is automatically set to "ALL".

Referring back to FIG. 2, the preset selection indicators 202 and the preset selection controls 204 provide a graphical user interface for operating presets. The preset selection indicators 202 display a subset of the available presets. The preset selection controls 204 control which subset of the available presets is displayed. The preset selection controls 204 include an up arrow control and a down arrow control to scroll up and down, respectively, in the available presets. As an arrow control is clicked, the available presets scroll such that preset buttons 290, rather than the text therein, visually appear to move.

Presets acts as filters to easily comb through available content for specific, frequently-used material. Presets may be used to store access to specific content or titles, or may be used to specify sets of titles. For example, a first preset can specify a set of all stations that broadcast jazz, and a second preset can specify all recordings of a particular artist. Presets are available as preferences to users of the same client apparatus, and are available across different client apparatus with the use of a smart card (either physical or virtual).

A different set of presets exists for each content category (radio, events, library, and music). If desired, each content category can have a predetermined number of presets (such as twenty, for example) associated therewith. In general, a preset made for a particular content category may not appear as a preset for another content category.

Alternatively, presets can be used across more than one content category, such as for all content categories. In this case, each preset can be assigned a priority within a content category. A border color for a preset selection indicates the content category to which it refers.

A preset can be stored by dragging the cursor from the selection attribute indicators 214 to a preset title bar 292 when a title is active. In this case, the set of attributes is stored in a next available preset. If no presets are available, the end user is prompted to overwrite a preset or to abandon the request to store the preset.

Another way to store a preset is to click and hold one of the preset selection indicators 202 for a duration that exceeds a predetermined threshold. In a preferred embodiment, the predetermined threshold is about one second. Thereafter, a window is displayed to query if the end user wants to store attributes to the selected one of the preset selection indicators 202, or to delete a preset associated with the selected one of the preset selection indicators 202. The attributes are stored in response to a first user-initiated action using the window. The preset is deleted in response to a second user-initiated action using the window.

A further way to add a preset is by a user-selection of an attraction from the attractions window 240. The attractions window 240 provides rotating attractions in the form of presets. The attractions can include advertisements for content. The end user can click on an attraction to add its associated preset to the presets.

Optionally, controls can be provided to rearrange stored presets, and to select either a set of attributes or a specific station or title to store as a preset. As another option, the presets can have functionality that supercedes any function change so that a specific preset is active throughout the entire system. These presets also can be rearranged by the end user.

Displayed within each of the preset selection indicators 202 are two lines of text with twelve characters per line. For a radio station preset, the text includes call letters and a frequency of the radio station. For an event preset, the text includes as much of an event title that can fit within its preset selection indicator. For a library preset and a music preset, the text includes the first twenty-four letters of the title. With use of the smart card (either physical or virtual), a user is provided an option to edit the titles.

FIG. 4 is an illustration of an embodiment of the streaming indicator 216. The streaming indicator 216 is displayed whenever an encoded stream is being decoded in accordance with a streaming technique. The streaming indicator 216 provides a bar graph display representing a percentage of the encoded stream being decoded. In essence, the streaming indicator 216 provides a streaming strength meter showing how close decoded audio is to original audio encoded in the stream.

Also, the streaming indicator 216 provides an indicator of player activity through a resulting flickering thereof. When transmission of data via the electronic network 100 is stalled, one segment 300 of a plurality of segments 302 is displayed in a first color, such as red. When the electronic network is not congested, two or more of the segments 302 are displayed in a second color, such as green.

The streaming indicator 216 also includes two textual indicators 304 and 306 to the right of the segments 302. The textual indicator 304 indicates whether the audio signal is separated into stereo channels. The textual indicator 306 indicates a transportation mode for receiving the encoded stream.

With an activated help mode (as subsequently described in detail), the streaming indicator 216 provides a control to receive a user-initiated action to display transmission statistics. For example, upon clicking the bar graph, the percentage of the encoded stream used to generate the bar graph is displayed in a numerical form. The numerical form of the percentage is repeatedly updated for a duration of about three seconds. Thereafter, the numerical form is replaced with the bar graph.

To provide an indication that a stream is beginning and that a buffer is being filled, each function includes a dial or scale. The dial or scale fills from opaque to solid from left to right to indicate how much of the buffer is filled. In this way, the left side of the dial begins filling when buffering begins, and reaches the right side of the dial when buffering has completed. At this time, play of the audio is commenced.

Also, while loading, a textual indication of system action can be displayed. Examples of system actions which can be displayed include, but are not limited to, a "calling server" action and a "loading file" action. If an error occurs when attempting to locate a streaming file, an error message is displayed at the location of the bar graph.

FIG. 5 is an illustration of an embodiment of the volume controls 212. The volume controls 212 include a plurality of like shapes having different sizes. Each of the shapes is dedicated to receive a user-initiated selection to playback the audio with a volume monotonically related to its size. As illustrated, the shapes can include circles having five different radii. In this case, each larger circle commands a louder volume. Muting the volume is commanded by clicking on the smallest circle. Advantageously, the end user can rapidly adjust the volume from soft to loud with having to go to progressively larger circles.

Referring back to FIG. 2, it is noted that the size of the first display window can be adjusted by the end user, if desired. Preferably, the first display window can be fully displayed within a browser window without requiring scrolling. It is also preferred that the player be capable of providing a collapsed mode view of the first display window. The collapsed mode view may expose only the presets, for example. The collapsed mode view is amenable for use as a desktop player.

Preferably, all of the aforementioned controls have a phrase or description associated therewith to provide assistance to the end user. A default in the player is to provide an activated help mode, wherein a phrase or description associated with a control is automatically displayed when a cursor is maintained at the control for a predetermined duration such as a second.

The help mode control 232 is designated to receive user-initiated actions to activate and deactivate the help mode. To deactivate the help mode, the end user selects the help mode control 232. When deactivated, the help mode control 232 is displayed without the question mark. To reactivate the help mode, the end user selects the help mode control 232 again. When activated, the help mode control 232 is displayed with the question mark.

FIG. 6 is an illustration of an example of a portion of the display window upon receiving a user-initiated selection of the radio category control 244. In the radio category, a graphical radio dial 330 is displayed. The graphical radio dial 330 resembles an analog dial for AM and FM broadcasts. A graphical pointer 332 indicates a current position on the graphical radio dial 330. Preferably, the graphical pointer 332 is shaped as a graphical needle.

Above and below the graphical pointer 332 are text boxes 334 and 336 containing information about a radio station at the current position. The information can include call letters 340, a frequency 342, a format 344, and a city of origin 346 associated with the radio station. As the graphical pointer 332 is moved from station to station, the information in the text boxes 334 and 336 is updated accordingly.

If a plurality of radio stations exist close to one another, a number of dashes 350 indicative of how many radio stations exist are displayed. A plurality of marks 352 (each having the form of a half-circle) are used to separate available radio stations. The number of the marks 352 can be limited to a limit such as fifteen, if desired.

If a plurality of radio stations exist at the same frequency, a number of the marks 352 indicative of how many radio stations exist at the frequency is displayed to extend down from the frequency location. For example, if two radio stations exist at a frequency, two half circles are displayed at that frequency. Scanning through these stations present each station sequentially in call-letter alphabetical order.

A radio station which does not transmit over the electronic network 100 may appear in a slot on the graphical radio dial 330 to indicate its existence. To indicate that the radio station does not currently broadcast over the electronic network 100, a message or other indicator is displayed.

Optionally, a city guide corresponding to a city for the radio station can be displayed. For example, if the graphical radio dial 330 provides a radio dial for San Francisco radio stations, an option (not illustrated) can be user-selected to initiate a display of the city guide for San Francisco.

FIG. 7 is an illustration of an example of the graphical radio dial 330 for selecting Internet or other electronic network broadcasts. In this case, the graphical radio dial 330 has indicia to alphabetically sort the Internet broadcasts by an identification text. For example, ESPNet SportsZone content is located when the graphical pointer 332 is at "E", and C|NET content is located when the graphical pointer 332 is at "C". A text box 360 above the graphical pointer 332 displays the text identifying the audio content (such as "ESPN", for example). A text box 362 below the graphical pointer 332 displays the format and the country of origin of the audio content.

With reference to both FIG. 6 and FIG. 7, the graphical user interface provides multiple ways to navigate to a radio station or an Internet broadcast. One way includes using the selection attribute indicators 214 to select a plurality of stations having chosen attributes, followed by tuning the dial to one of the stations. Attribute selection is performed in a manner described with reference to FIG. 3. In the radio category, selection of an "ALL" option produces all categories of stations that broadcast on FM from anywhere in the world.

The band attribute field 264 allows the end user to specify which band is to be displayed by the graphical radio dial 332. This is a required attribute to be performed in the first step. The bands include AM, FM, (representing stations that primarily broadcast by AM and FM, respectively) and Internet (representing broadcasts only available from the Internet). The default option is FM.

The category attribute field 262 allows the end user to limit the dial to at least one particular category or format. A plurality of categories or formats can be selected by holding down the shift key while selecting the options. In this way, the end user can repeatedly select options from the list without forcing the attribute selection to move to the next field. Text displayed within the category attribute field 262 includes the first chosen category followed by dots to indicate more than one category.

Figure 8:
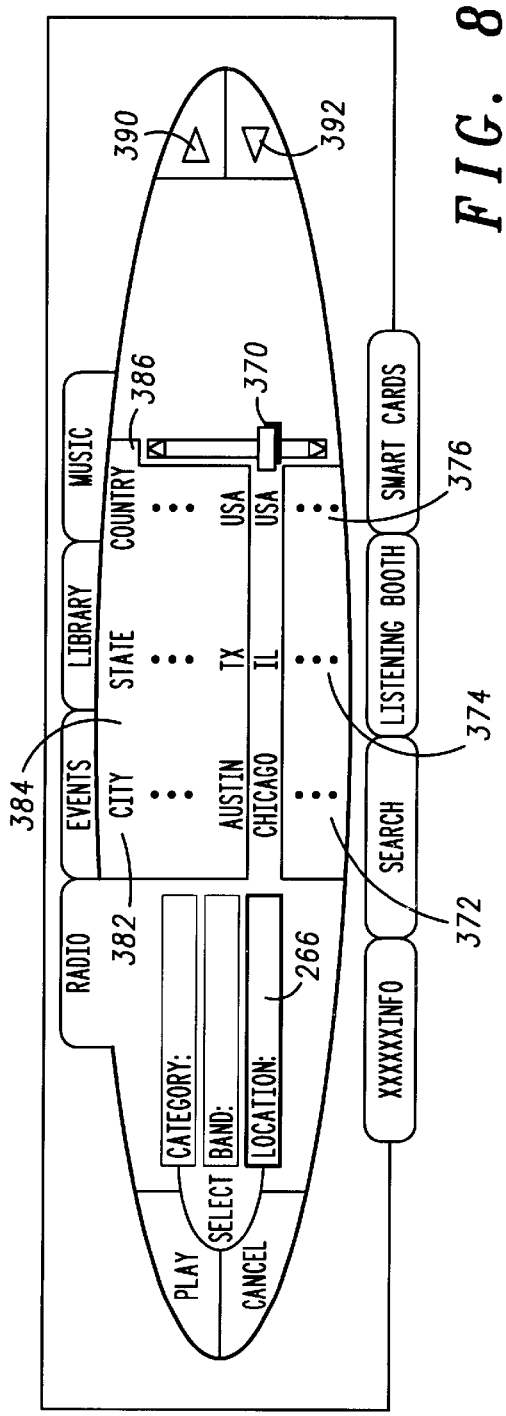
FIG. 8 is an example illustration of using a location attribute field.

FIG. 8 is an example illustration of using the location attribute field 266. The location attribute field 266 allows the end user to limit the dial to stations having a specified location. Stations that broadcast on the Internet are dependent upon country only. A list of options 370 for the location attribute is segmented into three fields: city 372, state 374, and country 376. Displayed at the top of the list are headings 382, 384, and 386 which can be selected to initiate an alphabetical sort of the options 370 by city, state, and country, respectively. The current field by which the options 370 are sorted is indicated by underlining its associated heading (e.g. the heading 382 is illustrated as underlined to indicate that the options 370 are alphabetically sorted by city). If, for example, the end user wished to have the options 370 sorted by state, he/she could click on the heading 384.

For options not having an associated state, which can occur for some countries in the world, the field for the state 374 is left blank. These options are displayed at the top of the list of options 370.

A plurality of locations can be selected by holding down the shift key while selecting locations. In this way, the end user can repeatedly select locations from the list without forcing the attribute selection to move to the next field. Text displayed within the location attribute field 266 includes the first chosen location followed by dots to indicate more than one location.

A radio station is automatically played once a station or a set of stations are selected and displayed. A first station, which preferably is the left-most station on the graphical radio dial 330, or a commercial business can determine which station is to be played first if a set of stations is selected.

It is noted that any of the aforementioned attributes can be modified while a station is being played. When the modified attributes do not include the current station, the graphical radio dial 330 is redisplayed without the current station, and playback of the first station on the graphical radio dial 330 is initiated.

A second way to navigate to a radio station or an Internet broadcast using the graphical user interface includes the advance/review controls 206. A user-initiated selection of an advance control 390 advances from a currently active station to a station disposed rightward therefrom on the graphical radio dial 330. A user-initiated selection of a review control 392 changes from a currently active station to a station disposed leftward therefrom on the graphical radio dial 330. A user-initiated selection of one of the marks 352 navigates to a station associated therewith. Regardless of the manner to which the radio station is navigated, streaming of the radio station is initiated upon its selection.

A third way to navigate to a radio station or an Internet broadcast is to use presets. As described with reference to FIG. 2, the presets are available to access frequently-used radio stations. If the preset attributes include more than one option per attribute, that attribute is used to populate the text of those sets. Each preset button may display up to two items of characteristics which define its associated radio station or group of radio stations.

A fourth way to navigate to a radio station or an Internet broadcast is to use a smart card (either physical or virtual). In addition to or as an alternative to storing preferences, a smart card can be used by a promoter to allow the end user easy or unrestricted access to particular content. When a smart card for a particular station is made active, the station or group of stations is presented within the graphical radio dial 330. If the attribute options include more than one item, that attribute reads the associated text. Any activity controlled by a smart card is represented by an oblique version of the font for displaying a function text label (i.e. the "radio" label in the radio content control 244, the "events" label in the events category control 245, the "library" label in the library category control 246, and the "music" label in the music category control 247). The smart card control 230 displays the title of the smart card.

Figure 9:
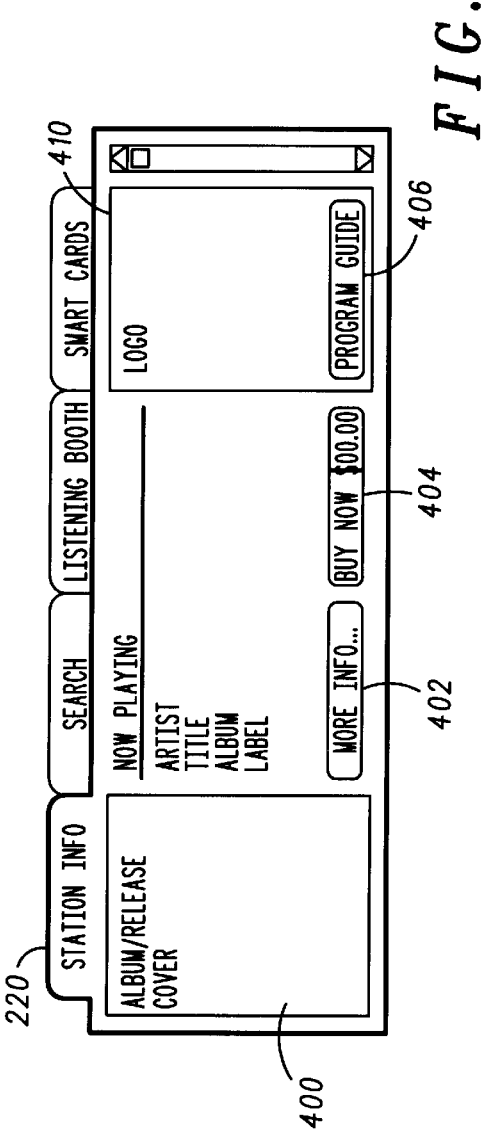
FIG. 9 is an example of a second display region providing auxiliary information about a particular station.

FIG. 9 is an example of the second display region 222 providing auxiliary information about a particular station. The auxiliary information is displayed in response to receiving a user-initiated selection of the information control 220. The auxiliary information can include a title of a current song being played by the station, an artist associated with the song, an album containing the song, a label for the song, and an image of the album cover art. An option 402 is designated to receive a user-initiated event to display more auxiliary information about the song. An option 404 is designated to receive a user-initiated event to purchase the song or an album containing the song. An option 406 is designated to receive a user-initiated event to display a programming guide.

The auxiliary information can also include promotional advertising provided by the station, such as a logo 410 or another image, and one or more links to related sites on the electronic network. The logo 410 acts as a control to initiate a hyperlink to a destination in the electronic network 100, such as to a home page of the radio station. Another window is opened to present information from the destination.

Figure 10:
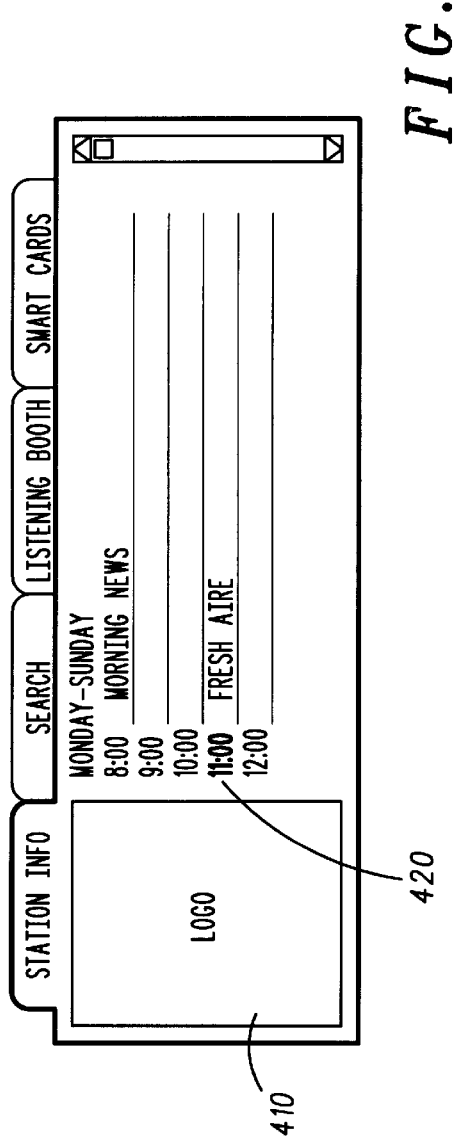
FIG. 10 is an example of a programming guide in a second display region.

FIG. 10 is an example of a programming guide in the second display region 222. The programming guide includes a planned schedule of the radio station in a list format. The list includes days of the week and times for the programming. Active content 420 is emphasized with bold typeface. Specific events listed in the programming guide can provide links to archived material. Clicking on or otherwise selecting a link brings the end user to the events category with the attributes populated for an event corresponding to the link. Optionally, the programming guide can accept inputs to display the schedule for other times throughout a day or week. Future events can be scheduled in this way.

When no station is active, the second display region 222 may be used to display an advertisement. The advertisement can be provided as a viewing object while streaming buffering occurs. When there is a period of inactivity for the player, the second display region 222 can resume displaying advertising for a station or another business entity.

It is noted that the radio category can optionally provide additional functionality not specifically illustrated in the drawings. Examples of additional functionality include: (i) a call button in the main area of the interface to initiate an Internet telephone call between the client apparatus 106 and the radio station; (ii) options to support a chat room among listeners of a radio station; (iii) a presentation of player information in languages other than English; (iv) a "show map" option for choosing a location using a graphic representation having mapped zones to represent cities or regions of the country and world; (v) a feedback mechanism to rate the station as a whole, a playlist, a disk jockey, or a current song with a 1 to 10 pick list on a station information screen; and (vi) a comment line that allows the end user to submit text to the station with or without the aforementioned rating.

Figure 11:
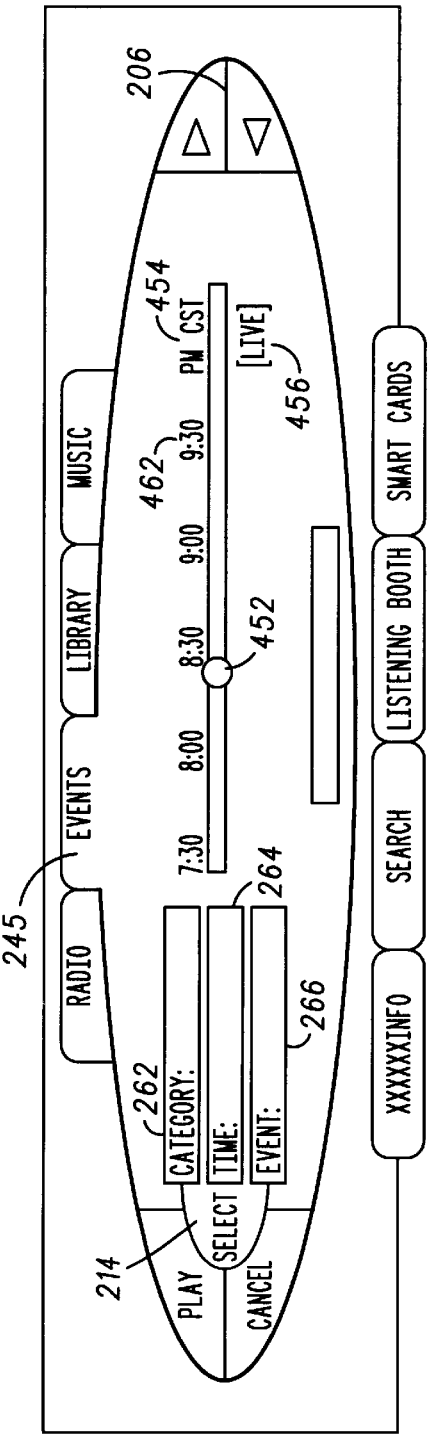
FIG. 11 is an illustration of an example of a portion of the interface displayed upon receiving a user-initiated selection of an events category control.

FIG. 11 is an illustration of an example of a portion of the interface displayed upon receiving a user-initiated selection of the events category control 245. In the events category, a graphical time scale 450 is displayed. A time marker 452 indicates, for an event, a current time position on the graphical time scale 450. The current time position is gauged relative to a time the event occurred. An indication 454 of a time standard or a time zone is displayed to the right of the graphical time scale 450.

An indication 456 is displayed if the event is live. If the event is archived, the indication 456 is replaced by the date that the event occurred.

A start time 460 and an end time 462 on the graphical time scale 450 may be specified in a preference. However, the default is to present the start time 460 and the end time 462 based on the actual occurrence of the event. Alternatively, a timeline indicating an amount of time that the end user has been listening to the event can be displayed. This timeline is preferred in cases where there is an inaccurate record of the original recording.

For live events having an uncertain length (e.g. a sporting event), an estimated timeline is initially displayed. Should the duration of the event go beyond the estimated timeline, an updated timeline is displayed with a start time set to the end time of the estimated timeline.

For an archived event, the time marker 452 can be advanced and reversed using the advance/review controls 206. For a live event, the advance/review controls 206 are not active. To indicate this to the end user, the advance/review controls 206 are displayed in a first color, such as grey, rather than a second color, such as black, for a live event.

The graphical user interface provides multiple ways to navigate to an event. One way includes using the selection attribute indicators 214 to select an event having chosen attributes. Attribute selection is performed in a manner described with reference to FIG. 3. In the events category, selection of an "ALL" option produces a list of all events.

The category attribute field 262 allows the end user to limit the events to at least one particular category or format. A plurality of categories or formats can be selected by holding down the shift key while selecting the options. In this way, the end user can repeatedly select options from the list without forcing the attribute selection to move to the next field. Text displayed within the category attribute field 262 includes the first chosen category followed by dots to indicate more than one category.

Figure 12:
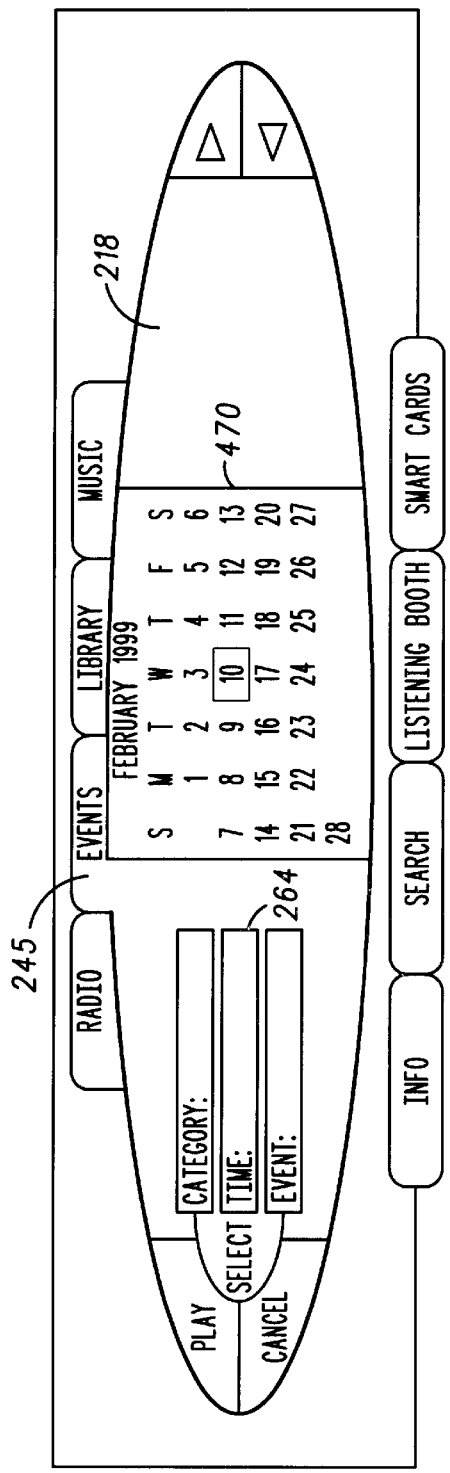
FIG. 12 is an example illustration of using a time attribute field.

FIG. 12 is an example illustration of using the time attribute field 264. The time attribute field 264 allows the end user to specify a date and a time period at which the event is either scheduled to occur or has occurred. Several options can be made available to specify specific dates. One option is to display a calendar 470 in the first display region 218 for selecting a day or a block of days. A day is selected by navigating the calendar 470 to the day, and clicking on the day. A block of days is selected by clicking on a first date while holding the shift key, and then clicking on the ending date.

Figure 13:
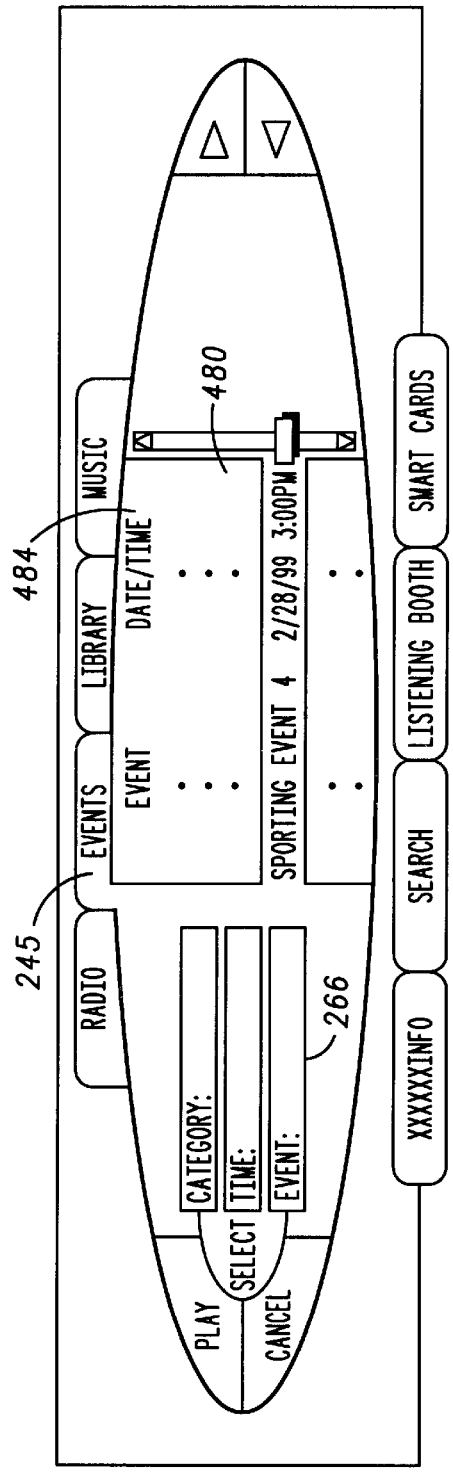
FIG. 13 is an example illustration of using an event attribute field.

FIG. 13 is an example illustration of using the event attribute field 266. Upon selecting the event attribute field 266, a list of events 480 defined by the category attribute field 262 and the time attribute field 264 is displayed. The list of events 480 has a first column to display the name of the event, and a second column to display the date and start time of the event. Displayed at the top of the list are headings 482 and 484 which can be selected to initiate an sort of the events 450 by event name (alphabetically) or by start time (numerically), respectively. The current field by which the events 480 are sorted is indicated by underlining its associated heading (e.g. the heading 482 is illustrated as underlined to indicate that the events 480 are alphabetically sorted by event name). By default, the events 480 are sorted by event name.

A second way to navigate to an event is to use a preset. As described with reference to FIG. 2, some presets are dedicated to access events. If a preset specifies a category attribute and a time attribute rather than an event, the event attribute list is made active upon selecting its preset button. Thereafter, the end user can select an event from the list. If a preset specifies an event, the event will begin to play upon selecting its preset button as soon as the file is available.

A third way to navigate to an event is to select an archived or a scheduled event from a radio station programming guide. In response to receiving a user-initiated selection of an event from the programming guide, the graphical user interface provides the events category. The event attribute field 266 is populated with the selected event. Playback of archived events is automatically initiated. For scheduled events, a prompt to receive a user-initiated selection of a notification method is provided.

Figure 14:
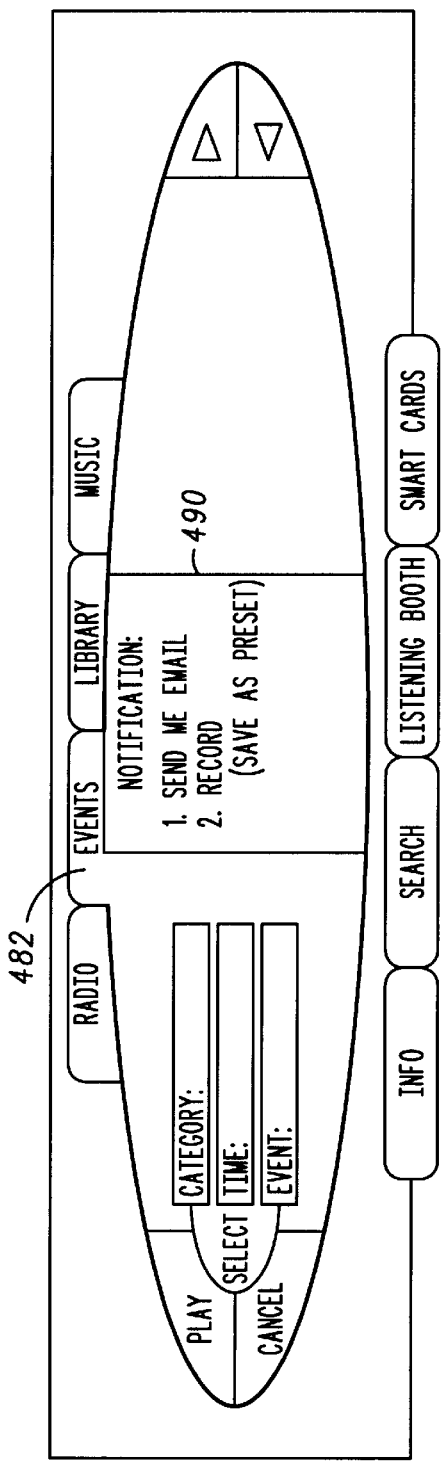
FIG. 14 is an illustration of an example of a notification prompt.

FIG. 14 is an illustration of an example of a notification prompt. If an event has not occurred at the time of selection, but is scheduled to occur subsequent to the time of selection, a notification options window 490 is displayed rather than the graphical time line. Although not illustrated, the streaming indicator 216 indicates the status of the event (such as not yet occurred) in this case. Further, the play button 250 is modified to display the word "SCHEDULE" as a confirmation that the event is scheduled. If the end user has not provided scheduling preferences, a prompt to enter the preferences is displayed. The schedule and the preferences are stored to a preferences smart card (either physical or virtual).

The notification options window 490 provides three options. A first option is to send a message to the end user before the event occurs. For example, the message can be sent a predetermined number of minutes before the event. The message can include an electronic mail message sent to the client apparatus 106 or a paging message sent to a pager associated with the end user. A second option is to automatically activate the player, if the client apparatus 106 is activated, at the time of the event. A third option is to record the event for subsequent playback. In this case, the recorded event becomes a preset for later access. Text associated with the preset button is displayed in a bold typeface. If an event is not yet available, an indication thereof can be provided. If an archive of the event is no longer available, the preset is automatically removed.

It is noted that a personal notification message can be sent to an end user without use of the aforementioned notification prompt. In this case, a notification message is sent to the end user for an event or a program which may be of interest based upon listening behavior or other activity of the end user. Hence, in general, the server 102 can provide personal notification for content that is broadcast at a scheduled time based upon either an expressed interest of the end user (e.g. through the aforementioned active marking for content using the notification prompt) or a passive interest of the end user (e.g. through monitoring of user activity).

A fourth way to navigate to an event is to use a smart card (either physical or virtual). The smart card can allow access to specific events as promotions, for example. When a promotional smart card is made active, the content specified in the card is used to populate attributes in the player. Any text populated by a smart card is represented by an oblique version of the font for displaying a function text label.

Smarts cards (either physical or virtual) also facilitate access to specific events as part of a playlist. In this case, the end user can specify and save a playlist of events to the smart card. The playlist is used to control the player. The playlist may jump to different selections, in which case the text of the selection is presented in an oblique font. It is noted that the playlist information stored can be separate from a physical or a virtual smart card. For example, the playlist information can be stored by the storage device 116 of the server 102 or by the storage device 132 of the client apparatus 106.

Figure 15:
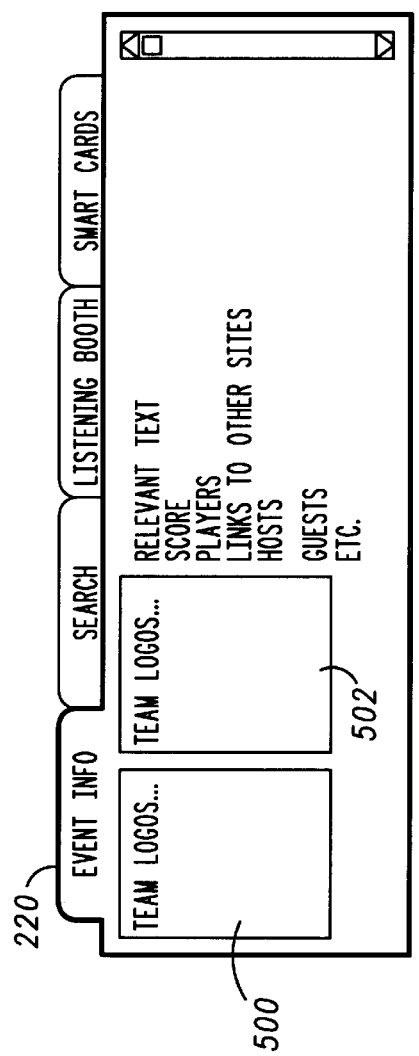
FIG. 15 illustrates an example of the second display region displaying auxiliary information about an event.

FIG. 15 illustrates an example of the second display region 222 displaying auxiliary information about an event. The auxiliary information is displayed in response to receiving a user-initiated selection of the information control 220, which includes the text "EVENT INFO" for events.

The auxiliary information is dependent upon the type of the event. Examples of default information include an original time of the event, a location, guests, and topics. For example, with a sporting event, the auxiliary information can include team logos 500 and 502, a current score for the sporting event, players, hosts, guests, and links to sites related to the event. Linking to one of the sites causes another window to be opened.

It is noted that the events category can optionally provide additional functionality not specifically illustrated in the drawings. Examples of additional functionality include: (i) substituting the event attribute field 266 with a different attribute field, such as a location attribute field, and providing a time line with marks representing the union of events; (ii) temporally arranging events on the timeline so that an event can selected in a manner similar to the graphical radio dial (allowing the end user to rapidly alternate between two selections); (iii) inserting advertising in the form of markers at predetermined locations along the time scale (allowing the end user to go to another site when there is a pause in the event without losing track of where they are in the event); (iv) a feedback mechanism to rate the event as a whole, the subject of the event, a particular participant in the event, or the broadcast of the event with a 1 to 10 pick list on an event information screen; and (v) a comment line that allows the end user to submit textual feedback with or without the aforementioned rating.

Figure 16:
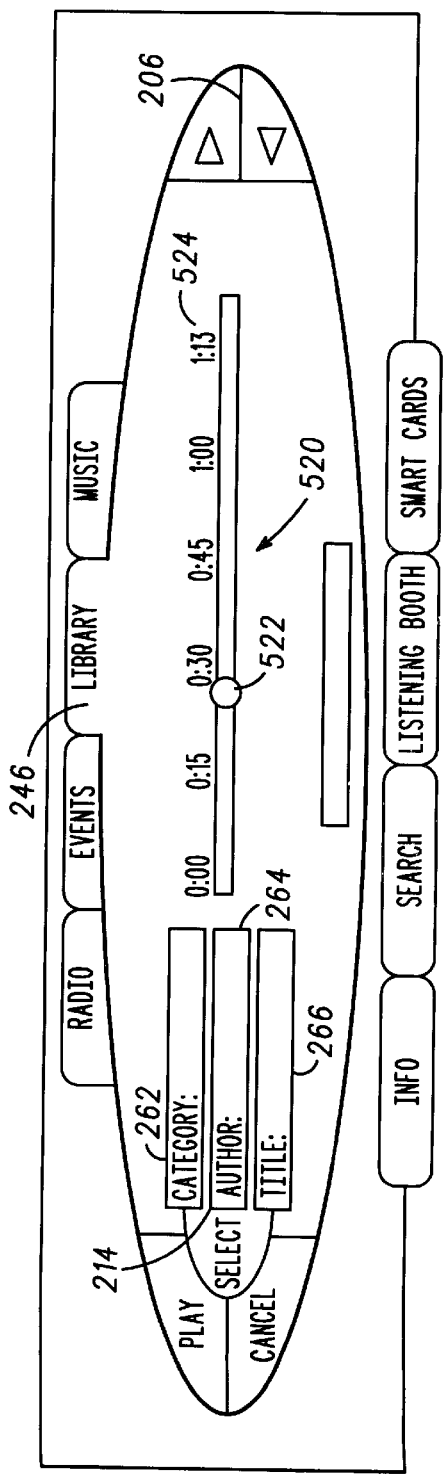
FIG. 16 is an illustration of an example of a portion of the interface displayed upon receiving a user-initiated selection of the library category control.

FIG. 16 is an illustration of an example of a portion of the interface displayed upon receiving a user-initiated selection of the library category control 246. In the library category, a graphical time scale 520 is displayed. A time marker 522 indicates a current time position, for a library content selection, on the graphical time scale 520. The graphical time scale 520 represents a total time 524 for the selection. The time marker 522 can be moved manually using the pointing device or can be moved using the advance/review controls 206.

The graphical user interface provides multiple ways to navigate to content in the library category. A first way includes using the selection attribute indicators 214 to select content having chosen attributes. Attribute selection is performed in a manner described with reference to FIG. 3. In the library category, selection of an "ALL" option produces a list of all library content.

The category attribute field 262 allows the end user to limit the library content to at least one particular category or format of spoken audio. A custom attribute allows a plurality of categories or formats can be selected by holding down the shift key while selecting the options. In this way, the end user can repeatedly select options from the list without forcing the attribute selection to move to the next field. It is noted that categories can be specialized with options such best sellers and reviews.

The author attribute field 264 allows the end user to specify an author of the content. Work that is absent of an author (such as non-book material) can have a lead person in the work listed as an author. Upon selecting the author attribute field 264, a list of authors having content limited to the category specified in the category attribute field 262 is displayed. The end user can select an author from the list.

Upon selecting the title attribute field 266, a list of titles that satisfy the parameters specified in the category attribute field 262 and the author attribute field 264 is displayed. The end user can select a title from the list.

Figure 17:
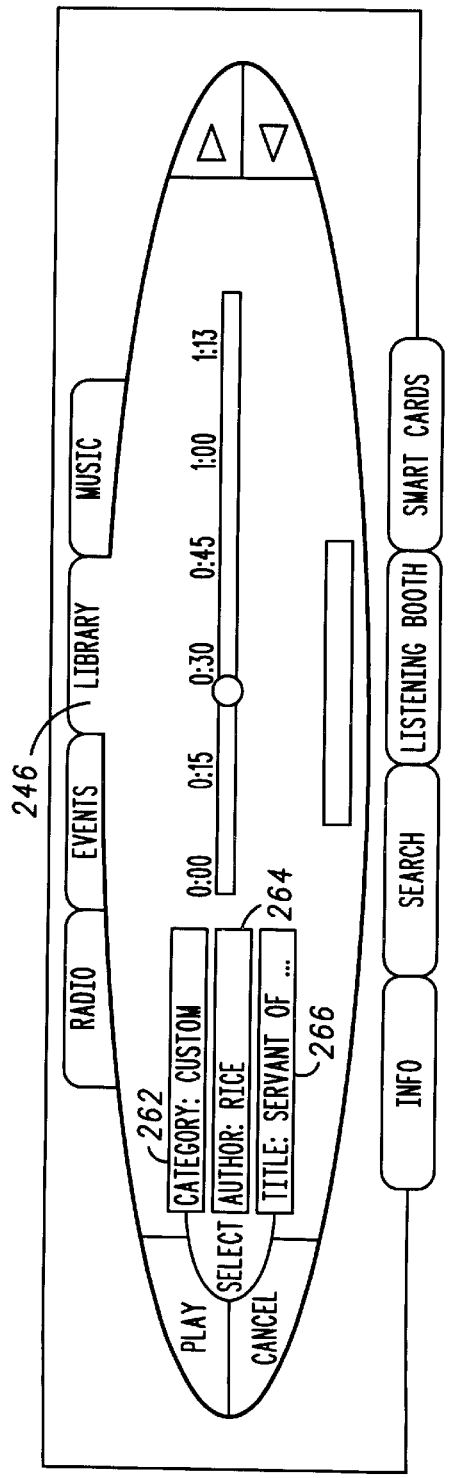
FIG. 17 shows an example of text in the fields associated with an approach to navigating to library material.

FIG. 17 shows an example of text in the fields 262, 264, and 266 associated with the aforementioned approach to navigating to library material. When information in a field is longer that the width of the field, the full text of the information is available by maintaining a cursor on the field. In response to this user-initiated event, the width of the field is expanded to accommodate the full text.

A second way to navigate to library content is to use a preset. As described with reference to FIG. 2, some presets are dedicated to the library section. Upon selecting a preset button, attributes specified by its corresponding preset are used to populate the attribute fields 262, 264, and 266. If the preset defines a set of titles, the user can select one of the titles using the title attribute field 266.

A third way to navigate to library content is to use a smart card (either physical or virtual). The smart card is used to populate attributes in the player. Thereafter, the user is presented with the content cued and ready to play, or is presented with a list of titles to select from. The smart card can allow access to otherwise unavailable content that is made available through privileges stored in the smart card. During smart card operation, the Library function label is displayed using an oblique font.

Smarts cards also facilitate access to specific titles as part of a playlist. In this case, the end user can specify and save a playlist of titles to the smart card. The playlist is used to control the player. The playlist is amenable for transfer between the end user and another end user, and between a plurality of access points for the end user. When an item from a playlist is selected, its attributes populate the attribute fields 262, 264, and 266, and the item is cued for play.

Figure 18:
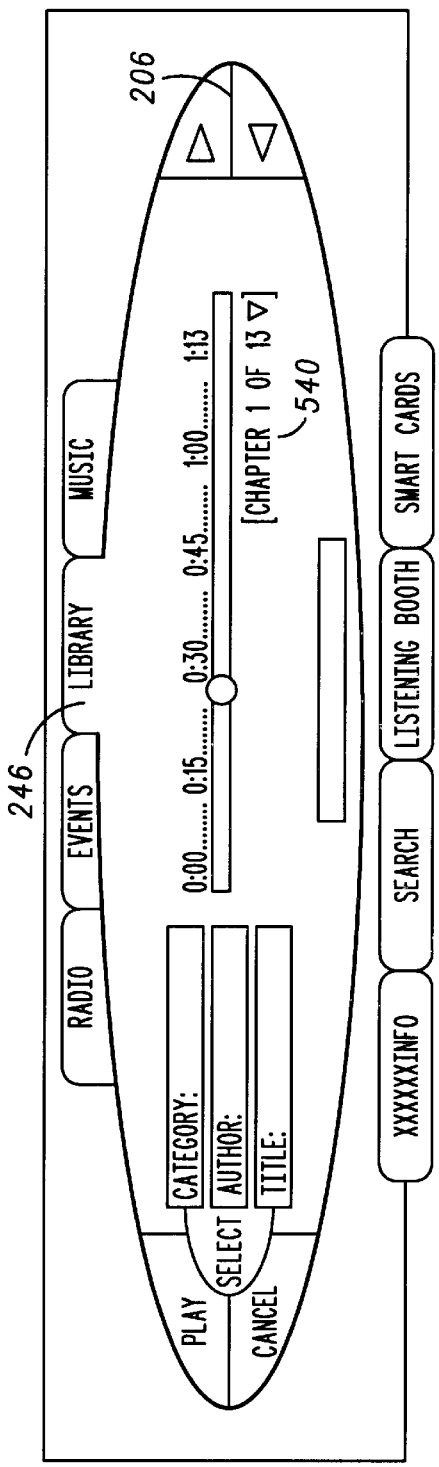
FIG. 18 shows an indicator of which chapter is current and the number of chapters that exist.

Regardless of the method of navigating to a title, the graphical user interface can provide indicators and controls to provide access to specific chapters or sections of the material in a manner similar to tracks of a compact disk. A time indicator can be displayed at the top of the time scale relative to each particular segment or relative to the time from the beginning of the material. As illustrated in FIG. 18, an indicator 540 of which chapter is current and the number of chapters that exist is displayed at an end of the time line. Clicking on the indicator 540 presents a pick list of chapters.

Cueing to another part of the content can be performed using the advance/review controls 206 to advance through the time bar. When advanced beyond the length of a chapter, a subsequent chapter is provided. Holding down the advance/review controls 206 advances or returns to other chapters.

Alternatively, tags marking specific content on the time bar can be user-selected to advance to specific content. Further, a user-initiated selection of a point on the time line moves the time marker to the point.

Optionally, the time marker can have specially-encoded material associated therewith to allow for users to find specific segments. This is beneficial in educational applications. Another option is to provide titles of chapters rather than chapter numbers in the indicator 540. Links to reviewers or other comments can be embedded in the time scale to allow the end user to pause and reflect on the current material.

Figure 19:
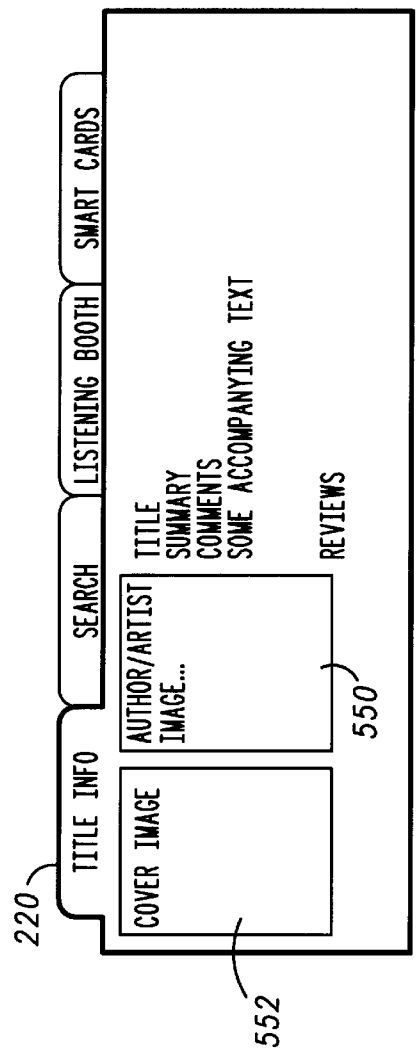
FIG. 19 illustrates an example of the second display region being used to provide auxiliary information about a title.

FIG. 19 illustrates an example of the second display region 222 being used to provide auxiliary information about a title. The auxiliary information is displayed in response to receiving a user-initiated selection of the information control 220, which includes the text "TITLE INFO" for library content. The auxiliary information can include specific information for the title, a summary of the title, a table of contents, credits, comments on the title, accompanying text, links to reviews of the title, links to related areas, an image 550 of the author(s), and an image 552 of the cover of a book, for example.

It is noted that the library category can optionally provide additional functionality not specifically illustrated in the drawings. Examples of additional functionality include: (i) a feedback mechanism to rate the title as a whole, the author, reading or translation of the title with a 1 to 10 pick list on a library information screen; and (ii) a comment line that allows the end user to submit textual feedback with or without the aforementioned rating.

FIG. 20 is an illustration of an example of a portion of the interface displayed upon receiving a user-initiated selection of the music category control 247. In the music category, a graphical time scale 600 is displayed much like the graphical time scale 520 for the library category. A time marker 602 indicates a current time position for a music selection, such as an album or a song, on the graphical time scale 600. The graphical time scale 600 represents a total time 604 for the music selection. The time marker 602 can be moved manually using a click-and-drag operation with a pointing device or can be moved using the advance/review controls 206.

The graphical user interface provides multiple ways to navigate to content in the music category. A first way includes using the selection attribute indicators 214 to select content having chosen attributes. Attribute selection is performed in a manner described with reference to FIG. 3. In the music category, selection of an "ALL" option produces a list of all music content.

The category attribute field 262 allows the end user to limit the library content to at least one particular category or format. Traditional categories and formats of music (e.g. rock, jazz, pop, etc.) can be provided. A plurality of categories or formats can be selected by holding down the shift key while selecting the options. In this way, the end user can repeatedly select options from the list without forcing the attribute selection to move to the next field.

The artist attribute field 264 allows the end user to specify an artist of the content. Upon selecting the artist attribute field 264, a list of artists having content limited to the category specified in the category attribute field 262 is displayed. The end user can select an artist from the list.

Upon selecting the title attribute field 266, a list of titles that satisfy the parameters specified in the category attribute field 262 and the artist attribute field 264 is displayed. The end user can select a title from the list. The list of titles can include album titles and song titles.

When information in one of the fields 262, 264, and 266 is longer that the display width of the field, the full text of the information is available by maintaining a cursor on the field. In response to this user-initiated event, the width of the field is expanded to accommodate the full text.

A second way to navigate to music content is to use a preset. As described with reference to FIG. 2, some presets are dedicated to the music section. Upon selecting a preset button, attributes specified by its corresponding preset are used to populate the attribute fields 262, 264, and 266. If the preset defines a set of titles, the user can select one of the titles using the title attribute field 266.

A third way to navigate to music content is to use a smart card (either physical or virtual). The smart card is used to populate attributes in the player. Thereafter, the user is presented with the content cued and ready to play, or is presented with a list of titles to select from.

Smarts cards also facilitate access to specific titles as part of a playlist. In this case, the end user can specify and save a playlist of titles to the smart card. The playlist is used to control the player. The playlist is amenable for transfer between the end user and another end user, and between a plurality of access points for the end user. When an item from a playlist is selected, its attributes populate the attribute fields 262, 264, and 266, and the item is cued for play.

Regardless of the method of navigating to a title, the graphical user interface can provide indicators and controls to provide access to specific tracks, sections, or parts of the music. As illustrated in FIG. 21, an indicator 620 of which track is current and the number of tracks that exist is displayed at an end of the time line. Clicking on the indicator 620 presents a pick list of tracks.

Cueing to another part of the music content can be performed using the advance/review controls 206 to advance through the time bar. Holding down the advance/review controls 206 for more than a predetermined time duration (such as one second, for example) advances or returns to other tracks immediately. A user-initiated selection of a point on the time line moves the time marker to the point.

Optionally, the time marker 602 can have specially-encoded material associated therewith to allow for users to find specific songs or other segments. Another option is to provide titles of songs and/or credits rather than track numbers in the indicator 620. Controls can be provided to allow titles in an album to be rearranged for playback.

Referring back to FIG. 2, the second display region 222 can be used to provide auxiliary information about music content. The auxiliary information is displayed in response to receiving a user-initiated selection of the information control 220, which includes the text "ALBUM INFO" for music content. The auxiliary information can include specific information for the current title such as album cover graphics, liner notes, tray back images, images of the artist(s), producer and writer credits, and distribution label information, for example.

It is noted that the music category can optionally provide additional functionality not specifically illustrated in the drawings. Examples of additional functionality include: (i) a feedback mechanism to rate aspects of the music such as the artist, the album, a song, and a producer, using a 1 to 10 pick list on a music information screen; (ii) a comment line that allows the end user to submit textual feedback with or without the aforementioned rating; and (iii) an ability to receive, decode, and display streamed music video in the second display region 222.

Figure 22:
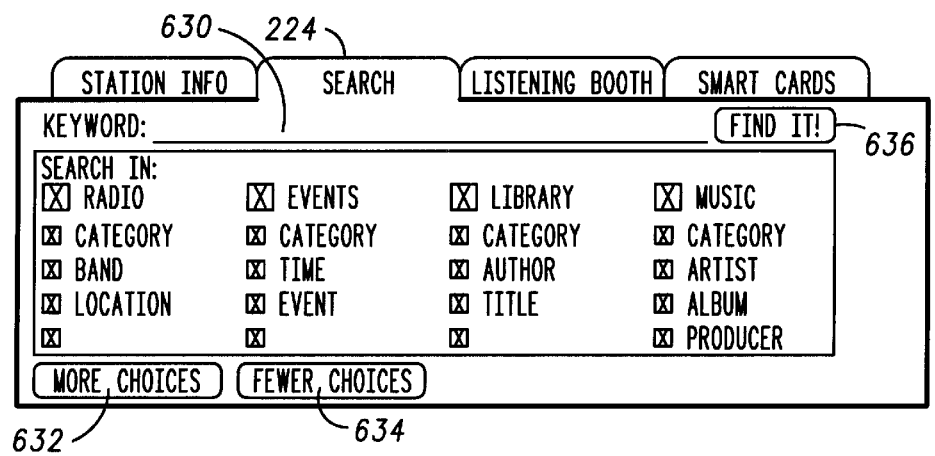
FIG. 22 illustrates an example of a search feature provided in the second display region.

FIG. 22 illustrates an example of a search feature provided in the second display region 222. The search feature is activated in response to receiving a user-initiated selection of the search control 224. If the user-initiated selection is received while the search feature is active, herein-described search fields are reset.

The search feature receives a user-entered search string. The search string is displayed at a location 630. The search string includes one or more keywords which can have the form of a Boolean expression. A list of keywords can be combined using a "+" character. To limit the selection to one of the keywords, a "−" character precedes the keyword. Generally, the keywords are case insensitive.

Using the search string, a search of a database is performed in dependence upon user-selectable search criteria. The database can be provided by the server 102 and/or the server 144. The search criteria limits where to search in the database for the search string. The search criteria includes fields for the radio category, the events category, the library category, and the music category. Each search criterion can be activated and deactivated using a graphical check box associated therewith. An "×" character is displayed at the graphical check box to indicate that its associated search criterion is activated. As a default, all search criteria are activated.

A first button 632 is responsive to a user-initiated selection to provide further fields to be searched. The first button 632 can be subsequently selected to provide still further fields to be searched. Each additional field provided in response to the first button 632 is activated by default. The end user can deselect the activated fields if desired. A second button 634 is responsive to a user-initiated selection to provide fewer fields to be searched.

The search is performed in response to a user-initiated selection of a button 636. Results of the search are displayed in the second display region 222.

Figure 23:
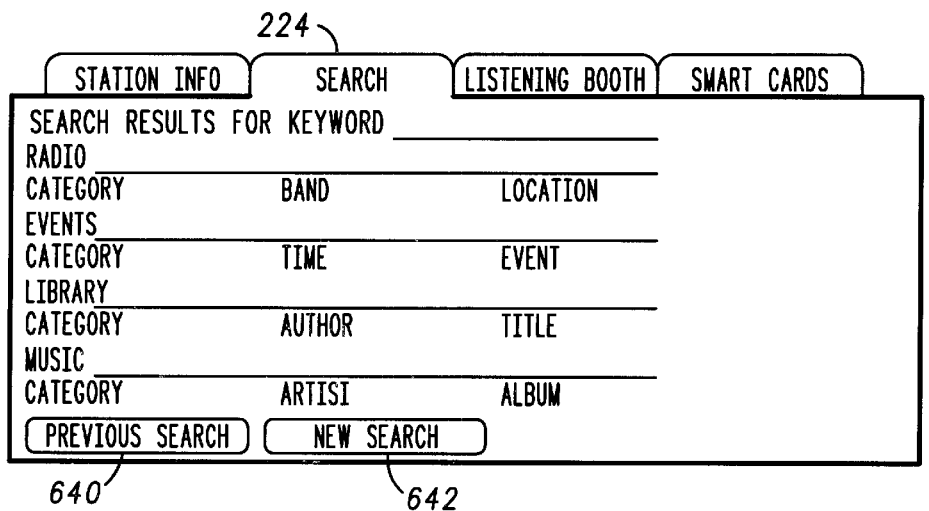
FIG. 23 illustrates an example of search results displayed in the second display region.

FIG. 23 illustrates an example of search results displayed in the second display region 222. The search results are sorted by category (in the order of radio, events, library, and music). Preferably, items are color-coded in dependence upon its category. Within each category are three attribute headings. Search results within each category can be sorted by an attribute by selecting its associated one of the attribute headings.

A first button 640 is responsive to a user-initiated selection to return to the previously set search fields (including the search string and the search criteria). The end user can modify the search fields to modify the search. A second button 642 is responsive to a user-initiated selection to reset the search fields to perform a new search.

Figure 24:
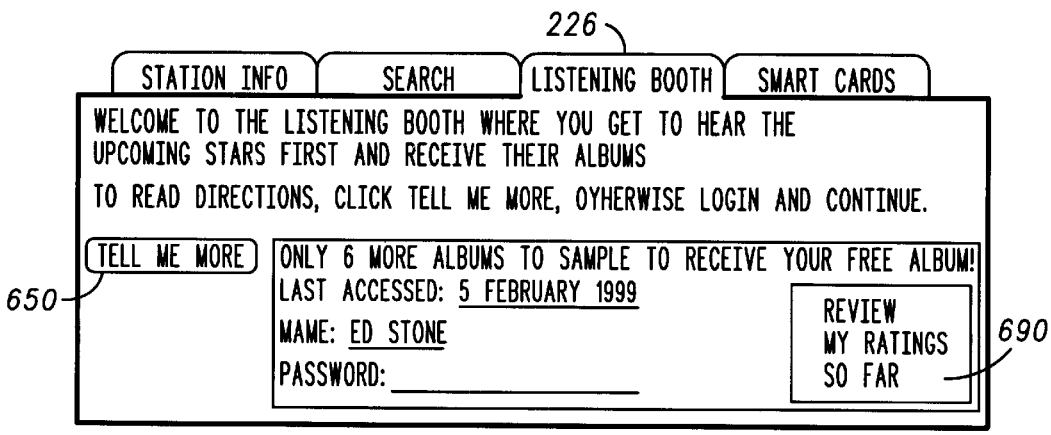
FIG. 24 illustrates an example of a listening booth feature provided in the second display region.

FIG. 24 illustrates an example of a listening booth feature provided in the second display region 222. The listening booth feature is activated in response to receiving a user-initiated selection of the user feedback control 226. The listening booth feature can provide a venue for new music by relatively unknown talent. End users listen to the music, and provide user feedback to a service via the electronic network 100. In return, the service provides the end user with an incentive, such as a complimentary copy of the music, a coupon, T-shirt, or other promotional item. Each end user rates music based upon a user preference parameter, such as a most-listened category for the end user. In general, any audible material can be rated, including but not limited to albums, playlists from radio stations and experimental audible material.

The listening booth feature provides an option 650 to view directions therefor. In response to a user-initiated selection of the option 650, the directions are displayed in the second display region 222. The directions can include example screens to explain use of the listening booth feature.

Upon each return to the listening booth feature, a status of the end user is displayed. The end user is registered at the server 102 through an active preferences smart card. The status can include a number of albums rated by the end user, and/or a remaining number of albums to receive a complimentary album.

The status information includes information about the end user, which may be stored via the preferences smart card. If this information is not present, the user is prompted to make a preferences smart card active or to create a preferences smart card. The preferences smart card provides a method of tracking listening preferences of the end user in order to determine which albums to present in the listening booth feature.

Figure 25:
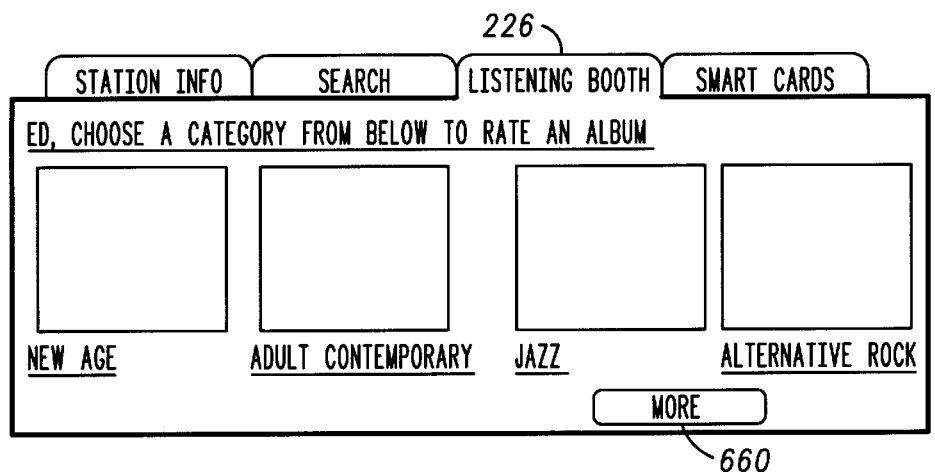
FIG. 25 is an example of a second display for the listening booth feature.

FIG. 25 is an example of a second display for the listening booth feature. The second display is presented upon confirming the identity of the end user, such as by receiving a password in the first display.

The second display provides several categories of music content from which to select. These categories are determined through past listening behavior of the end user. An option 660 can be selected to provide additional, different categories. The option 660 can be repeatedly selected to repeatedly provide more categories.

A user-initiated selection of text or graphics associated with one of the categories is received to select a category. The text can include a radio station associated with the category the end user has a radio preset for the category. The graphics can include an album cover of a typical album in the category.

Figure 26:
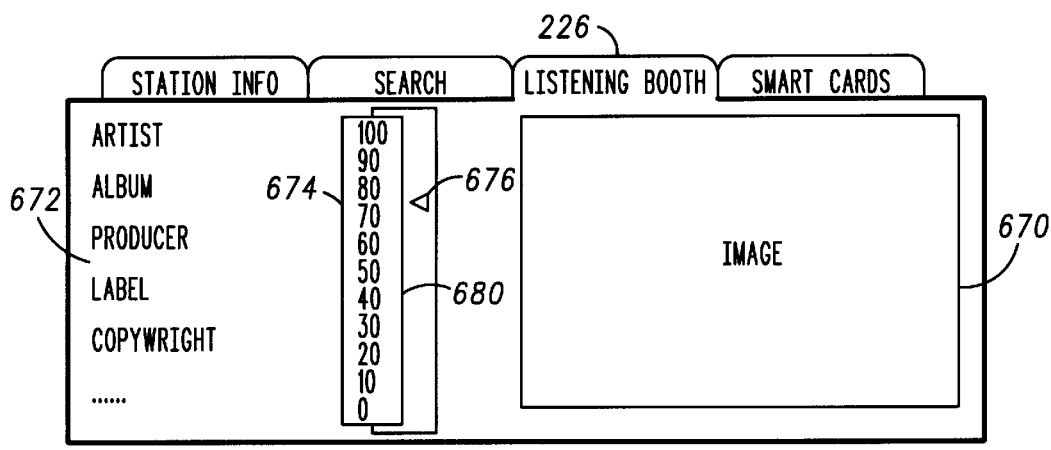
FIG. 26 is an example of a third display for the listening booth feature.

FIG. 26 is an example of a third display for the listening booth feature. The third display is presented upon a user-initiated selection of one of the categories in the second display.

The third display includes at least one image 670 associated with a music selection from the category. The at least one image 670 can include a slide show based on liner notes, a CD tray back image, or a random image, for example. The third display also includes textual information including an artist, an album, a producer, a label, and a copyright associated with the music selection.

The music selection is loaded into the attributes. Based on user preferences, the tracks can automatically begin playing when queued. The music selection can include samples of a few seconds from each track on an album, for example. During playback, the end user enters a rating using a control

674. The control includes 674 a marker 676 that is manipulated with respect to a numerical scale 680. The numerical scale 680 can run between two numerical limits, such as from 0 to 100.

Upon completion of playing the samples, the user-entered rating is recorded and the music selection is counted as being rated by the end user. If no rating has been entered, no rating is recorded. If the end user exits the listening booth feature during playback, the rating is not recorded. A rating can be canceled by a user-initiated selection of the cancel button 252.

As an alternative to a numerical rating, a graphical representation of rating can be employed. The graphical representation can be repeatedly gauged throughout the music selection. In this way, specific aspects and specific tracks of the music selection can be rated.

Figure 27:
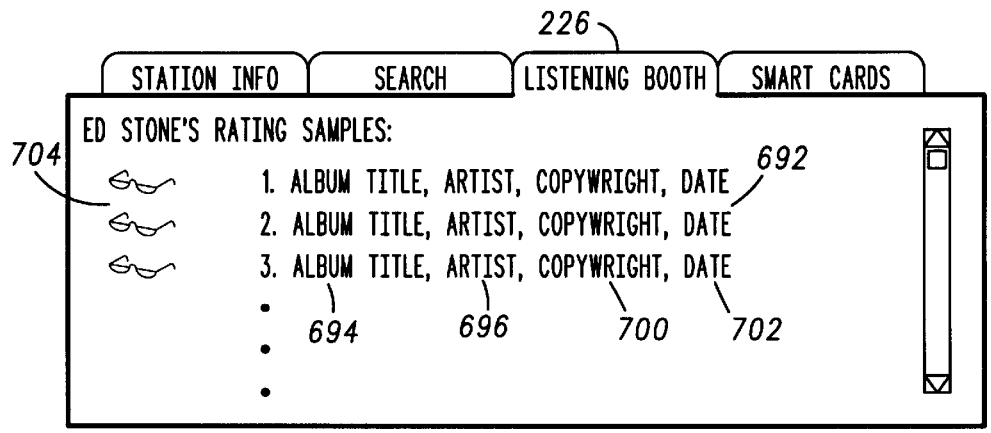
FIG. 27 is an example display provided upon selecting the control.

Referring back to FIG. 24, a control 690 can be selected by the end user to view previously reviewed albums. FIG. 27 is an example display provided upon selecting the control 690. The display includes a list 692 of each album reviewed by the end user. An album title 694, an artist 696, a copyright 700, a date 702, and an icon 704 are displayed for each album. The icon 704 can be selected to view images and credits, and to hear an audio clip of the samples for its associated album.

Figure 28:
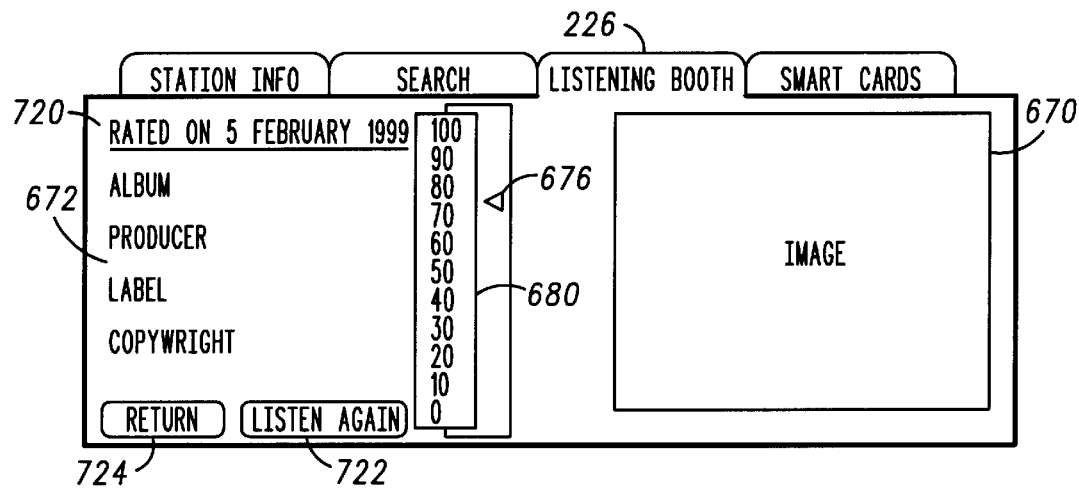
FIG. 28 depicts an example of a portion of the interface displayed upon selecting an icon.

An example of a portion of the interface displayed upon selecting the icon is depicted in FIG. 28. As illustrated, the at least one image 670, the textual information 672, the marker 676, and the numerical scale 680 showing the rating are displayed as in FIG. 26. Additionally, a date 720 on which the album was rated is displayed. An option 722 is dedicated to receive a user-initiated event to initiate playback of the samples. An option 724 is dedicated to receive a user-initiated event to return to the previous screen.

Once the number of albums rated by the end user has attained a predetermined number, the end user can request a complimentary copy by selecting any one of the albums in the list. A dedicated button (not illustrated) can be selected to request that the complimentary copy be shipped to an address of the end user.

Figure 29:
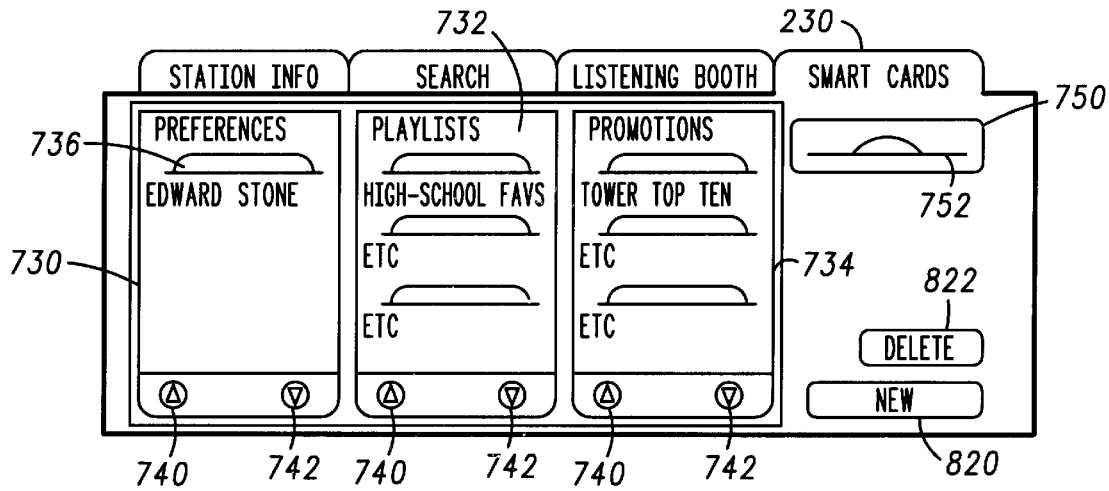
FIG. 29 illustrates an example of a card organizer display for a smart card feature.

FIG. 29 illustrates an example of a card organizer display for a smart card feature. The smart card feature is activated in response to receiving a user-initiated selection of the smart card control 230. The card organizer display is displayed within the second display region 222.

There are four types of smart cards (either physical or virtual) that can be used in the system. The four types of smart cards include a preferences smart card, a promotions smart card, a playlist smart card, and a payment smart card.

A preferences smart card or a personality smart card stores identity, demographics, presets, defaults, payment options and preferences, and event schedules for an end user. The preferences smart card is read/write and password protected. Each preferences smart card can be unique for an associated end user of the client apparatus 106. Using a plurality of preferences smart cards, a plurality of individual preferences can be provided for a plurality of end users of the client apparatus 106.

A playlist smart card is a custom card for an individual. The playlist smart card is a collection and organization device for content available via the electronic network 100. The playlist smart card can be used to collect music, library content, events, or radio programming using personalized icons, event schedules, and playlists. Access to some content may be secured using the playlist smart card via a purchase. The playlist smart card can be traded, downloaded, sold, and/or bartered between two individuals. Typically, the playlist smart card is dedicated to a single function.

A promotions smart card provides privileged access to predetermined events, such as special events. For example, the promotions smart card can bring the end user to a specified location via the electronic network 100 to listen to programmed content. The promotions smart card can be purchased or received free of charge. Typically, the promotions smart card is dedicated for accessing a single function. It is preferred that the promotions smart card be the equivalent of a read-only playlist smart card.

A payment smart card provides a means for paying for content. The payment smart card can store billing information for content purchases absent of credit card information. The ability to purchase or rent content may allow the end user to gain access to new releases or obscure content.

The card organizer display includes a first portion 730 dedicated for preferences smart cards, a second portion 732 dedicated for playlist smart cards, and a third portion 734 dedicated for promotions smart cards. Only three portions are displayed because the payment smart card provides part of the preferences for the end user.

Each of the first portion 730, the second portion 732, and the third portion 734 includes one or more card icons (a respective one being indicated by reference numeral 736). Each of the card icons is user-selectable to select an associated smart card for further action. Each card icon can be selected using a point-and-click operation, or by using one of up scroll controls 740 and one of down scroll controls 742.

Upon clicking on or otherwise selecting a card icon such as the card icon 736, a step of displaying a cover and/or a description of the associated smart card is performed. To view the contents of the smart card, the associated card icon 736 is dragged and dropped to a fourth portion 750 of the display. The fourth portion 750 includes a graphical representation of a card slot 752.

Figure 30:
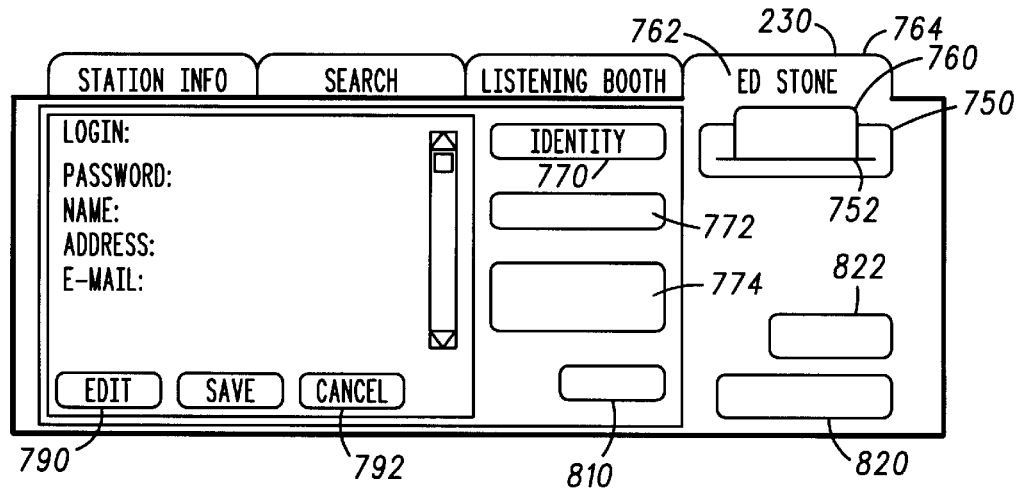
FIG. 30 is an example portion of the interface displayed in response to a drag-and-drop operation.

FIG. 30 is an example portion of the interface displayed in response to the aforementioned drag-and-drop operation. For purposes of illustration and example, a preferences smart card associated with the card icon 736 was dragged and dropped to the fourth portion 750. In response to this operation, a graphical card 760 is displayed within the card slot, a textual name 762 of the smart card is displayed in an oblique font within a graphical tab 764, and the contents of the smart card are displayed over the first portion 730, the second portion 732, and the third portion 734 in FIG. 29.

The textual name 762 in the graphical tab 764 indicates which smart card is active. A function of the player being controlled by the smart card is also displayed in an oblique font. The textual name 762 includes up to fifteen characters of the smart card name. The smart card name can include up to two lines of text to describe the smart card. If the smart card name has more than fifteen characters, the first fifteen characters are displayed, followed by a series of dots.

The preferences smart card has three areas that can be viewed and/or edited. The three areas include an identity area, a defaults area, and a payment options area. A first graphical button 770 is dedicated to receive a user-initiated action to access the identity area. A second graphical button 772 is dedicated to receive a user-initiated action to access the defaults area. A third graphical button 774 is dedicated to receive a user-initiated action to access the payment options area.

As illustrated, FIG. 30 shows a display of the identity area. The identity area includes a plurality of fields to store identity information. The fields can include fields for login information, password information, name information, address information, city information, and an electronic mail address.

Figure 31:
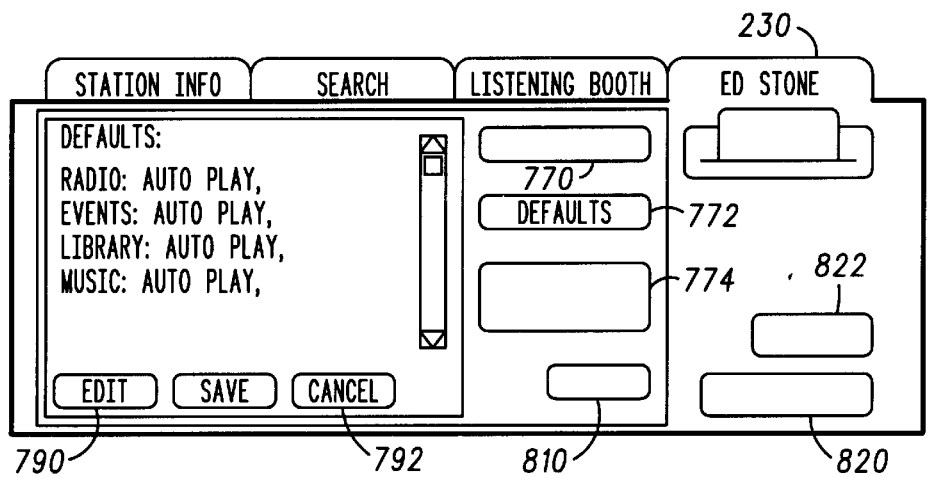
FIG. 31 shows a display of a defaults area initiated upon selecting a second graphical button.

FIG. 31 shows a display of the defaults area initiated upon selecting the second graphical button 772. The defaults area includes information on how to handle specific actions, such as whether to automatically play a selected title from the radio content category, the events content category, the library content category, and the music content category.

Figure 32:
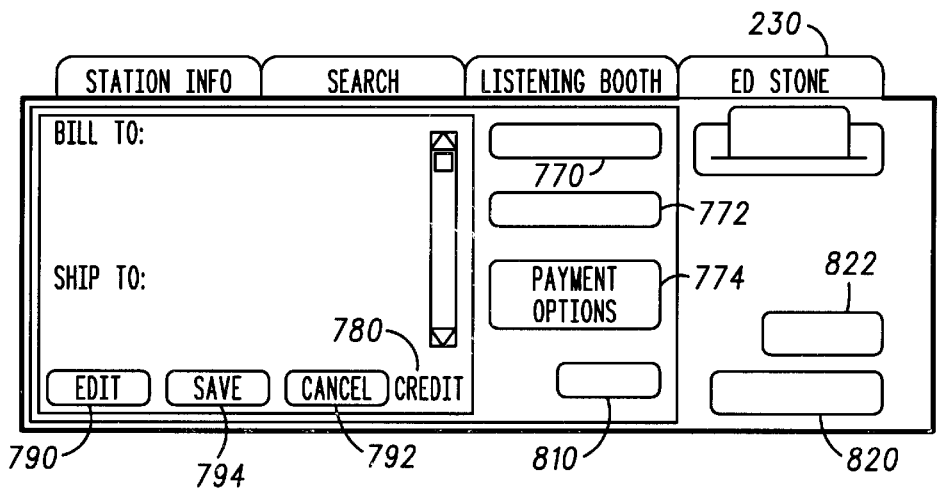
FIG. 32 shows a display of a payment options area initiated upon selecting a third graphical button.

FIG. 32 shows a display of the payment options area initiated upon selecting the third graphical button 774. The payment options area includes a shipping address and a billing address. The payment options area also provides an option 780 for the end user to type a credit card number in order to make a purchase. It is noted that the credit card number is not stored to the player.

With reference to each of FIGS. 29 to 32, an edit button 790 can be selected to edit any of the information associated with the smart card. A cancel button 792 can be selected to cancel the edit. A save button 794 can be selected to save the edited fields. A warning message can be provided to prompt the end user to save edited fields upon an attempt to exit. The end user can reject the warning to cancel all editing activity with the smart card.

Figure 33:
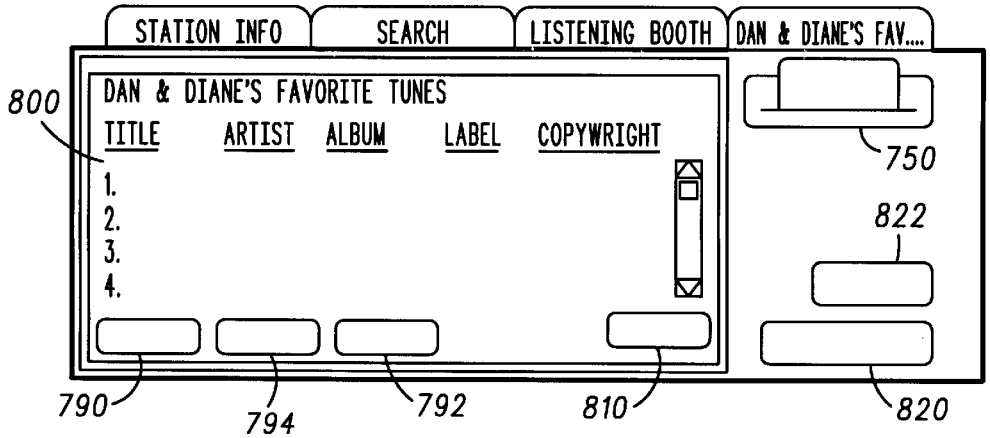
FIG. 33 is an example portion of the interface displayed in response to a drag-and-drop operation of a playlist smart card to the fourth portion.

FIG. 33 is an example portion of the interface displayed in response to a drag-and-drop operation of a playlist smart card to the fourth portion 750. A playlist 800 of a plurality of items is displayed in response to the drag-and-drop operation. The playlist 800 is specific to a predetermined content area. Items can be selected from the playlist 800 for automatic playback, or can be selected using the selector.

Items can be added and deleted from the playlist 800. To add an item, the material is selected using the browser, followed by a selection of the save button 794. Clicking on or otherwise selecting the save button 794 saves all qualifying radio stations, events, or titles to the playlist smart card. Although items can be added and deleted, contents of items within the playlist smart card are not user-editable.

Figure 34:
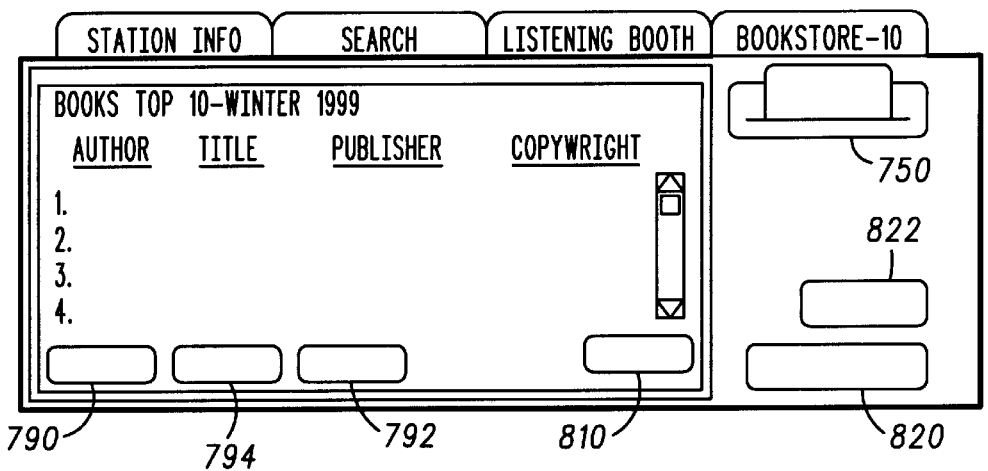
FIG. 34 is an example portion of the interface displayed in response to a drag-and-drop operation of a promotions smart card to the fourth portion.

FIG. 34 is an example portion of the interface displayed in response to a drag-and-drop operation of a promotions smart card to the fourth portion 750. The promotions smart card is similar to a playlist smart card. However, items within the promotions smart card cannot be added, deleted, or edited. Items can be selected from the promotions smart card for automatic playback, or can be selected using the selector.

With reference to FIGS. 30 to 34, a graphical button 810 can be selected to send smart card information in an electronic mail message. Virtual smart card information, stored as a file in the client apparatus 106, is transmitted as a file in the electronic mail message. The electronic mail message can be communicated to another of the plurality of client apparatus 104 via the electronic network 100. If there are unique privileges for the smart card, the smart card information can be deleted at the sending apparatus. Alternatively, communication of the smart card information can be inhibited if there are unique privileges.

A new smart card is created by selecting a graphical button 820 when no smart card is active. In response to receiving a selection of the graphical button 820, a list of options is displayed. The options include an option to create a preferences smart card, an option to create a playlist smart card, and an option to obtain a smart card from an incoming electronic mail message. For a smart card created from an incoming electronic mail message, the type of smart card is dependent upon the type of smart card used to generate the electronic mail message.

By selecting the option to obtain the smart card from an electronic mail message, a directory of possible virtual cards is displayed. The end user can browse the directory to find and select a virtual smart card of interest.

Each of the smart card categories can have a limited number of smart cards. For example, each of the playlist category and the promotions category can be limited to ten smart cards, and the preferences category can be limited to five smart cards. If the limit has been attained, the graphical button 820 is displayed in a second color such as grey rather than black.

The contents of the active smart card can be deleted by selecting a graphical button 822. A message confirming that the contents are to be deleted (such as "are you sure") is displayed prior to deleting the contents.

A graphical button such as an icon 824 can be user-selected to de-select the active smart card in the card slot. The icon 824 includes a graphical eject button. In response to a user-selection of the icon 824, the graphical card 824 is removed from the fourth portion 824, and the formerly active smart card is returned to its position. p A graphical button such as an icon 826 can be user-selected to return to the display of the card organizer. The icon 826 graphically resembles a file folder. It is noted that the active smart card remains active in response to selecting the icon 826.

As described with reference to FIG. 1, the player 142 can provide a second visual interface having a collapsed view. Preferably, in the collapsed view, the tabs for the lower portion of the window including the information control 220, the search control 224, the user feedback control 226, and the smart card control 230 remain visible. A user-initiated selection of any of the controls 220, 224, 226, and 230 directs the player to open the second display region 222, and to initiate a feature associated therewith.

Figure 35:
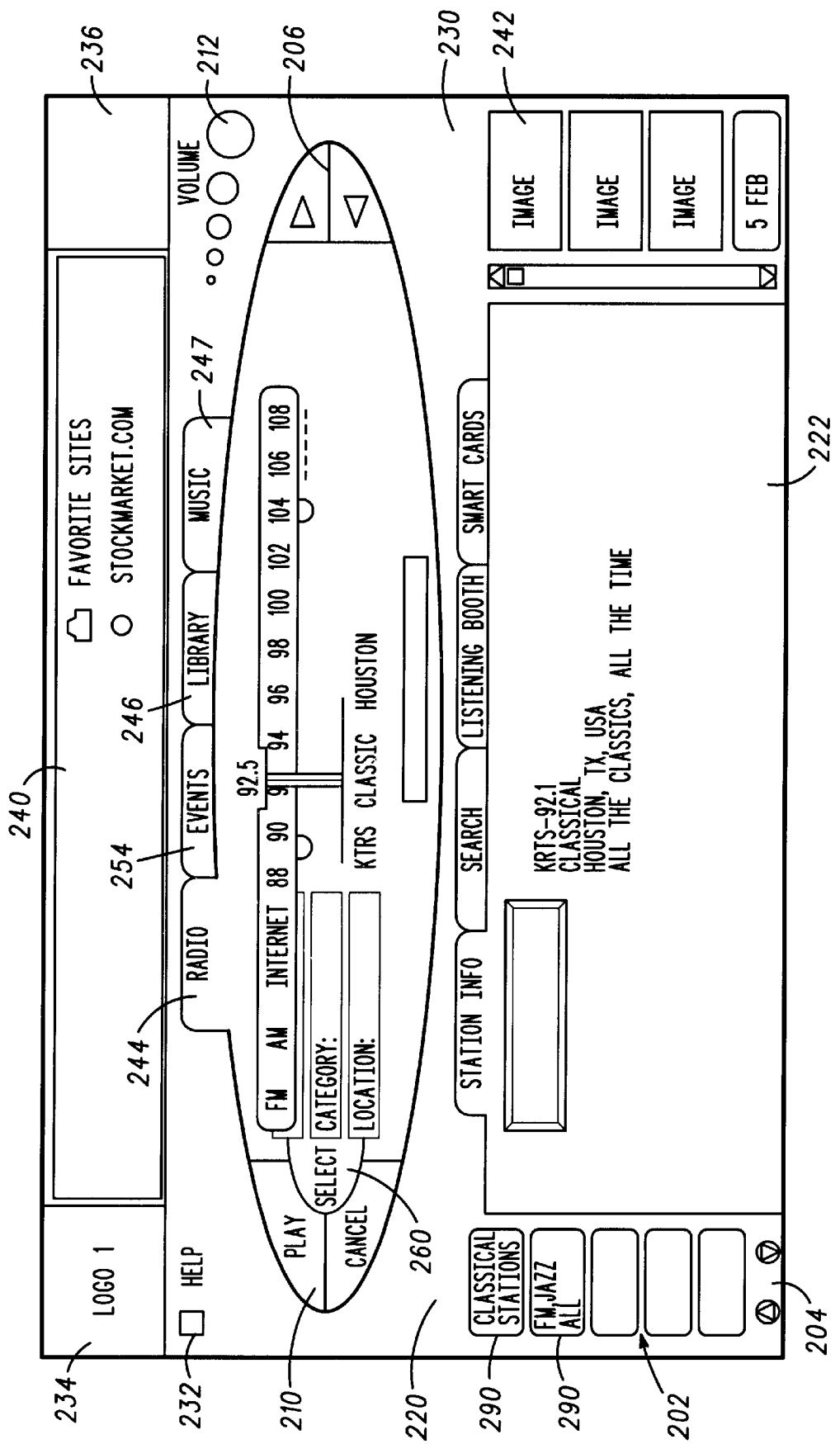
FIG. 35 is a screen shot of a first preferred embodiment of the graphical user interface in the radio content mode.

FIG. 35 is a screen shot of a first embodiment of the graphical user interface in the radio content mode. The default radio station indicated by the graphical marker 332 on the graphical radio dial 330 begins playing upon its selection.

As with the previously-described embodiments, the interface includes the categorical selection controls 244, 245, 246, and 247, the preset selection indicators 202, the preset selection controls 204, the advance/review controls 206, the playback controls 210, the volume controls 212, the selection attribute indicators 214, the streaming indicator 216, the first display region 218, the information control 220, the second display region 222, the search control 224, the user feedback control 226, the smart card control 230, the help mode control 232, the first logo 234, the second logo 236, the advertising window 240, and the attractions window 242. The user feedback control 226 provides access to chat features in this embodiment.

Figure 36:
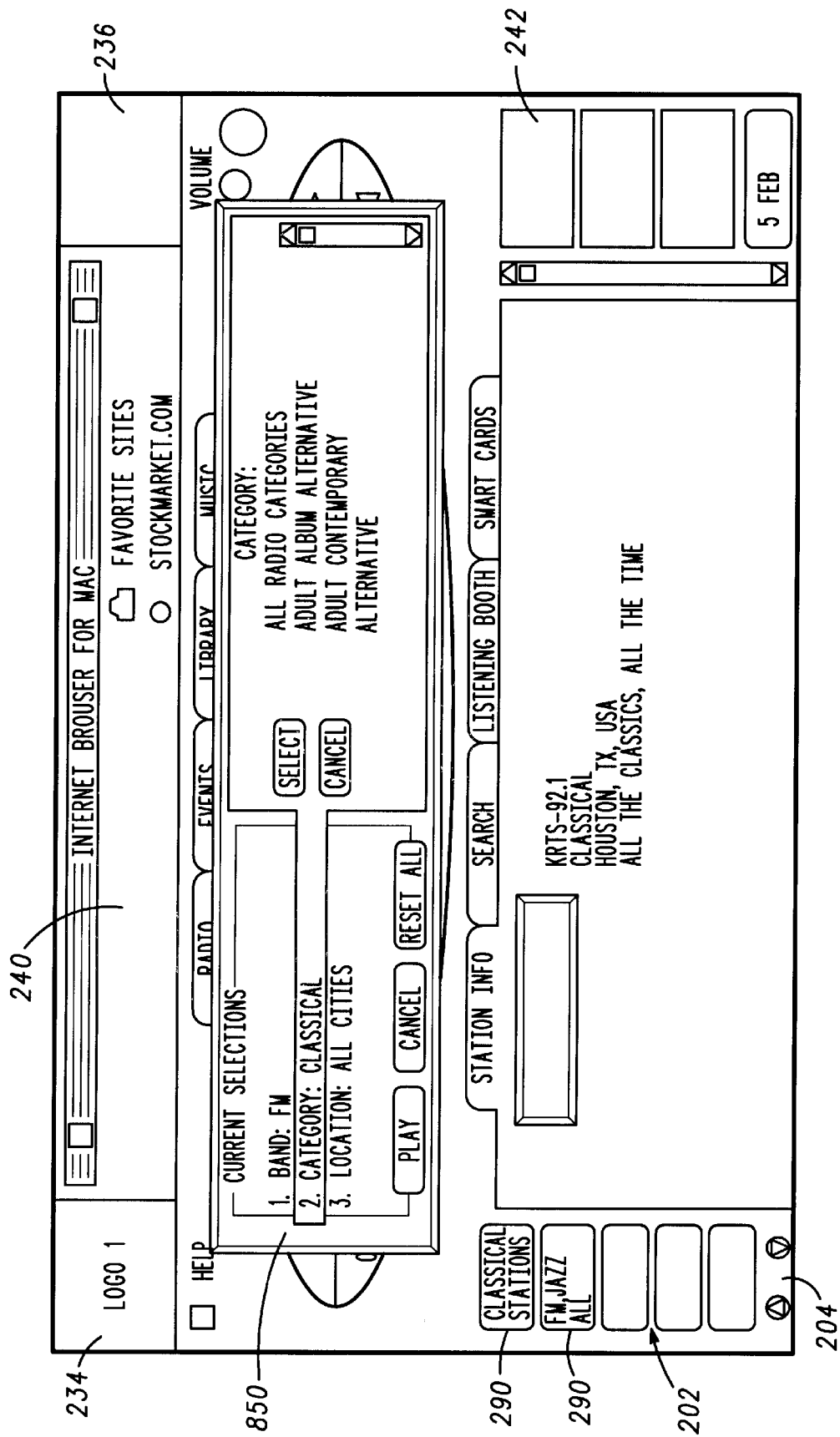
FIG. 36 is a screen shot showing a content selection interface in the first preferred embodiment.

FIG. 36 is a screen shot showing a content selection interface in the first preferred embodiment. A window 850 opens upon clicking the select button 260 or any of the attributes that define the dial at the time.

Figure 37:
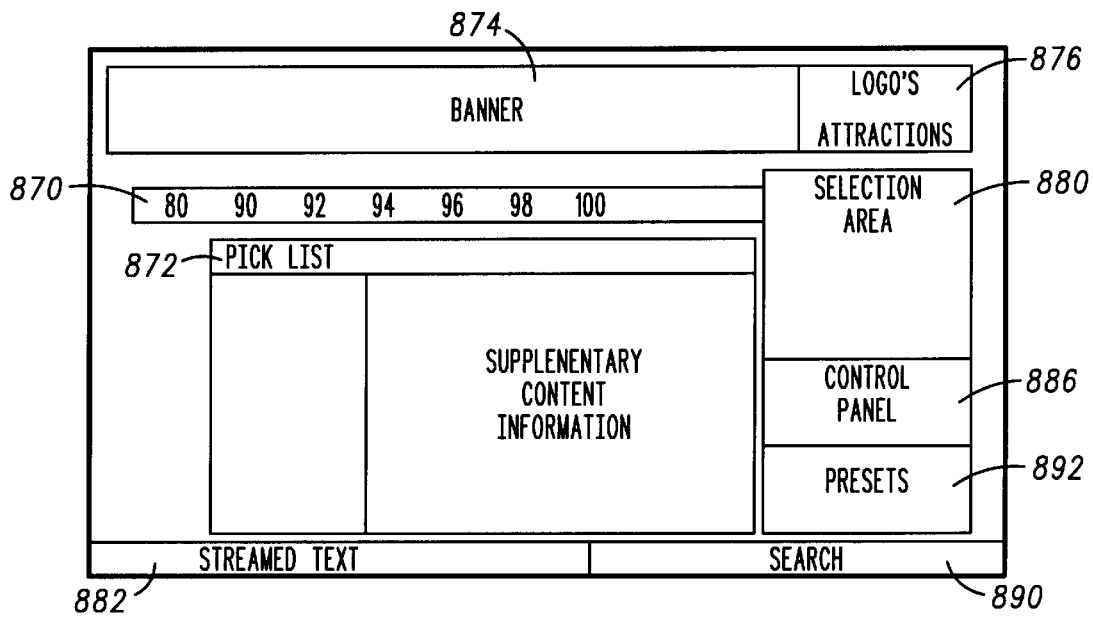
FIG. 37 is a screen shot of a second preferred embodiment of the graphical user interface.

FIG. 37 is a screen shot of a second preferred embodiment of the graphical user interface. The second preferred embodiment may be programmed in a markup language such as HTML, in comparison to the first preferred embodiment which may include plug-in-specific code to provide animation (such as Shockwave code).

A radio dial 870 spatially displays the band and location of all available stations that match selected criteria. A station pick list 872 allows for a user selection of all stations from the radio dial 870. A banner 874 displays banner advertisements that rotate in accordance with a predetermined schedule. A region 876 displays logos and attractions that rotate in accordance with a predetermined schedule. A selection area 880 provides categorical selection controls and player function controls. A region 882 displays streamed and clickable text that can include attractions and advertisments. An information space 884 displays supplementary information about the current content, including schedules, links to other destinations and feedback. A control panel 886 indicates and controls play, pause, volume, and streaming status. A region 890 is dedicated for entering a keyword to perform a search for content using a single click. A region 892 is dedicated for display and management of presets with one set of presets per end user.

Figure 38:
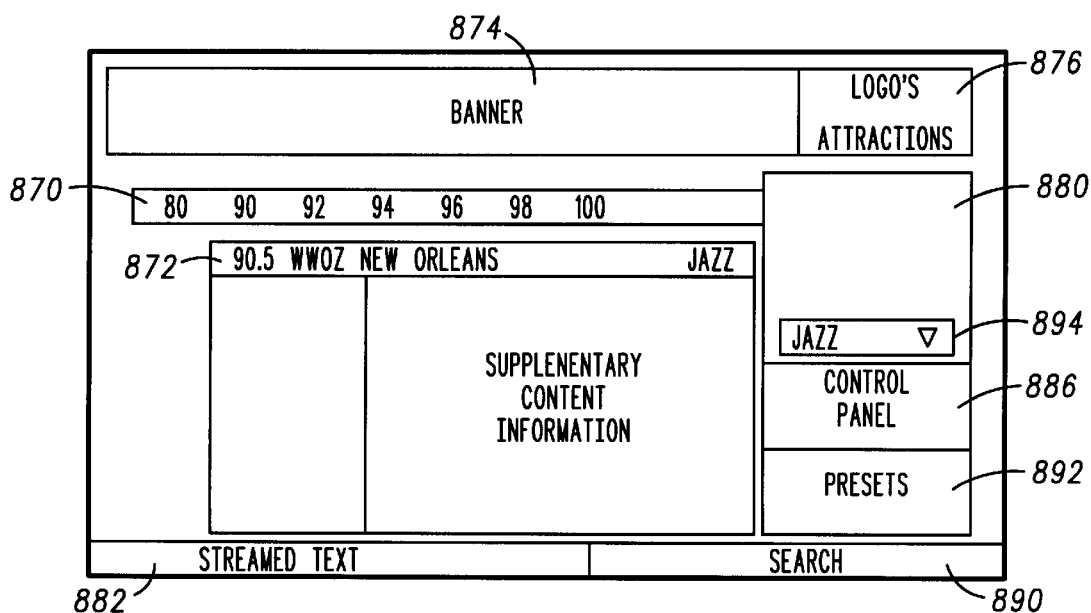
FIG. 38 is a screen shot of the second preferred embodiment in a radio player mode.

FIG. 38 is a screen shot of the second embodiment in a radio player mode. Upon receiving a user-initiated selection of a selection attribute (band, category, or location) in the selection area 880, a pick list 894 of available options is populated from a database. To speed in the process of selecting material, the interface is absent of a submit button. Therefore, as soon as the end user releases a mouse button over an item in the pick list 894, the item is selected.

Figure 39:
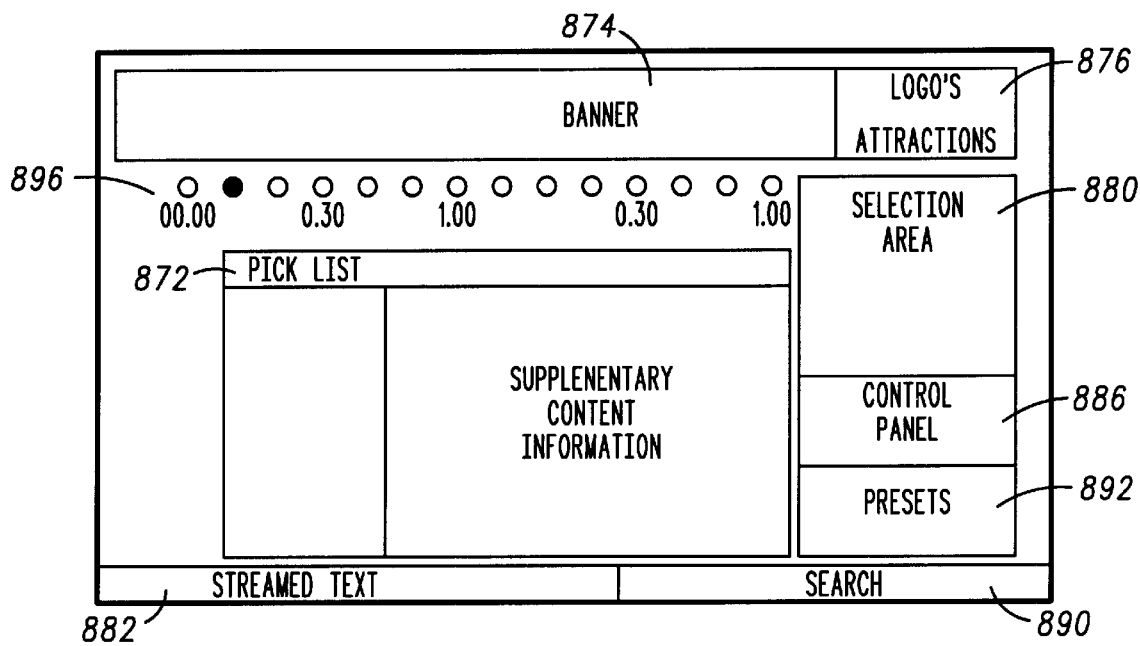
FIG. 39 is a screen shot of the second preferred embodiment in an events player mode.

FIG. 39 is a screen shot of the second embodiment in an events player mode. Radio buttons 896 indicate a current position within an event or another time-based selection relative to an entire length of time. Selecting events, spoken audio, and music is facilitated in the selection area 880. Upon selecting a content category (either live events, spoken audio, or music collection), the end user is prompted to select two attributes to narrow or filter the content to list of manageable length.

It is noted that embodiments of the graphical user interface can change in a region-dependent manner (e.g. dependent upon the location of the client apparatus 106). For example, the FM broadcast spectrum (which differs for different regions in the world) can depend upon the location of the client apparatus 106. Further, textual information can be displayed in one of a plurality of languages in dependence upon the location of the client apparatus 106.

It is also noted that alternative controls can be provided to control settings and parameters of the herein-described embodiments of graphical user interfaces. These graphical controls include, but are not limited to, graphical buttons, checkboxes, radio buttons, scroll bars, slider bars, pop-up menus, and dialog boxes. Further, alternative indicators can be provided to display information in embodiments of the graphical user interfaces.

Other options that can be included in embodiments of the present invention are as follows.

A physical login card can be sent to a new end user after each login creation. The physical login card can allow for advertisements that transcend the content (e.g. regularly scheduled programming or collections).

Prior to initiating playback or providing a login screen, a tip-of-the-day can be provided to promote features of the graphical user interface.

An event-of-the-day or a feature-of-the-day can be broadcast for display at the second display region 222. In response to a click operation or another user-initiated action, other information can be displayed in the second display region 222.

A station-of-the-day can be broadcast for display in a manner similar to the aforementioned feature-of-the-day. A list of featured stations based on sets rather than individual stations can be provided (e.g. a famous individual's favorite stations).

A music critic feature allows end users to comment on music and other content to create a collaborative filtering product.

A special preset such as a mystery preset of the day can be provided in the set of presets. This preset can be the first preset in the set, for example.

Presets can have expiration dates. For example, an events preset may expire after a predetermined expiration date.

An advertising slot machine can be provided. The advertising slot machine can be provided by a JAVA applet that rotates attractions as a slot machine in the advertising window 240. The attractions can be rotated randomly. If three like advertisements align, the end user can win a prize.

A separate attractions window can be provided. In this case, the end user can click on an image associated with content to retrieve information for the content. An option to play or not to play the content is provided to the end user. The end user can make his/her decision to play or not to play based upon the information.

Alternative content can be transmitted in cases such as a blackout period or when there is a technical difficulty.

Figure 40A:
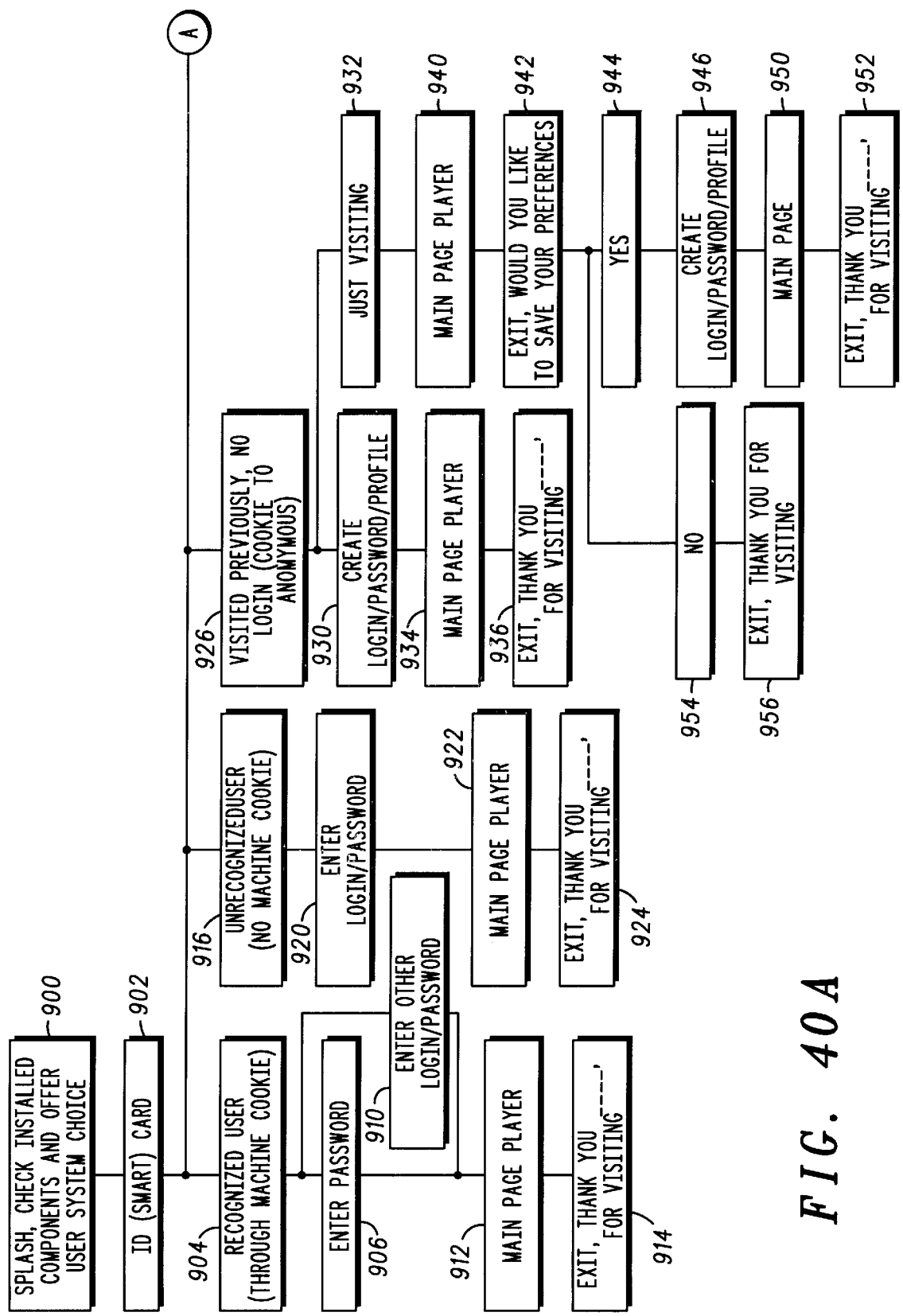
FIGS. 40A and 40B are flow charts of an embodiment of a method of providing the graphical user interface.
Figure 40B:
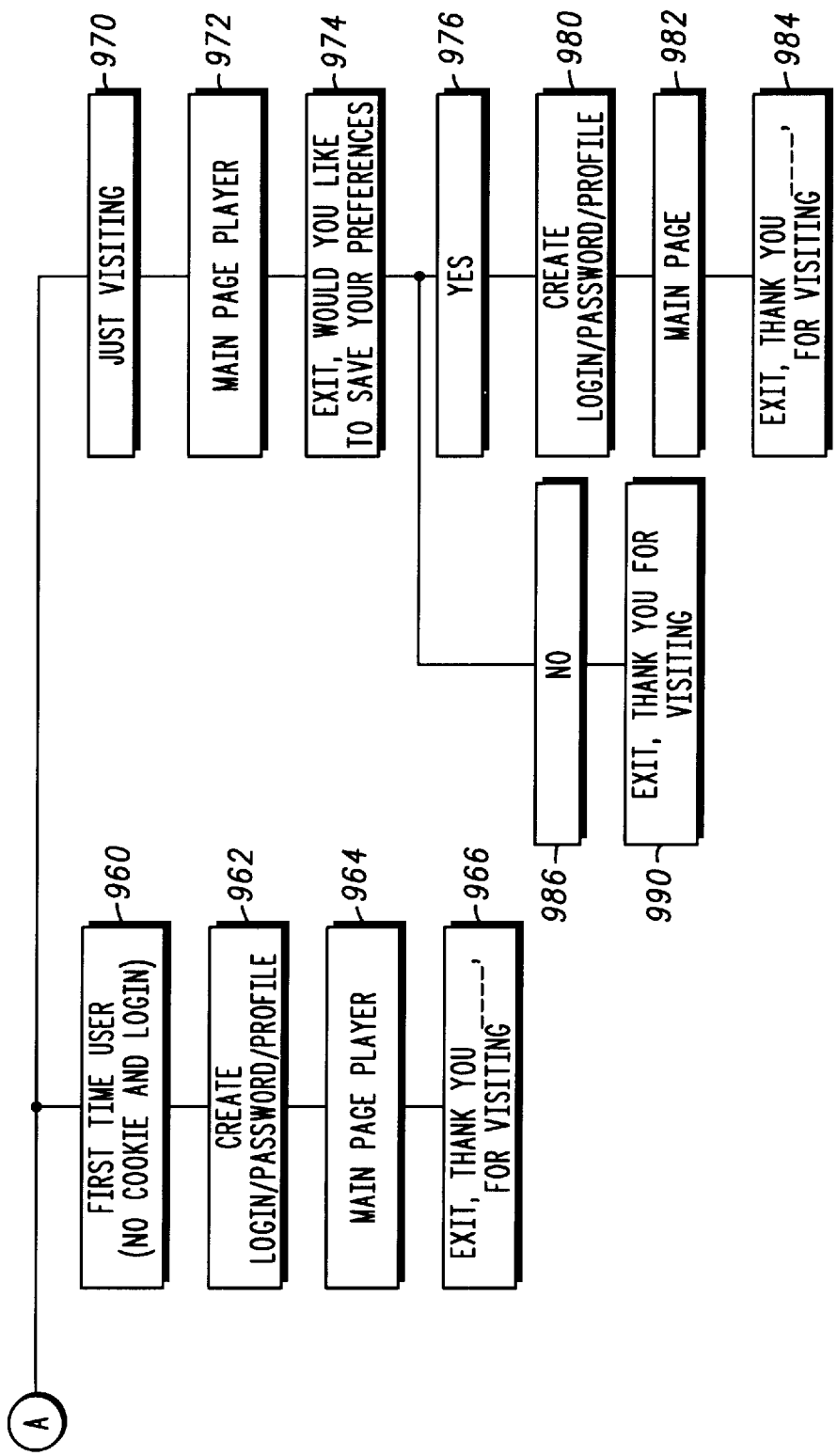

FIGS. 40A and 40B are flow charts of an embodiment of a method of providing the graphical user interface. As indicated by block 900, steps of verifying that necessary components are installed at the client apparatus 106 and offering system choices to an end user are performed. As indicated by block 902, a step of determining if a smart card (physical or virtual) identifying the end user is present at the client apparatus 106.

If the end user is a recognized user (block 904), then a step of entering a password (block 906) or a step of entering a login and a password (block 910) is performed. Thereafter, a main page of the graphical user interface is provided (block 912). Upon completion of the player, an exit message is communicated (block 914) to the client apparatus.

If the end user is an unrecognized user (block 916), then a step of entering a login and a password (block 920) is performed. Thereafter, a main page of the graphical user interface is provided (block 922). Upon completion of the player, an exit message is communicated (block 924) to the client apparatus.

If the end user has previously visited without logging in (block 926), then either a step of creating a login and a password (block 930) or a step of selecting a visiting mode (block 932) is performed. If a login and a password are created (block 930), a main page of the graphical user interface is provided (block 934). Upon completion of the player, an exit message is communicated (block 936) to the client apparatus.

If the visiting mode was selected (block 932), a main page of the graphical user interface is provided (block 940). Upon completion of the player, a first exit message is communicated (block 942) to the client apparatus. The first exit message provides options to save or not to save preferences generated during a session of the player. If an option to save the preferences is selected (block 944), steps of creating a login/password profile (block 946) and returning to the main page (block 950) are performed. Thereafter, upon completion of the player, a second exit message is communicated to the client apparatus (block 952). If an option to not save the preferences is selected (block 954), a second exit message is communicated to the client apparatus (block 956).

If the end user is a first time user (block 960), then a step of creating a login and a password (block 962) and a step of providing a main page of the graphical user interface (block 964) are performed. Upon completion of the player, an exit message is communicated (block 966) to the client apparatus 106.

If the end user is a first time user who selects a visiting mode (block 970), a main page of the graphical user interface is provided (block 972). Upon completion of the player, a first exit message is communicated (block 974) to the client apparatus. The first exit message provides options to save or not to save preferences generated during a session of the player. If an option to save the preferences is selected (block 976), steps of creating a login/password profile (block 980) and returning to the main page (block 982) are performed. Thereafter, upon completion of the player, a second exit message is communicated to the client apparatus (block 984). If an option to not save the preferences is selected (block 986), a second exit message is communicated to the client apparatus (block 990).

If an invalid login and/or password is received in any of the above-described steps of receiving a login and a password, a message is communicated to the client apparatus 106. The message can include a message such as "Invalid Login/Password" and/or "Please Try Again". Thereafter, a step of receiving another login and password can be performed.

If a blank text entry field is received, a message is communicated to the client apparatus 106. The message can include a message such as "Please fill in all text fields". Thereafter, a step of receiving subsequent textual data can be performed.

The step of creating a login provides a dialog to query for demographic and listening preference information from the end user. The end user enters information in response to the queries. Typically, the information is entered during an initial use of the player, such as upon an initial arrival at a Web site associated with the player. The initial arrival at the Web site can be initiated by the end user clicking on a banner advertisement or another hyperlink from another Web site.

The information is retrieved for each subsequent visit or use to uniquely identify the end user, and to tailor the graphical user interface and/or the playback performed thereby to the end user. Further, the information allows listening habits, such as radio stations and music tastes, to be tracked.

Figure 41:
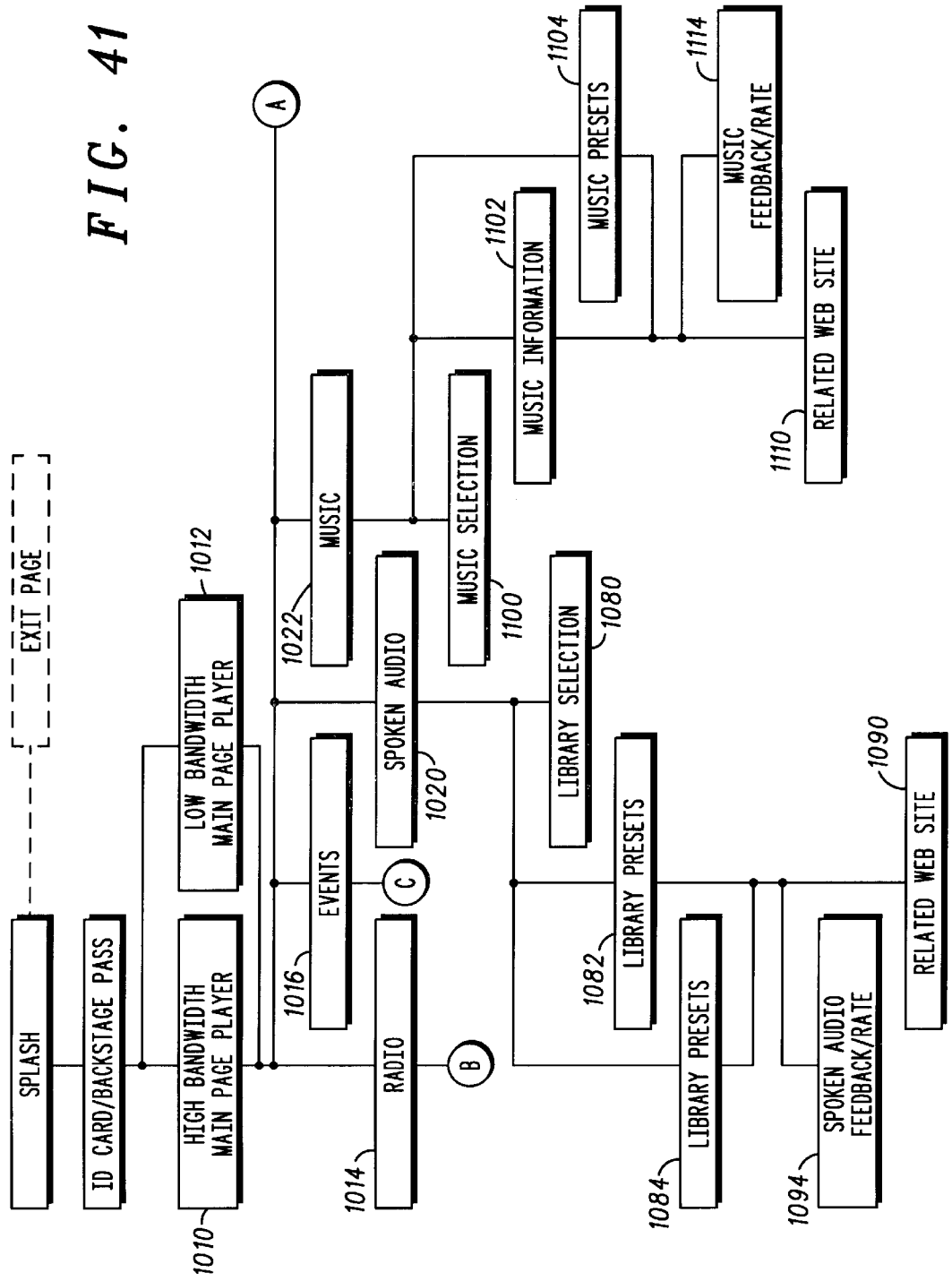
FIGS. 41 to 43 are block diagrams summarizing a site map for an embodiment of the graphical user interface.
Figure 42:
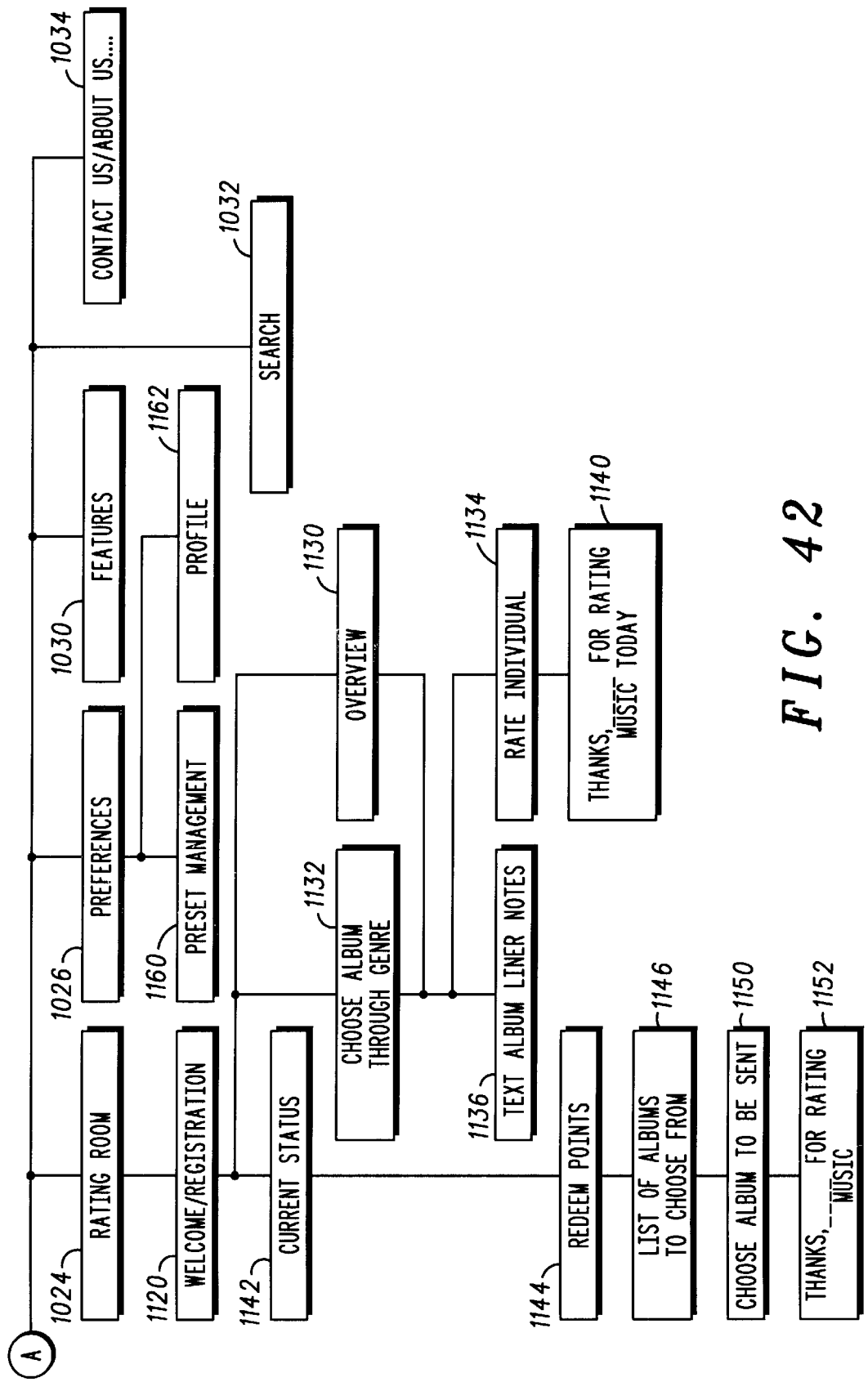
Figure 43:
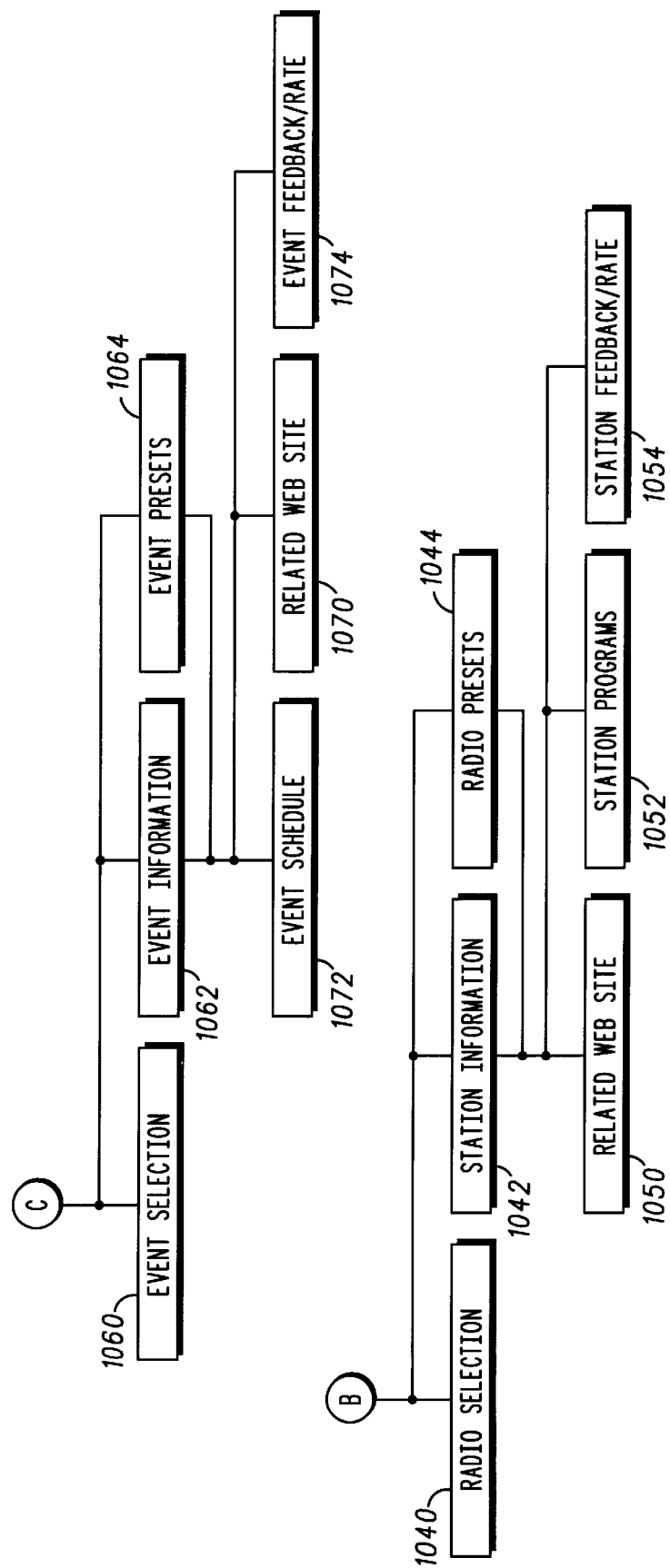

FIGS. 41 to 43 are block diagrams summarizing a site map for an embodiment of the graphical user interface. The site map illustrates potential user-selectable flow paths between different features of the graphical user interface.

The end user can select between a high bandwidth interface (block 1010) and a low bandwidth interface (block 1012) for the audio player. For example, the high bandwidth interface may include code specific for an animation plug-in, such as Shockwave, whereas the low bandwidth interface may include only HTML code. Thereafter, a main page of the interface is provided in accordance with the user-selected bandwidth.

From the main page, the end user can navigate to a radio content feature (block 1014), an events content feature (block 1016), a library content feature (block 1020), a music content feature (block 1022), a rating room (or listening booth) feature (block 1024), a preferences feature (block 1026), a features feature (block 1030), a search feature (block 1032), and a contact feature (block 1034).

Using the radio content feature (block 1014), a radio station can be selected (block 1040), station information can be obtained (block 1042), and a radio preset can be selected (block 1044). Thereafter, a link to related Web site can be provided (block 1050), a list of station programs can be provided (block 1052), and station feedback can be received (block 1054).

Using the event content feature (block 1016), an event can be selected (block 1060), event information can be obtained (block 1062), and an event preset can be selected (block 1064). Thereafter, a link to related Web site can be provided (block 1070), an event schedule can be provided (block 1072), and event feedback can be received (block 1074).

Using the library content feature (block 1020), library content can be selected (block 1080), library content information can be obtained (block 1082), and a library content preset can be selected (block 1084). Thereafter, a link to related Web site can be provided (block 1090) and content feedback can be received (block 1094).

Using the music content feature (block 1022), music content can be selected (block 1100), music content information can be obtained (block 1102), and a music content preset can be selected (block 1104). Thereafter, a link to related Web site can be provided (block 1110) and content feedback can be received (block 1114).

Using the rating room feature (block 1024), a welcome message and a registration process is provided (block 1120). Once the end user is registered, an overview of the rating room feature can be displayed (block 1130), an album can be selected in dependence upon a user-selected genre (block 1132), the album can be rated by the end user (block 1134), the information associated with the album can be displayed (block 1136), and an exit message can be displayed (block 1140) upon exiting the rating room feature. Further, a status of the end user's cumulative rating points can be displayed (block 1142), points can be redeemed (block 1144), a list of albums to receive in return for the points can be displayed (block 1146), an album from the list can be selected (block 1150), and an exit message can be displayed (block 1152).

Using the preferences feature (block 1026), presets can be managed (block 1160), and a profile can be displayed and edited (block 1162).

Figure 44:
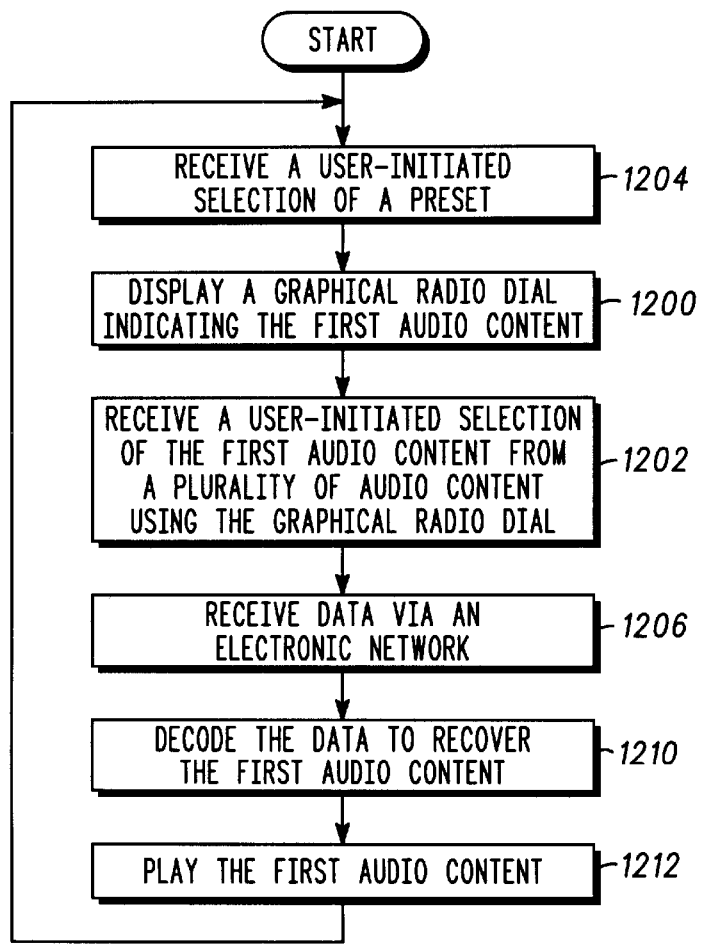
FIG. 44 is a flow chart summarizing steps performed in an embodiment of a method of playing first audio content using a computer.

FIG. 44 is a flow chart summarizing steps performed in an embodiment of a method of playing first audio content using a computer. As indicated by block 1200, a step of displaying a graphical radio dial indicating the first audio content is performed. As described earlier, the graphical radio dial can include an alphabetical scale and a graphical pointer. In this case, the graphical pointer can be positioned with respect to the alphabetic scale based upon text identifying the first audio content. Alternatively, the graphical radio dial can indicate an over-the-air frequency associated with the first audio content. In this case, the graphical radio dial can include a numerical scale and a graphical pointer, wherein the graphical pointer is positioned with respect to the numerical scale based upon the over-the-air frequency.

Optionally, the method includes a step of receiving a user-initiated selection of the first audio content from a plurality of audio content using the graphical radio dial (as indicated by block 1202). The step of receiving the user-initiated selection can include receiving a user-initiated action to navigate to the first audio content from second audio content adjacently indicated by the graphical radio dial.

As described earlier, the graphical radio dial can include a plurality of marks associated with a plurality of audio content having at least one attribute. For broadcasts, the at least one attribute includes at least two of a category attribute, a band attribute, and a location attribute. The band attribute can indicate one of an AM band, an FM band, and an Internet band for broadcasts. Optionally, a step (block 1204) of receiving a user-initiated selection of a preset associated with the at least one attribute is performed.

The plurality of marks includes a first mark associated with the first audio content. In this case, the step of receiving the user-initiated selection of the first audio content can comprise steps of receiving the at least one attribute, determining the plurality of audio content based upon the at least one attribute, and receiving a user-initiated selection of the first mark.

As indicated by block 1206, a step of receiving data via an electronic network is performed. The data encodes the first audio content. If the data includes streamed data received via the Internet, the method further comprises the step of decoding the streamed data, as indicated by block 1210. As indicated by block 1212, a step of playing the first audio content is performed.

Figure 45:
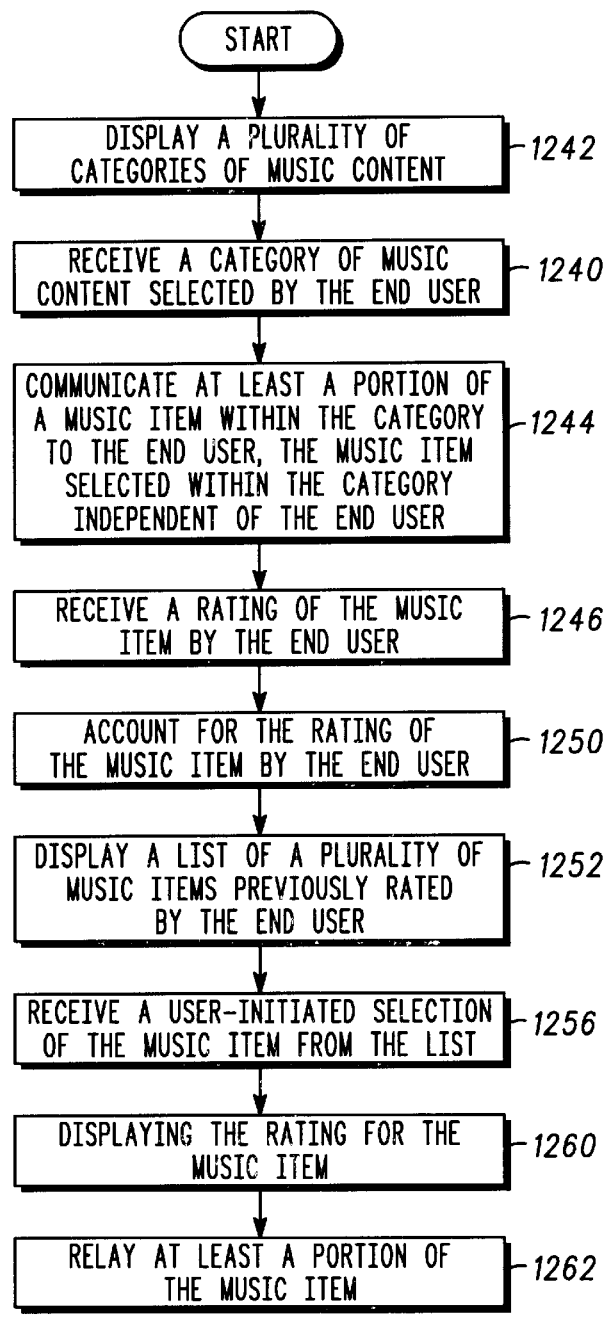
FIG. 45 is a flow chart summarizing steps in an embodiment of a method of obtaining user feedback to music content.

FIG. 45 is a flow chart summarizing steps in an embodiment of a method of obtaining user feedback to music content. As indicated by block 1240, a step of receiving a category of music content selected by an end user is performed. Optionally, a step of displaying a plurality of categories of music content is performed (block 1242) prior to the step indicated by block 1240. In this case, the category of music content is selected by the end user from the plurality of categories. As another option, a step of determining the plurality of categories based upon a listening behavior of the end user is performed. A further option is to have the plurality of categories be dependent upon at least one preference of the end user.

As indicated by block 1244, a step of communicating at least a portion of a music item within the category to the end user is performed. The music item is selected within the category independent of the end user. If the music item includes an album including a plurality of songs, the step of communicating at least a portion of the music item can include communicating limited duration samples of the plurality of songs.

As indicated by block 1246, a step of receiving a rating of the music item by the end user is performed. As indicated by block 1250, a step of accounting for the rating of the music item by the end user is performed. The step of accounting for the rating of the music item can include maintaining a count of music items rated by the end user. In this case, the method can further comprise the step of determining if the count attains a threshold. This step is performed to determine if the end user has qualified for a complimentary copy of music.

Optionally, a step of displaying a list of a plurality of music items previously rated by the end user is performed (block 1254). The list can include the music item whose rating was received in block 1246. Steps of receiving a user-initiated selection of the music item from the list (block 1256), displaying the rating for the music item (block 1260), and replaying at least a portion of the music item (block 1262) may be performed also.

Figure 46:
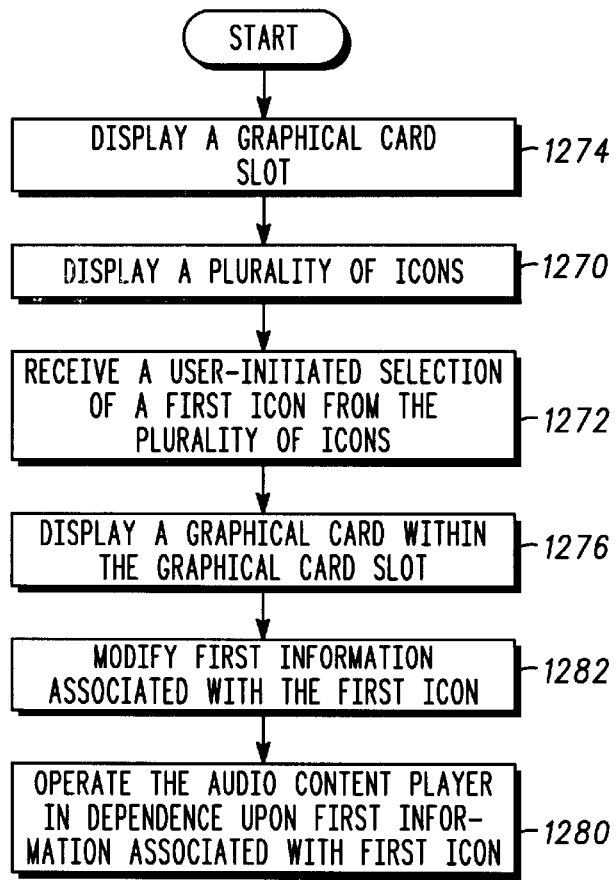
FIG. 46 is a flow chart summarizing steps in an embodiment of a method of assisting operation of an audio content player.

FIG. 46 is a flow chart summarizing steps in an embodiment of a method of assisting operation of an audio content player. As indicated by block 1270, the method includes a step of displaying a plurality of icons including at least one icon associated with user information and at least one icon associated with playlist information. Optionally, the plurality of icons includes at least one icon associated with privileged access to audio content.

As indicated by block 1272, a step of receiving a user-initiated selection of a first icon from the plurality of icons is performed. The first icon can be associated with at least one of an actual smart card and a virtual smart card. The step of receiving the user-initiated selection can include receiving a user-initiated drag action of the first icon to a portion of a display. In this case, steps of displaying a graphical card slot at the portion of the display (block 1274) and displaying a graphical card within the graphical card slot in response to the user-initiated drag action (block 1276) can be performed.

As indicated by block 1280, the method includes a step of operating the audio content player in dependence upon first information associated with the first icon. If the first icon is associated with privileged access to audio content, the step of operating the audio content player can include providing privileged access to audio content. If the first icon is associated with playlist information, the step of operating the audio content player can include playing at least a portion of a playlist.

Optionally, the method further comprises the step of modifying the first information associated with the first icon (step 1282). In this case, the audio content player is operated in dependence upon modified first information in block 1280. If the first icon is associated with user information, the step of modifying the first information can include modifying user identity information, modifying a default for automatic playback, or modifying a payment option. If the first icon is associated with playlist information, the step of modifying the first information can include adding an item to a playlist or deleting an item from a playlist.

It is noted that the herein-described methods can performed by a computer (which may be included with the client apparatus 106 and/or the server 102). Further, the computer can be directed to perform the herein-described methods by computer-readable data stored by a computer-readable storage medium.

Figure 47:
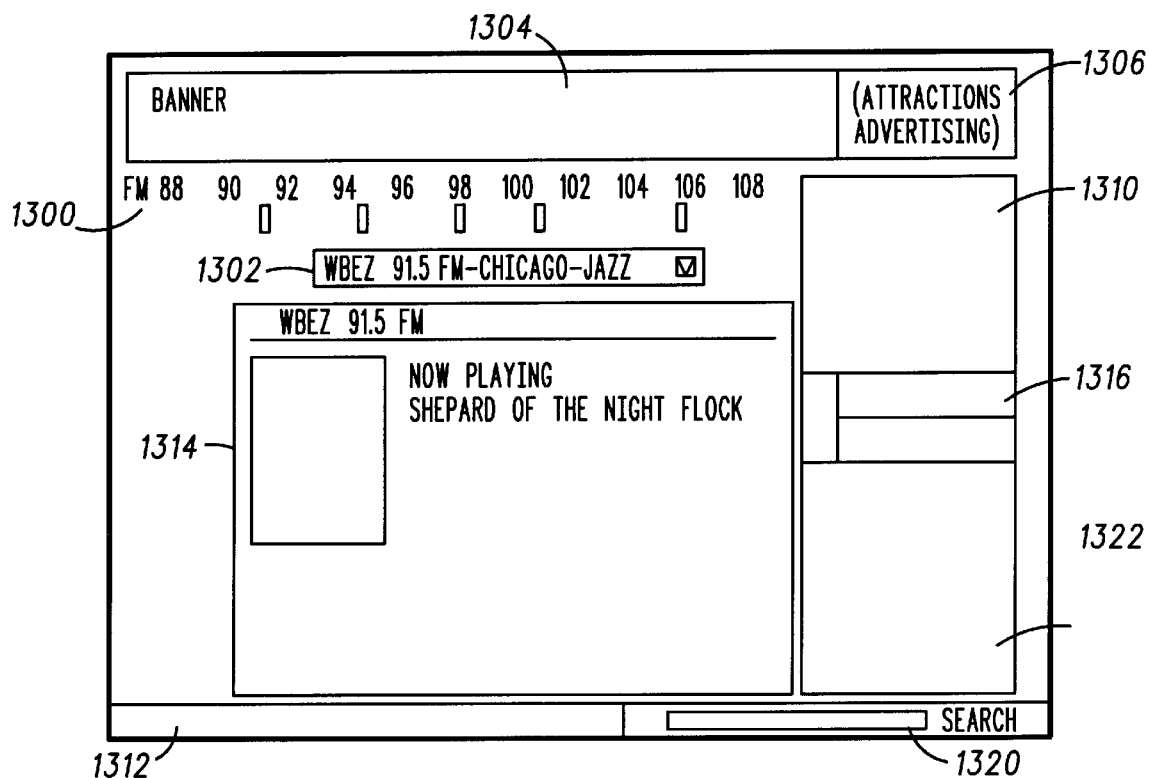
FIG. 47 is a screen shot of a third embodiment of the graphical user interface.

FIG. 47 is a screen shot of a third embodiment of the graphical user interface. A radio dial 1300 spatially displays the band and location of all available stations that match selected criteria. A station pick list 1302 allows for a user selection of any of the stations from the radio dial 1300. A banner advertising region 1304 displays banner advertisements that rotate in accordance with a predetermined schedule. An attractions region 1306 displays logos and attractions that rotate in accordance with a predetermined schedule. A selection area 1310 provides categorical selection controls and player function controls. A region 1312 displays streamed and clickable text that can include attractions and advertisements.

An information space 1314 displays supplementary information about the current content, including schedules, links to other destinations and feedback. In general, any visual content can be combined with the audio content for display in the information space 1314. Preferably, the information space 1314 provides a title of the audio content being played (e.g. the title "Shepherd of the Night Flock" of a song being played by the radio station WBEZ), a title and an image of an album containing the audio content (e.g. the album title "Blue Nance"), a name of an artist associated with the audio content (e.g. the name of the performer of the song: "The Junior Mance Trio"), and a name and a logo of an entity associated with the audio content (e.g. a copyright notice for Chiaroscuro Records which is the label for the song, and its logo).

A user-initiated selection of the title of either the album or the image of the album can initiate a display of information associated with the album (e.g. liner notes, performance credits, and other information) and/or a playback of audio samples from the album. A user-initiated selection of the name of the artist can initiate a display of information associated with the artist. A user-initiated selection of either the name of the entity or the entity logo can initiate a display of information associated with the entity (e.g. information of other albums and audio content provided by the entity). Each of the aforementioned information can be provided either by the server 102 or by hyperlinking to other destinations of the electronic network 100 (e.g. Web pages for the album, artist, and entity).

It is also preferred that the information space 1314 includes an option to buy the audio content being played (e.g. the option "buy now"), an option to display a program guide for the radio station playing the audio content (e.g. the option "program guide" to display information for WBEZ), and an option to provide user feedback (e.g. the option "user feedback").

A control panel 1316 indicates and controls play, pause, volume, and streaming status. A region 1320 is dedicated for entering a keyword to perform a search for content using a single click.

A region 1322 is dedicated for display and management of presets with one set of presets per end user. The region 1322 provides an option to create a new login, i.e. to create a new end user preferences and profile. The region 1322 further provides an option to load preferences associated with an end user.

Figure 48:
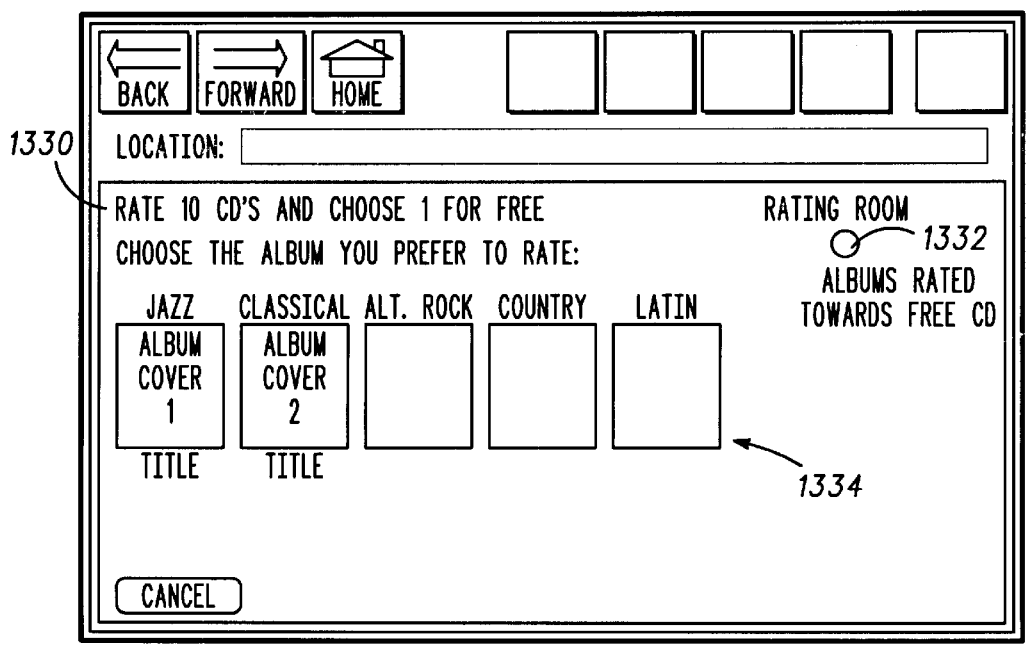
FIG. 48 is an example of a first display in a preferred embodiment of a listening booth or rating room feature.

FIG. 48 is an example of a first display in an embodiment of a listening booth or rating room feature. The rating room feature can be activated in response to receiving a user-initiated selection of the user feedback control 226 or another link thereto. The link can include information indicating an amount of audio items (e.g. music items) to rate and an amount of rating time which are to be satisfied to receive complimentary music. For example, textual information such as "you have 15 days left to rate 6 more CD's in order to choose one free" can be associated with the link.

Preferably, the link is provided in a main graphical page provided by the player. In this case, if the end user sets his/her browser program to an electronic address associated with the player, the main page is displayed upon initiation of the browser program. Additionally, as the main page downloads to the end user, the personal profile of the end user created at an initial login is retrieved. The personal profile uniquely identifies the end user as he/she navigates through the player.

The display includes an option 1330 to display rules and regulations for receiving a complimentary item, such as a complimentary music item. The option 1330 can include, for example, textual information indicating a portion of the rules and regulations such as "Rate 10 CDs and Choose 1 Free".

The display includes an option 1332 to review which audio items have been previously rated by the end user. The option 1332 can include textual information indicating a number of music items previously rated by the end user. For example, the textual information can include "4 albums rated towards free CD". Alternatively, the option 1332 can include textual information indicating a remaining number of items to rate before receiving a complimentary item such as a complimentary music item.

The display includes a plurality of options 1334 for categories or genres of music content. For example, the categories can include jazz, classical, alternative rock, country and latin. It is noted that other categories of music content may be displayed in addition to or as alternatives to the aforementioned categories. The categories can be dependent upon the personal profile or preferences of the end user collected when the user profile is created. Alternatively, the categories can be dependent upon the end user's listening behavior using the player. In this case, the categories are selected to best represent the current listening habits of the end user.

An artist name, a title, and a cover art image of an item, such as an album, are displayed for each category. Preferably, the end user does not influence which item is displayed for the category.

Figure 49:
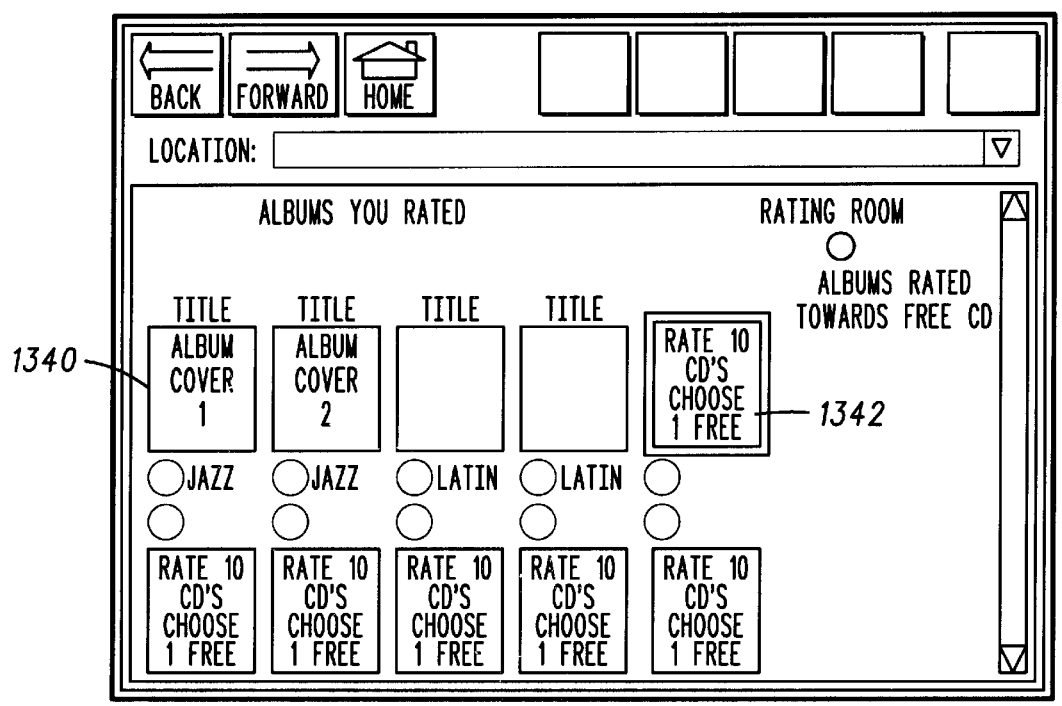
FIG. 49 is an example of a second display for reviewing rated items in an embodiment of a listening booth or rating room feature.

FIG. 49 is an example of a second display for reviewing rated items in a preferred embodiment of a listening booth or rating room feature. The second display is provided in response to receiving a user-initiated selection of the option 1332 to review which items have been previously rated by the end user. The second display includes a plurality of item regions. The number of item regions corresponds to a total number of items which must be rated in order to receive a complimentary item. For example, ten item regions corresponding to ten total audio items to rate to receive a complimentary item are illustrated in FIG. 49.

Information associated with each previously-rated item is displayed in a corresponding item region (a representative one indicated by reference numeral 1340). The information can include an artist, a title, an image such as an album cover, and a category for the item. For example, four of the ten item regions have information displayed to identify four previously-rated items for the end user. Each item region corresponding to a previously-rated item includes a user-selectable portion. In response to receiving a user-initiated selection of the portion (such as the album cover), additional information associated with the item is displayed. The additional information can include a complete media file including a complete track list with rating scores for the songs rated, promotional information, liner notes, lyrics, and credits.

Remaining ones of the item regions (a representative one indicated by reference numeral 1342) can be user selected to return to the main selection page (such as in FIG. 48). Rather than item information, the remaining ones of the item regions can have textual information indicating a portion of the rules and regulations such as "rate 10 CDs choose 1 free". For example, six item regions corresponding to six more music items to be rated before receiving the complimentary item are absent of item information in FIG. 49.

Figure 50:
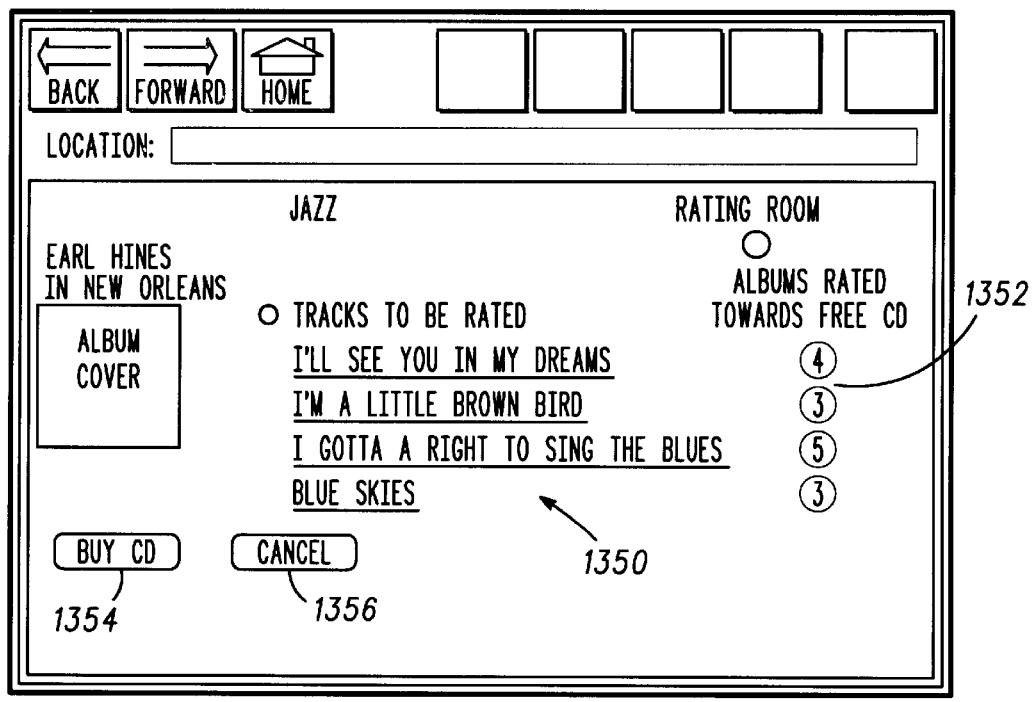
FIG. 50 is an example of a third display for rating an item in a preferred embodiment of a listening booth or rating room feature.

FIG. 50 is an example of a third display for rating an item in an embodiment of a listening booth or rating room feature. The third display is provided in response to receiving a user-initiated selection of one of the options associated with categories of music content. For purposes of illustration and example, a user-initiated selection of the option associated with the jazz category in FIG. 48 is considered.

The third display includes information associated with the item to be rated. The information includes the artist (e.g. Earl Hines), the title (e.g. *In New Orleans*), the cover art image, and a label (e.g. Chiaroscuro) for the item. The cover art image is displayed over a larger display region than the cover art image in FIG. 48.

The third display includes a list of a plurality of tracks from the item to be rated. For example, the list can include four tracks (i.e. songs) from the *In New Orleans* album. The end user is required to rate each of the tracks in order to obtain credit for rating the album. It is noted that the album may include additional tracks which need not be rated by the end user.

Each track is identified by textual information such as a title 1350 in the list. Also associated with each track is an icon 1352 indicating whether the track has been previously rated by the end user. The icon 1352 includes a question mark to indicate that the track is unrated by the end user. If the track has been previously rated, an indication of the rating is displayed in the icon 1352.

The end user selects either a title from the list or its associated icon to commence a rating process for an associated track. In response to receiving a user-initiated selection of a title or an icon, at least a portion of the associated track is communicated to the client apparatus 106. Although an entire portion of the associated track can be communicated, it is preferred that a limited-duration sample of the associated track be communicated. For example, the limited-duration sample can be comprised of a 30-second clip of the associated track.

Preferably, the portion of the associated track is communicated to the client apparatus 106 using streaming technology. The client apparatus 106, in turn, plays back the portion of the associated track for the end user.

A graphical rating tool is displayed either during playback or upon completing playback of the portion of the associated track. The graphical rating tool is used to receive at least one rating for the track. The graphical rating tool can be displayed either in place of the icon 1352 or proximate to the icon 1352.

The third display includes an option 1354 to buy the item. In response to receiving a user-initiated selection of the option 1354, the item is tagged for purchase. Further, the item can be placed in a virtual shopping cart that stores all items tagged for purchase. Thereafter, a check-out option is provided to finalize the purchase of tagged items. A check-out reminder can be automatically initiated if the end user exits from the player while items are tagged for purchase. The check-out reminder can include a visual message or an audible message displayed by the client apparatus 106.

The third display includes an option 1356 to cancel a rating of the current item. In response to receiving a user-initiated selection of the option 1356, the user interface returns to the main selection page (such as in FIG. 48) where the end user can select another item to rate.

Figure 51:
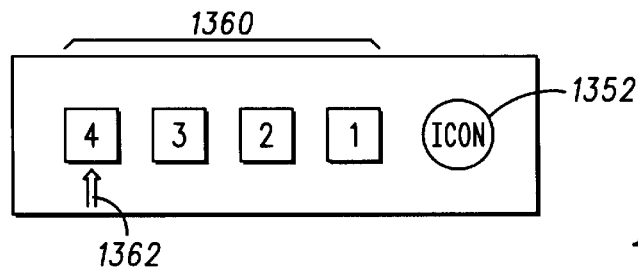
FIG. 51 is a view of an embodiment of the graphical rating tool.

FIG. 51 is a view of an embodiment of the graphical rating tool. The graphical rating tool includes a plurality of rating options 1360. Preferably, each of the rating options 1360 has the form of a hot region associated with a rating. For example, the rating options can include five hot regions for receiving ratings from one to five.

During playback of the track, the end user varies a position of a cursor 1362 over the rating options to indicate his/her dislike or like of the track. For example, the end user may position the cursor 1362 over the hot region for a one-rating during portions of the track he/she dislikes, and may position the cursor 1362 over the hot region for a five-rating during portions of the track he/she likes. Preferably, a display graphic within the hot region is modified in response to the cursor 1362 being positioned thereon. For example, the display graphic can appear to illuminate (e.g. to light up) in response to the cursor 1362 being position on the hot region.

A plurality of ratings generated over time are recorded by the client apparatus 104 and/or the server 102. The time sequence of the plurality of ratings can be formed by repeatedly sampling the rating for either equal or unequal time intervals.

When the end user has formulated an overall rating or a score for the item as a whole, he/she points to and clicks on a particular rating option. An indication of the overall rating is recorded and displayed. Preferably, the overall rating is displayed within the icon 1352 associated with the track. The title 1350 and the icon 1352 for rated tracks are displayed in a second color which differs from a first color used to display titles and icons for unrated tracks.

Figure 52:
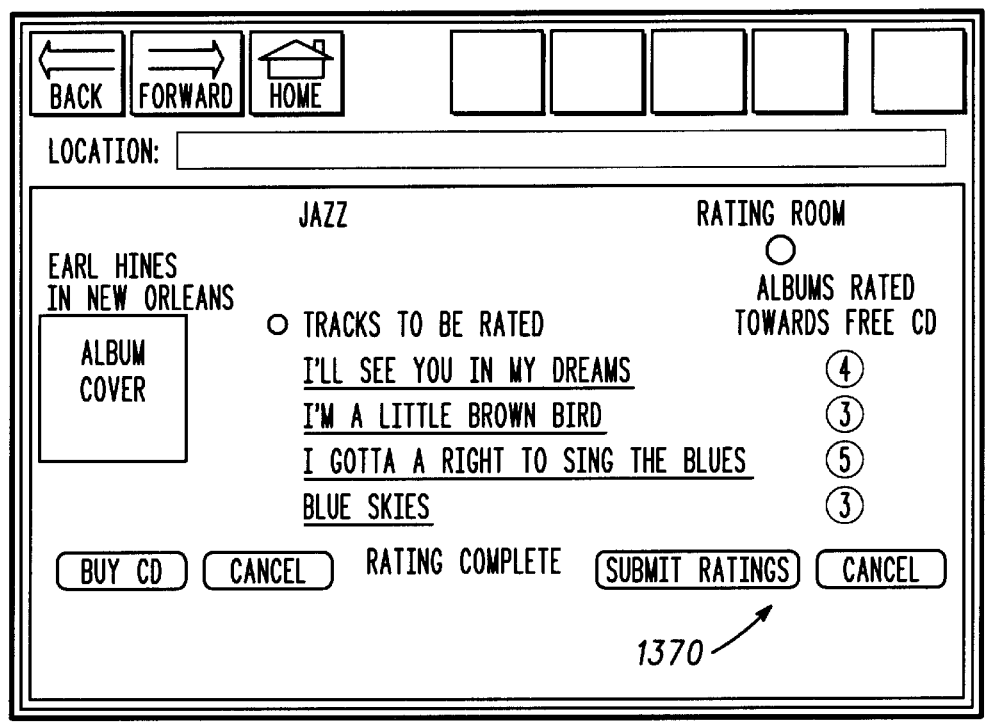
FIG. 52 is an example of a modified third display, in an embodiment of a listening booth or rating room feature, once all of the tracks for an item have been rated.

FIG. 52 is an example of a modified third display, in an embodiment of a listening booth or rating room feature, once all of the tracks for an item have been rated. The modified third display includes indications of the overall ratings for the tracks. The third display is modified to include an option 1370 to submit the ratings. Before submitting the rating scores, the end user is provided an opportunity to re-rate any of the tracks by selecting (e.g. pointing to and clicking on) either its associated title or its rating score icon.

Figure 53:
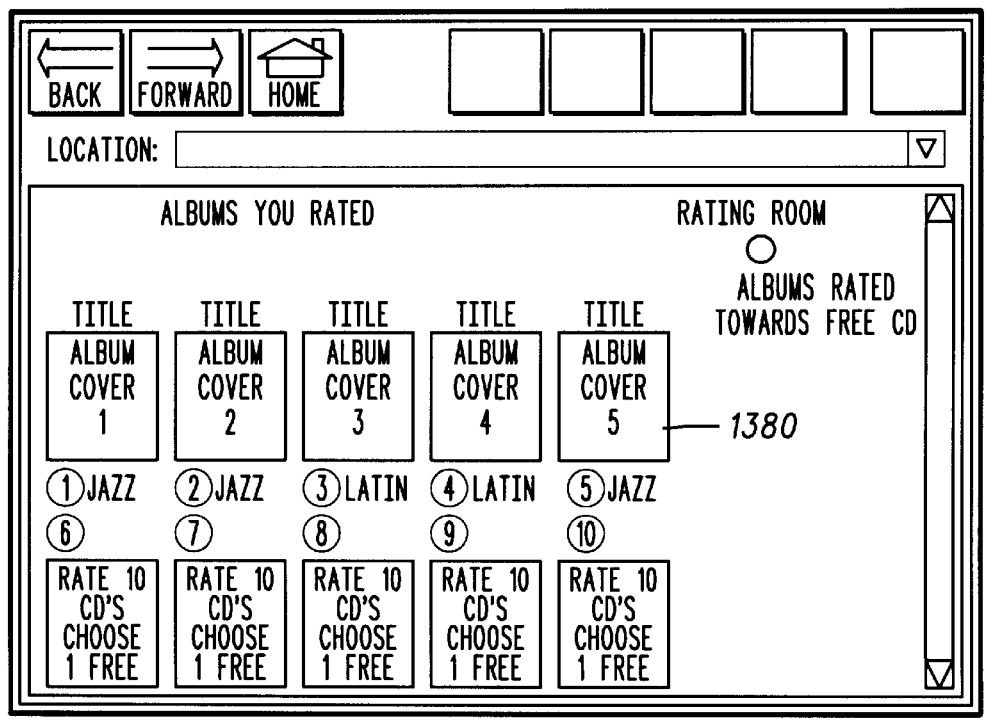
FIG. 53 is an example of the second display, in an embodiment of a listening booth or rating room feature, updated based upon a submission of ratings for the item.

FIG. 53 is an example of the second display, in an embodiment of a listening booth or rating room feature, updated based upon a submission of ratings for the item. Information associated with the item is displayed in a corresponding item region 1380. The information can include an artist, a title, an image such as an album cover, and a category for the item. Hence, five of the ten item regions have information displayed to identify five previously-rated items. As described with reference to FIG. 49, remaining ones of the item regions can be user selected to return to the main selection page. However, the category or genre of music associated with the item is removed from the main selection page. The category or genre can be removed until a predetermined number of users have provided ratings therefor. For example, the category or genre can be removed until ratings have been received from at least hundred other end users or more.

Also as described with reference to FIG. 49, a user-initiated selection of the image, such as the album cover, initiates a display of additional information associated with the item. An example of the display of additional information is depicted in FIG. 54.

Figure 54:
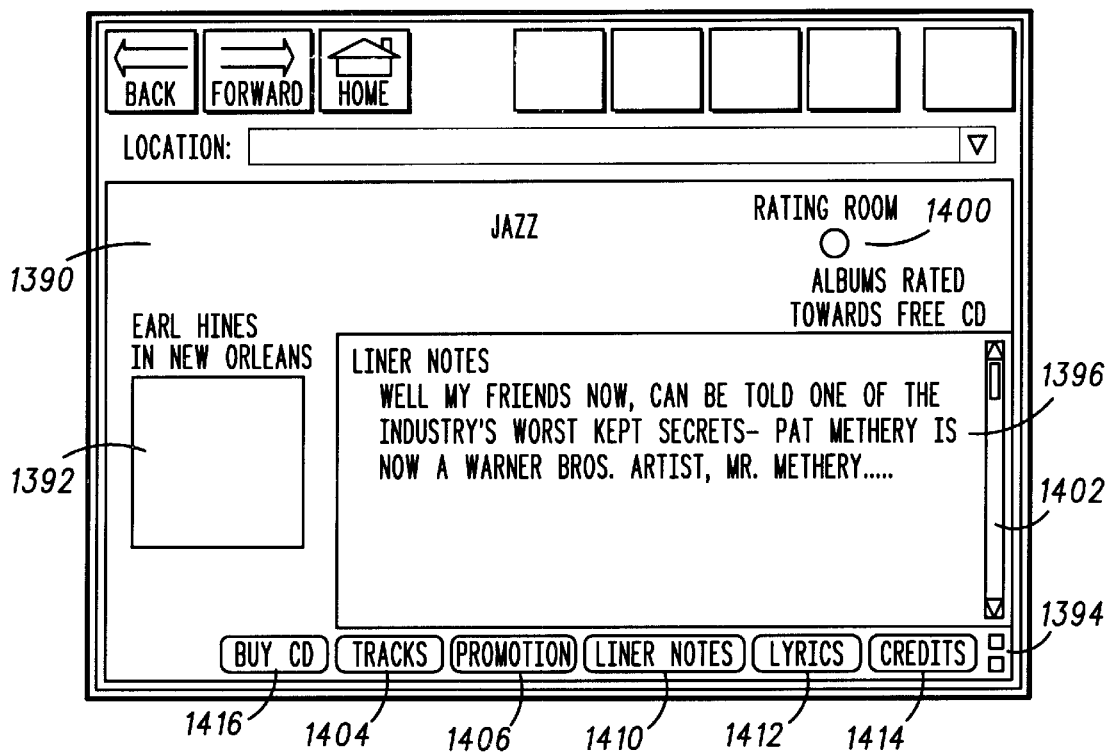
FIG. 54 is an example of a fourth display in an embodiment of a listening booth or rating room feature.

FIG. 54 is an example of a fourth display in an embodiment of a listening booth or rating room feature. The fourth display is displayed in response to receiving a user-initiated input such as a selection of an album cover image.

The fourth display includes a banner region 1390, a cover art region 1392, a controls region 1394, and an information region 1396. The banner region 1390 includes a service icon, textual information indicating the category or genre of the item (e.g. "Jazz"), and an option 1400 to return back to the category selection page. The option 1400 can include textual information indicating a number of music items previously rated by the end user. For example, the textual information can include "5 albums rated towards free CD". Alternatively, the option 1400 can include textual information indicating a remaining number of items to rate before receiving a complimentary item such as a complimentary music item.

The cover art region 1392 includes information identifying the item. The information includes the artist (e.g. Earl Hines), the title (e.g. *In New Orleans*), the cover art image, and the label (e.g. Chiaroscuro) for the item. In response to a user-initiated selection of a portion of the cover art region 1392 (such as the album cover), a larger, higher-resolution image of the cover art is displayed. This allows the end user to print a hard copy of the cover art for the item.

The information region 1396 is used to display information associated with the item. The information can include a track list with rating scores for rated songs, promotional information, liner notes, lyrics and credits. Preferably, all of the aforementioned information is included in a single media file for the item. This allows the end user to print all of the information at once.

The portion of the information displayed in the information region 1396 is controlled by either a scroll bar 1402 or by controls in the control region 1394. The control region 1394 includes a first control 1404 to initiate a display of the track list, a second control 1406 to initiate a display of promotional information, a third control 1410 to initiate a display of the liner notes, a fourth control 1412 to initiate a display of the lyrics, and a fifth control 1414 to initiate a display of the credits. Each of the aforementioned controls in the control region 1394 is used to jump to a targeted portion of the single media file. The control region 1394 further includes a sixth control 1410 to initiate a purchase of the item (e.g. the option "Buy CD").

Optionally, the album rating page described with reference to FIG. 50 can include an option to provide additional feedback for the item. The option can have the form of a button or control including text such as "tell us more". In response to a user-initiated selection of the option, a detailed rating criteria interface is provided. An example of this interface is depicted in FIG. 55.

Figure 56:
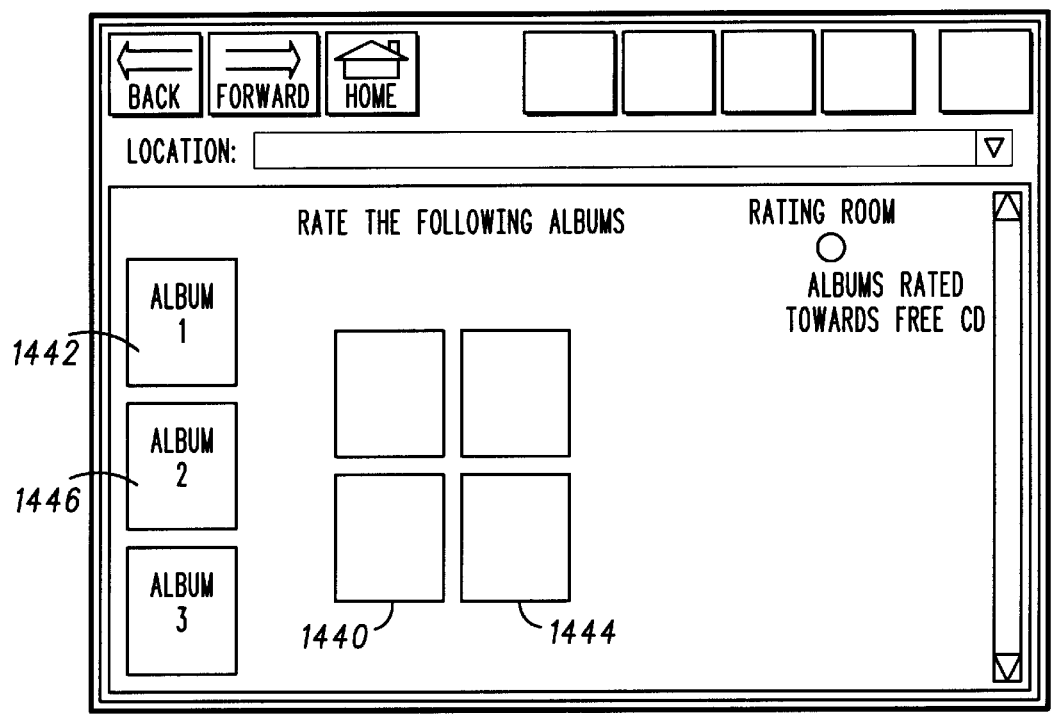
FIG. 56 is an example of a sixth display in an embodiment of a listening booth or rating room feature.

Further, the category or genre selection interface described with reference to FIG. 48 can include an option to provide a comparative rating for a plurality of items. The option can have the form of a button or a control. In response to a user-initiated selection of the option, a comparative ranking interface is provided. An example of this interface is depicted in FIG. 56. The comparative ranking interface is advantageous in providing record labels additional feedback for albums such as albums that were successful during their initial rating and albums which receive a marketing push.

Figure 55:
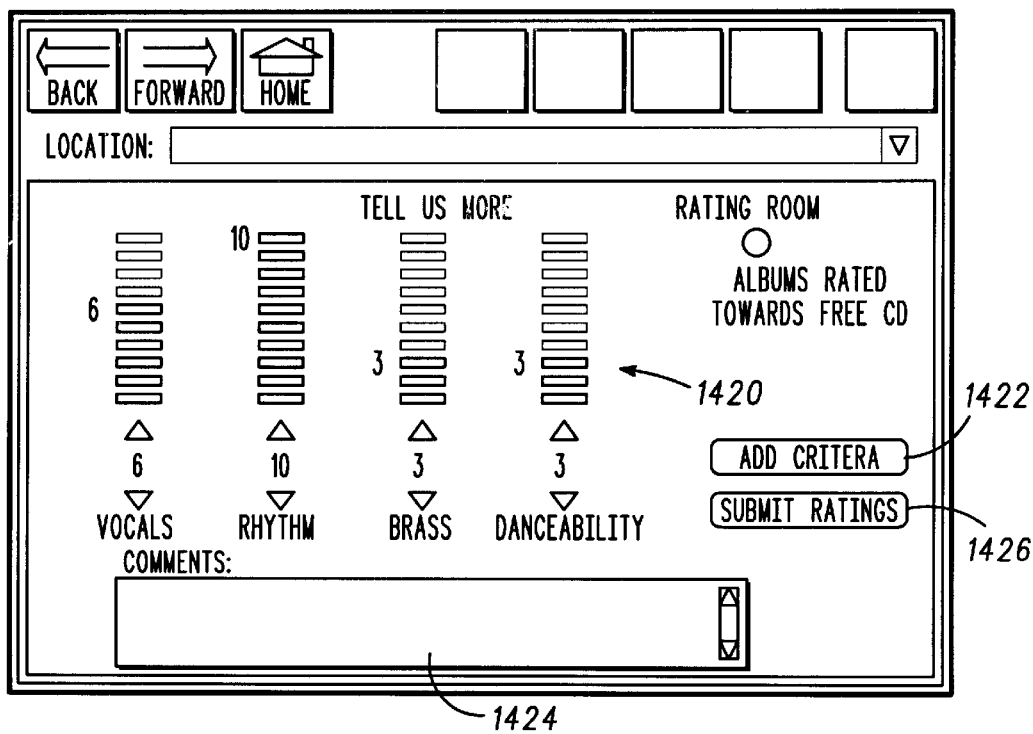
FIG. 55 is an example of a fifth display in an embodiment of a listening booth or rating room feature.

FIG. 55 is an example of a fifth display in an embodiment of a listening booth or rating room feature. The fifth display includes a plurality of rating criteria. The rating criteria can be encoded by information associated with the track or song. In this way, each track or song can have its own set of rating criteria. Preferably, an entity such as a record label indicates which rating criteria are to be provided for one of its songs. The entity can select the rating criteria from a checklist of all potential rating criteria.

For purposes of illustration and example, the fifth display provides a graphical interface 1420 to receive and display a vocals rating, a rhythm rating, a brass rating, and a danceability rating from the end user. Each rating is entered using an associated up control and/or an associated down control. Each rating can be numerical, such as integers from one to ten. Each rating is displayed both textually and by a graphical bar chart display.

The fifth display further provides an option 1422 to include additional criteria. In response to a user-initiated selection of the option 1422, a list of all potential rating criteria can be displayed. The end user can select a rating criterion from the list and can enter a rating therefor.

The fifth display further provides an interface 1424 for entering user comments. The interface 1424 can include a text box to allow the end user to enter comments in the form of a textual message.

To submit the additional feedback, the end user selects an option 1426 provided by the fifth display. The option 1426 can include a graphical button having text such as "submit ratings". In response to receiving the user-initiated selection of the option 1426, the additional feedback is recorded by the server 102.

FIG. 56 is an example of a sixth display in an embodiment of a listening booth or rating room feature. The sixth display provides a graphical interface to receive a comparative ranking of a plurality of items. The plurality of items are typically selected by an entity such as a record label, and not by the end user. The plurality of items may or may not be within a genre or a category of music.

The sixth display includes a plurality of images, such as a plurality of album cover images, associated with the plurality of items. Each image is user-selectable, such as by a point-and-click operation, to initiate playback of audio samples for its associated item. If available, ratings and comments previously submitted by the end user are also displayed in response to the aforementioned user selection.

The sixth display further includes a plurality of display locations for comparatively ranking the plurality of items. Each of the plurality of display locations is responsive to a drag-and-drop operation of one of the plurality of images. For example, an end user can click on a first image 1440, drag the first image 1440 to a first display location 1442, and drop the first image 1440 at the first display location 1442 to indicate that the item associated with the first image 1440 is his/her favorite from the plurality of items. Similarly, the end user can click on a second image 1444, drag the second image 1444 to a second display location 1446, and drop the second image 1444 at the second display location 1446 to indicate that the item associated with the second image 1444 is his/her next favorite from the plurality of items. Once the end user has entered a comparative ranking of the items, the comparative ranking is submitted to the server 102.

Based upon any of the user-generated rating information and comments described herein, the music testing component 152 in FIG. 1 generates and provides reports including the actual data and/or summaries thereof. Each report can be specific to one or more songs associated with an entity such as a record company. The report is communicated to the entity to provide rating information and comments for its music items. The report can be stratified by demographics such as gender, age, occupation, and geographical region of the end users. Each report can be automatically generated either at periodic or predetermined times, or after a predetermined number of end users have rated an item, or upon receiving a request. For example, a report for an item can be automatically generated and communicated to the entity via the electronic network 100 after one hundred end users have rated the item. As another example, a report for an item can be communicated to an entity in response to a request received from the entity via the electronic network 100.

In a particular embodiment, the music testing component 152 and the promotions component 156 function as follows. To initiate music testing, a client supplies an album to be tested (either on CD or another medium), indicates which four tracks are to be tested, identifies a 30-second clip from each track, and provides additional testing information. If desired, this initiation process can be performed on-line via the electronic network 100.

Typically, the client is associated with a promoter of the album such as a record label for the album. Preferably, the client also supplies additional copies of the album for end users who redeem their credits to obtain the album. The additional copies of the album can be supplied by a fulfillment house indicated by the client. The number of additional copies is based upon a required batch size.

The 30-second clips are digitally encoded for streaming, and made available to the server 102. An entry for the music test is made in a database (herein referred to as MusicTestingBatch). The entry (herein referred to as Batch) includes a Universal Product Code (UPC) for the album, a scheduled start date for testing, either a scheduled end date for testing or a scheduled number of testing days, a required number of responses (batch size), a genre of the album, and descriptive information such as liner notes, credits, and lyrics. The entry is assigned a unique identification code (herein referred to as BatchID). The database includes a client identification code (herein referred to as ClientID) used for billing and report generation purposes. Optionally, data indicating a total number of songs submitted by the client is updated based upon the entry.

Each entry in MusicTestingBatch is assigned a queue position for its genre. To readily identify which album an end user will rate, a batch queue cache stores an active queue position identifier and an associated BatchID for each genre.

The database includes data (herein referred to as BatchResponse) that identifies all of the end users (by their CustomerIDs) that have rated a particular album (using its BatchID). Using this data, a check is performed to ensure that the end user has not previously completed rating of the album identified by the batch queue cache. Alternatively, the check can be performed using data stored in the user profile. In this case, the user profile includes an AlbumID for each album rated by the end user.

If the end user has previously completed rating the album, the queue position is incremented to a subsequent position. The queue position is repeatedly incremented until a previously-unrated album is identified. If all albums in the genre were rated by the end user, a message suggesting that the end user choose another genre is communicated to and displayed by the client apparatus 106.

Once the end user has listened to and scored all of the song samples within the batch, the music testing component 152 registers the response and increments the queue position. To register the response, the music testing component 152 stores the scores in a MusicTestingResponse table and a MusicTestingScore table by CustomerID and BatchID. The MusicTestingScore table tracks user ratings by correlating BatchID, SongID, and CustomerID. Optionally, the AlbumID is stored in the user profile to prevent the album from being rated more than once by the end user. If the end user has not scored all of the samples, no information is stored for the end user.

It is noted that separate MusicTestingResponse and MusicTestingScore tables may not be necessary since the difference between these two tables is that MusicTesting-Score has an additional entry per song.

In addition to an entry being made in the MusicTesting-Response table, the customer profile of the end user can be modified based upon the test. If the end user is enabled to receive promotions (e.g. by having a preferred customer profile), the music testing component 152 credits his/her account upon completing the rating. If the end user is unable to receive promotions (e.g. by having a lesser status such as basic customer or guest), no credit is provided to the end user's account. Optionally, each credit has an expiration date after which the credit is purged.

Preferably, a promotions-enabled customer profile maintains a number of testing credits (herein referred to as NumMusicTestingCredits) and a promotion enable date (herein referred to as PromotionEnableDate). The presence of a PromotionEnableDate greater than the current date indicates that the end user has already received a promotional item, and will not receive credit for the test. If the PromotionEnableDate is not present (e.g. if the end user has not received a promotional item) or if the PromotionEnable-Date is less than the current date, then the end user is eligible to receive credit for the test. In this case, the number of testing credits is incremented upon performing the test.

Additionally in this case, an entry is made in a promotions database (herein referred to as PromotionResponseAlbumsPresented). The entry includes the BatchID, the CustomerID, and a false value is assigned to a flag (herein referred to as PromoUsedFlag). The entry indicates that the end user has tested the item and that the item can be used for a promotion.

If the accumulated number of testing credits for the end user attains a threshold, a promotional item such as a CD is offered to the end user. The end user is allowed to select the promotional item from a plurality of promotional items having a false PromoUsedFlag in the promotions database. It is noted that each promotional item can have a limited duration of availability based upon its scheduled end date.

The promotions component 156 receives a response (accept or reject) from the end user. If the end user accepts an item, the following steps are performed. A flag (herein referred to as SelectedFlag) associated with the item is set to true in the promotions database. Information in the customer profile needed to distribute the item to the end user (e.g. a name and a shipping address or an electronic mail address) is forwarded to the fulfillment house. Using the information, the fulfillment house can deliver a physical copy of the item or can deliver an electronic copy of the item via the electronic network 100. The number of testing credits is reset to zero. The PromotionEnableDate is set to a date equal to a predetermined time duration beyond the current date. As a result, the end user can continue rating items after the accumulated number of credits has attained the threshold, however, credit accumulation for the end user is inhibited for the predetermined time duration. The PromoUsedFlag is set to true for all entries associated with the CustomerID of the end user in PromotionResponseAlbumsPresented. This step assures that the same albums are not presented to the end user in a subsequent promotion.

If the end user rejects receiving an item (e.g. by not selecting an item from a list of available items), the following steps are performed. The number of testing credits is reset to zero. The PromoUsedFlag is set to true for all entries associated with the CustomerID of the end user in PromotionResponseAlbumsPresented. As a result, the end user has forfeited his/her credits, and may not select from these items in a subsequent promotion. However, the PromotionEnable-Date is maintained so that the end user's ability to acquire credits is not affected.

After a promotion transaction is completed (either by accepting or rejecting the item), records associated therewith are migrated from the promotions database into an archive database.

Optionally, a notification message can be occasionally sent to the end user via the electronic network 100 to the end user of his/her credit status.

Once a batch has attained the required number of responses, the end date for testing is set to the current date, and a batch complete flag is set to a logical true. It is noted that the number of responses can be allowed to slightly exceed the required number of responses in this case. During nightly processing, the batch response data is summarized and packaged into a report. The report provides demographic data on the respondents and provides a measure to compare results across albums within a genre for a specific client. The client can be a record label that submitted the test request or a radio station seeking well-rated music.

The report can include: the BatchID; a report date and time; the scheduled start and end times; the actual start and end times; the MusicID for the album, the title of the album;

the first and last name of the primary artist for the album; the SongID, title, artist, and publisher of each tested song from the album; a count of the number of testing responses for the album; a hit index providing a count of responses which rate each song as least/highest; an average music testing score for each song and for the batch; a bar graph showing a percentage of responses at each score; and listener demographics. The report can also indicate a number of promotions that were accepted and a number that were declined, a promotion completion time, and a comparison of respondent ratings of redeemed albums versus non-redeemed albums.

Either the report or a notification thereof can be delivered to the client via the electronic network 100. For example, the music testing component 152 can initiate that an electronic mail message be sent to the client after one hundred persons have rated songs from an album. The client, in turn, navigates to a Web site having the report in a marking language format such as HTML. The client can review the report using a browser program. The music testing component 152 generates a bill for providing the testing service for the client.

As an alternative to generating a report after receiving a predetermined number of ratings, the report can be generated after a predetermined time duration. Once the predetermined time duration has elapsed, the music testing component 143 generates a report summarizing as much information that was gathered. If a client wants to receive ratings within a shortened time period, the queue can be adjusted to make the album more likely to be presented to an end user than other albums in its genre or category. If desired, the queue can be adjusted to present the album to all end users which select its genre or category.

It is noted that as an alternative to testing a batch of songs from a single album, a batch can comprise songs from a plurality of albums. In this case, it is preferred that the songs in a batch have some relationship with one another. It is also preferred that each song being tested be included in only one batch.

Preferably, the music genre or category is associated with an entire album. For compilations and other multiple-format albums, a multi-genre category can be provided.

The music testing component 152 frequently checks tables in the database to ensure that null pointers do not exist. For example, a tested album may still reside in the database after its associated audio files have been removed and/or archived.

Figure 57:
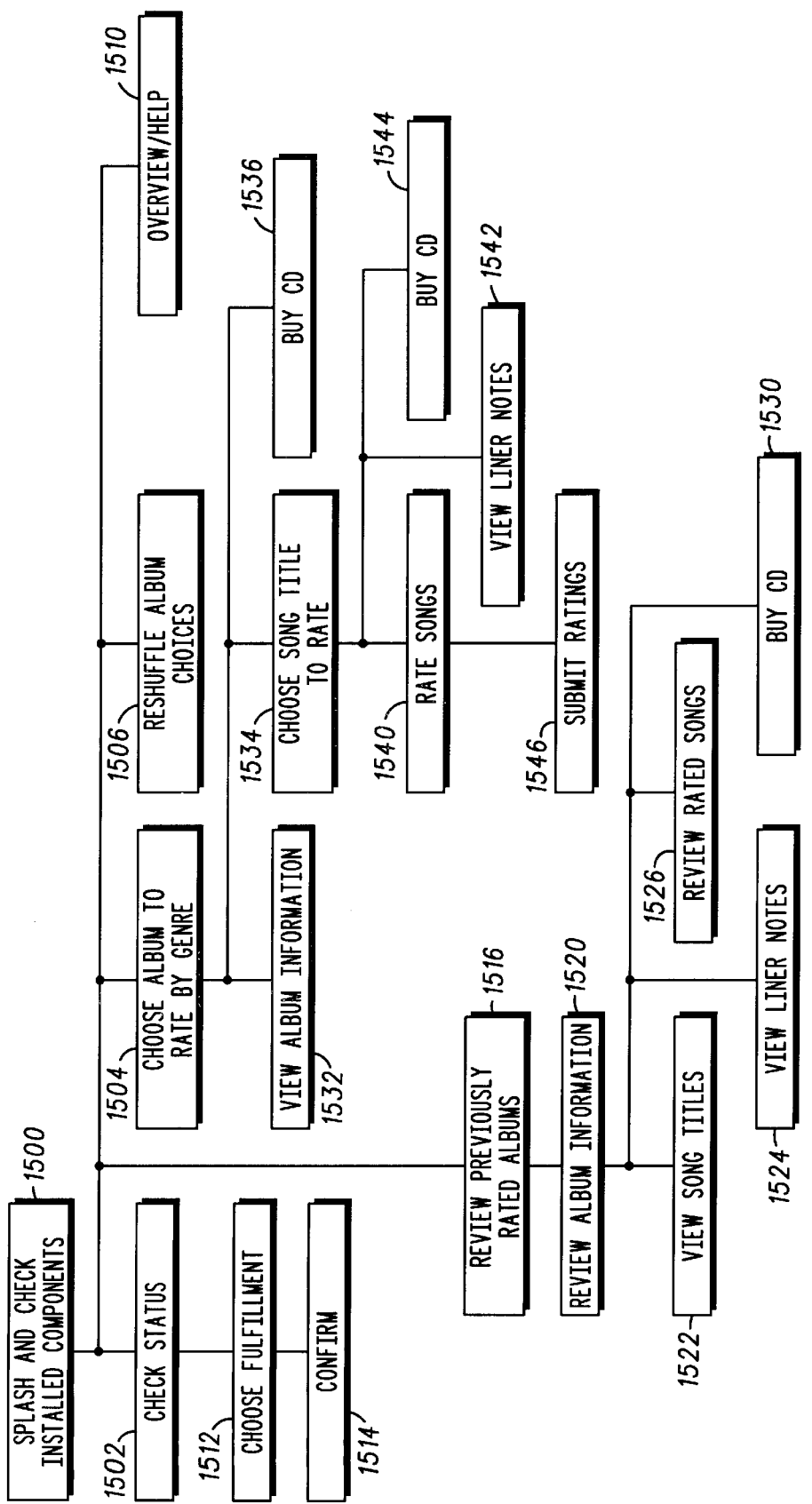
FIG. 57 is a block diagram summarizing a site map for an embodiment of the listening booth or rating room feature.

FIG. 57 is a block diagram summarizing a site map for an embodiment of the listening booth or rating room feature. The site map identifies functions available to the end user at specific points throughout the graphical interface. Upon entering the rating room feature, a main interface page is provided (block 1500) wherein a step of checking for installed components is performed. The main interface page provides a feature to check the status of the end user (block 1502), a feature to choose an album to rate by genre (block 1504), an optional feature to reshuffle album choices (block 1506), and a feature to display an overview and help information (block 1510).

From the feature to check the status of the end user (block 1502), the end user can choose to fulfill an option to receive a complimentary music item in return for rating a number of items in a time duration (block 1512). A confirmation message for this option is provided in block 1514.

Further from the feature to check the status of the end user (block 1502), the end user can review previously-rated albums (block 1516). In this path, a feature to view album information is provided (block 1520). From this feature, features to view song titles (block 1522), to view liner notes (block 1524), to review rated songs (block 1526), and to buy a CD (block 1530) are provided.

The feature to choose an album to rate by genre (block 1504) provides a feature to view album information (block 1532), a feature to choose a song title to rate (block 1534), and a feature to buy a CD (block 1536). The feature to choose the song title to rate (block 1534) provides a feature to rate a song (block 1540), a feature to view liner notes (block 1542), and a feature to buy a CD (block 1544). The feature to rate the song (block 1540) provides a feature to submit a ratings for the album (block 1546).

Figure 58:
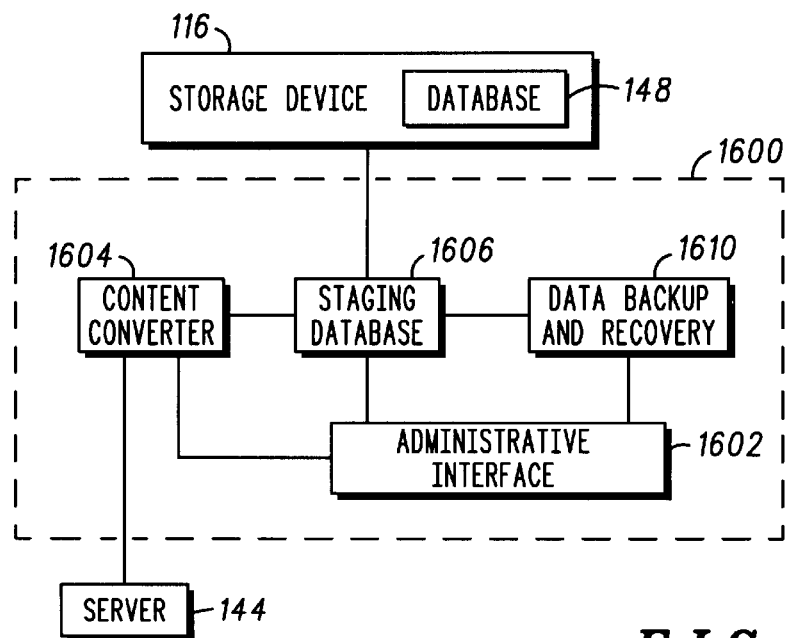
FIG. 58 is a block diagram of an embodiment of a content entry subsystem.

FIG. 58 is a block diagram of an embodiment of a content entry subsystem 1600. The content entry subsystem 1600 is described with reference to elements of FIG. 1.

The content entry subsystem 1600 is used to acquire, convert, and/or update content stored by the storage device 116. In general, content is acquired, converted, or updated by either: (i) importing the content from an external source such as the server 144; or (ii) entering the content using an administrative interface 1602. The content entry subsystem 1600 addresses these two approaches of maintaining and populating the storage device 116 with content.

The content entry subsystem 1600 includes a content converter 1604 to convert the content from a first format associated with the server 144 to a second format associated with the server 102. The content converter 604 can include one or more rules, and/or one or more filters to convert data from the server 144 to data which conforms to system requirements for the server 102. Similarly, the administrative interface 1602 performs a step of verifying that manually-entered data conforms to the system requirements.

Preferably, the content entry subsystem 1600 periodically imports content data from the server 144. For example, the content entry subsystem 1600 can be programmed to import content data from the server 144 on a nightly basis. The content data can have the form of a table retrieved from a Web page provided by the server 144. The Web page is updated periodically (e.g. nightly) for this purpose. The content entry subsystem 1600 retrieves a content data file through HTTP, and stores a copy of the file with delimited field separators. If the Web page is password protected, the content entry subsystem can automatically provide a password to gain access thereto.

Once retrieved, the content data is converted or otherwise scrubbed to the second format. The content data in the second format is stored by a staging database 1606. Preferably, the staging database 1606 substantially replicates the information stored in the server 144.

The content entry subsystem 1600 assists in updating the database 148 using the converted data in the staging database 1606. In general, the content entry subsystem 1600 updates the database 148 based upon the most recent changes in the staging database 1606. The content entry subsystem 1600 compares the converted data to existing, active data in the database 148. Rules are generated to convert the newest data to the active data. Caution is exercised to prevent changes that involve row deletes and key updates. The rules and exceptions can be dynamically generated to interpret changes in the server 144.

The difference between the converted data and the active data is formatted to become an entry (update/add/delete) for the staging database 1606. The data is made active upon satisfying an integrity check.

Daily changes to the database 1606 are logged. The changes can be summarized in a nightly administrative report generated by the content entry subsystem 1600. A daily report of the data import process can be communicated by electronic mail or other means to system administrators. The logs of updates can be formed using transaction logs from a database software package such as SQL.

After one or more databases, including the database 148, are updated by the staging database 1606, the data in the staging database 1606 is backed-up by a data backup and recovery system 1610, and purged. The data backup and recovery process 1610 makes available the most recent copy of the staging database 1606.

Manually-entered data received by the administrative interface 1602 can include media location and other information used throughout the system. The media location can be in the form of an electronic address, such as a URL or a Uniform Resource Name (URN), for accessing the content via the electronic network 100. Some information attributes may be considered optional. The content entry subsystem 1600 accepts a new entry without requiring the optional information attributes. The content entry subsystem 1600 verifies the information attributes. An encoded music file associated with the media location is made available upon verification.

Two examples of data formats from the server 144 include a broadcast format and a content format. TABLE I shows radio station data extracted from the broadcast format to generate data in the second format. TABLE II shows music data extracted from the broadcast format to generate data in the second format. TABLES III to VII show song data extracted from the Liquid Audio format to generate data in the second format.

The station ID parameter is a code to uniquely identify each radio station. Preferably, the station ID is not relied upon for identifying the station. The Call Letters parameter provides the call letters identifying the radio station. The Frequency parameter provides the over-the-air broadcast frequency of the radio station. The Format parameter identifies the format or category of content broadcast by the radio station. The City, State, and Country parameters identify the city, state, and country of origin, respectively, of the radio station. The Description parameter provides a description, a monicker, or another identifier of the radio station.

The Station Logo Address parameter includes an electronic address of a logo or another image associated with the radio station. Preferably, the logo is stored locally at the server 102 to improve player performance. The Station WWW Address parameter provides an electronic address such as a URL identifying a Web site for the radio station. The Schedule Address parameter provides an electronic address for a site having a programming schedule for the radio station.

The Audio Stream Pointer Address (LQ) provides an electronic address of a lower-quality audio stream of content broadcast by the radio station. The Audio Stream Address (LQ) provides a file name and electronic address to verify the correct lower-quality audio stream for the station. The Audio Stream Bit Rate (LQ) parameter indicates the bit rate of the lower-quality audio stream.

The Audio Stream Pointer Address (HQ) provides an electronic address of a higher-quality audio stream of content broadcast by the radio station. The Audio Stream Address (HQ) provides a file name and electronic address to verify the correct higher-quality audio stream for the station. The Audio Stream Bit Rate (HQ) parameter indicates the bit rate of the higher-quality audio stream.

The Blackout Period parameter indicates times and/or dates for which content from the radio station is blacked-out or otherwise inhibited from being received via the electronic network 100.

The Album ID parameter includes a code to uniquely identify a music item such as an album. Preferably, the AudioNet Album ID is not relied upon to identify the album. The Album Title parameter includes a title of an album or another music item. The Format parameter identifies the format of the music item. The Artist Sort Name parameter provides a name, used for sorting purposes, of an artist associated with the music item. The Artist Name parameter provides a name of the artist to be used for descriptive purposes.

The Album Art Address parameter provides an electronic address of a cover art image associated with the music item. Preferably, the cover art image is stored locally by the server 102 to improve player performance. The Artist WWW Address parameter provides an electronic address, such as a URL, of a Web site for the artist. The Album Description parameter provides descriptive information for the music item. The Audio Stream Meta File Address parameter provides an electronic address, such as a MetaURL, for providing an audio stream of the music item. The Audio Stream Address parameter provides a file name (such as a .ra or .asf file name) and an electronic address identifying the audio stream of the music item. The Audio Bit Rate parameter indicates the bit rate or encoding bandwidth of the audio stream.

The Label Name parameter identifies a publishing entity for the music item, such as a record company or label. The Label Address parameter includes an electronic address, such as a URL, for a Web site of the record company or label.

TABLES III to VII show song data extracted from the content format to generate data in the second format. The data includes song information, artist information, recording information, rights information, watermark information, and miscellaneous information.

TABLE III

| Parameter |
| --- |
| Artist(s) |
| Song Title |
| Album Title |
| Composer (Music) |
| Composer (Lyrics) |
| Arranger |
| Publisher |
| Genre |
| Language |

TABLE III illustrates song information parameters extracted from data having the content format. An Artist parameter identifies the artist or artists who performed the song. Separate parameters may be defined for the "headline" artist, as well as session artists, orchestras, conductors, choruses, etc. A Song Title parameter provides a title of a song or like music item. An Album Title parameter provides a title of an album containing the song. A Composer parameter identifies at least one composer of the song. An additional parameter may identify the writer of the songs lyrics. An Arranger parameter identifies at least one arranger of the song. The Publisher parameter identifies the publisher of the song. A Genre parameter indicates the genre or category of the song. The Language parameter indicates a language of the lyrics of the song. An ISRC ID parameter includes a 12-digit alphanumeric serial code comprised of a two-letter country code, a three-character author code, a two-digit year code, and a five-digit song identifier.

TABLE V illustrates recording information parameters extracted from data having the content format. A Format parameter indicates an audio or a video format of the song. A Recording Type parameter indicates a recording type of the song. A Publication Date parameter indicates a publication date for the song. A Country of Origin parameter identifies a country of origin for the song. A Playing Time parameter indicates a playing time of the song.

A Recording Studio parameter identifies one or more recording studios used to record the song. A Mix Down Studio parameter identifies one or more studios used to mix down the song. A Mastering Studio parameter identifies one or more studios used to master the song.

A Producer parameter identifies one or more producers of the song. An Engineer parameter identifies one or more recording engineers for the song. A Mastering Engineer parameter identifies one or more mastering engineers for the song. A Remixer parameter identifies any remixers of the song. An ISRC ID parameter includes a 12-digit alphanumeric serial code comprised of a two-letter country code, a three-character author code, a two-digit year code, and a five-digit song identifier.

TABLE V

| PARAMETER |
| --- |
| Format |
| Recording Type |
| Publication Date |
| Country of Origin |
| Playing Time |
| Recording Studio(s) |
| Mix Down Studio(s) |
| Mastering Studio(s) |
| Producer(s) |
| Engineer(s) |
| Mastering Engineer(s) |
| Remixer(s) |
| ISRC Code |

TABLE VI illustrates rights information parameters extracted from data having the content format. A UPC Code parameter includes a 20-digit UPC code identifying the album. Preferably, the UPC is the convention to identify all music titles in a music library from radio station broadcast synchronization signals. A cross-referencing database can be used to translate between a cart code from a radio station to a UPC.

TABLE VI

| PARAMETER |
| --- |
| UPC Code |
| Copyright |
| Sound Recording Copyright |
| Performance Rights Agency |
| Mechanical Rights Agency |
| Record Label |
| Distributors |
| Date Encoded |
| Encoded By |

A Copyright parameter provides copyright information for the song. A Sound Recording Copyright parameter provides sound recording copyright information for the song. A Performance Rights Agency identifies a performance rights agency for the song. A Mechanical Rights Agency identifies a mechanical rights agency for the song. A Record Label parameter identifies the record label for the song. A Distributors parameter identifies one or more distributors of the song.

A Date Encoded parameter indicates a date at which the song was encoded. An Encoded By parameter identifies a party that encoded the song.

TABLE VII illustrates watermark information parameters and miscellaneous parameters extracted from data having the content format. A Standard Watermark parameter provides a standard digital watermark for identifying a source of the song. A User-Defined Watermark parameter provides a user-defined digital watermark for the song. A Notes parameter includes notes associated with the song.

TABLE VII

| PARAMETER |
| --- |
| Standard Watermark |
| User-defined Watermark |
| Notes |

Referring back to FIG. 1, the audience measuring component 154 monitors and reports listenership information for items played using the player 142. Preferably, listening activity data is recorded for each instance of an end user playing an audio content item for a duration that attains or exceeds a predetermined listening time threshold. If the duration is less than the predetermined listening time threshold, the listening behavior is not considered significant, and the listening activity data is not recorded. Preferably, the predetermined listening time threshold is a global system parameter used for all audio content items.

Any of the herein-described audio content items, including but not limited to radio category items, events category items, library category items, and music category items, can be monitored in this way. The data can include an indication of the audio content item, an indication of which end user is playing back the item, a demographic of the end user, a time at which the audio content item is played, and a location of the end user.

Based upon any of the listenership information, the audience measurement component generates and provides reports including actual data and/or summaries thereof. These reports can include measurements that are familiar to advertisers, such as Average Quarter Hour, Cume, and time spent listening, which are familiar to radio advertisers. Each of these measurements can be derived from data tracked by the system. Each report can be specific to one or more radio stations associated with an entity such as a broadcasting company, or to one or more songs associated with an entity such as a record company, for example. The report is communicated to the entity to provide audience listenership information. The report can be communicated via the electronic network 100. The report can be stratified by demographics such as gender, age, occupation, and geographical region of the end users. Each report can be automatically generated either at periodic or predetermined times or upon receiving a request therefor.

A particular embodiment of the audience measuring component 154 is as follows. When an end user initially enters the site providing the player 142, an entry is made to a listener log database. The listener log database to which the entry is made depends upon which type of audio content item the end user is receiving. Preferably, the listener log database is selected from a radio log database, a music log database, an events log database, and a library log database. The entry includes an identifier of the end user (e.g. the CustomerID of the end user) and an identifier of the content (e.g. a radio station identifier, an event identifier, an album identifier, and/or a song identifier).

As the end user continues to listen to the content item for a predetermined time threshold, a subsequent entry is made into the appropriate listener log database. This process is repeated so that a new entry is made after every period having the predetermined time threshold. If the content item has changed, the end time is recorded, and the new entry identifies the new content item. The new content is monitored in the same way as the previous content item. In this way, when the end user leaves the site, only the final seconds of listening (up to a maximum of the predetermined time threshold) are not tracked. Preferably, a clock (not illustrated) associated with the server 102 is used to reference all time-based data for the audience measuring component 154.

The audience measuring component 154 periodically generates reports based upon the listener log databases. Each report can be generated daily, weekly, monthly, quarterly, or annually and communicated to a client (e.g. a radio station) via either paper or the electronic network 100 using electronic mail, the World Wide Web, or HTML. Each report can be dynamically created rather than stored. Preferably, the report indicates time of day listening habits and numbers of listeners. Demographic data of listeners can also be provided.

The report can include any combination of: (i) a measurement interval or period (e.g. daily, monthly, quarterly, or yearly); (ii) a measurement interval date range; (iii) call letters and band of the radio station; (iv) a count of unique listeners; (v) a count of all listeners; (vi) an average listening time per connection; (vii) an average listening time per unique listener; (viii) a graph interval (e.g. in minutes); (ix) an average simultaneous users; (x) an average quarterly hour listener metric; and (xi) a cumulative listener metric (cume).

The listener log databases can be maintained by archiving the data, and purging the databases on a daily basis. Preferably, the archived data includes a record of the start time and end time for each end user based upon a plurality of entries in the listener log databases.

Still with reference to FIG. 1, a detailed description of the advertising component 160 is provided. The advertising component 160 maintains a database of advertising records. Each advertising record can include an advertisement type, an electronic address, such as a URL, for an audible or visible advertisement, client information identifying the advertiser, and information designating a target audience (e.g. based on customer display information, music, and radio station genre). Preferably, there are four types of advertisements: a banner advertisement, an attraction advertisement, a feature advertisement, and an audio advertisement.

A plurality of banner advertisements from the database are queued for display with the player 142. The banner advertisements are successively displayed based on an automated process performed by the advertising component 160. For example, a subsequent banner advertisement in the queue can be displayed every 150 seconds in the banner advertising region 1304 described with reference to FIG. 47.

A plurality of attractions advertisements from the database are queued for display with the player 142. The attractions advertisements are successively displayed based on an automated process performed by the advertising component 160. For example, the attractions advertisements can be displayed in the attractions region 1306 or the region 1312 described with reference to FIG. 47. Preferably, attractions advertisements are contextually associated with audio content played using the player 142. For example, an attractions advertisement can promote an upcoming concert or an album signing related to audio content being played using the player 142. In this way, the advertising component 160 can provide content-specific advertisements.

A plurality of feature advertisements from the database are selected based upon broadcast signals. The feature advertisements can include static information such as a radio station logo presented continuously while the player 142 is playing content from an associated radio station. The feature advertisements can include dynamic information such as an image of each album being played. Further, the feature advertisements can include a visible advertisement tailored to appear during a broadcast commercial. The feature advertisements can be displayed in the information space 1314 described with reference to FIG. 47, for example.

The audio advertisements replace advertisements within the broadcast prior to communication to the client apparatus 106. In this way, alternative Internet-based broadcasts and regional-based broadcasts can be generated.

The advertising component 160 can determine an associated subset of the advertisements targeted to each end user. Further, the advertising component 160 can determine the sequence in which the subset of advertisements are to be presented. Advertisements can be selected for an end user based on any of the following: online and off-line purchasing, demographics, psychographics, geographies, sonagraphics (e.g. listening preferences), and listener behavior. In this way, the advertising component 160 can provide user-specific advertisements.

The advertising component 160 tracks viewership and listenership of each of the advertisements in the database. Data is recorded indicative of which end users have seen or heard an advertisement in an active window for at least a predetermined time duration, and times at which the advertisement was seen or heard. The data can further track which end users click through or otherwise select each advertisement to get additional information, and track the contemporaneous activity of the end users.

The advertising component 160 generates reports based upon the tracking data. The reports correlate end user demographics with metrics of the viewing and listening data. Client advertising billing reports can also be generated based upon the tracking data.

It is noted that some of the advertising images and audio files can be cached to the storage device 132 of the client apparatus 106 to improve system performance. Audio files can be pre-queued and pre-buffered for streaming at the client apparatus 106. Either in-band signaling or out-of-band signaling can be used to trigger the images and audio files. An example of in-band signaling includes a tone encoded within an audio data stream to identify and trigger content insertion. An example of out-of-band signaling includes data streamed with the audio data stream.

It is also noted that to improve system performance, the server 102 can provide the client apparatus 106 with content, in addition to the active content, based on a nearest subset of content selections on the graphical radio dial, presets, or favorites based on the end user's listening behavior. The additional content can be pre-buffered by the client apparatus 106.

Figure 59:
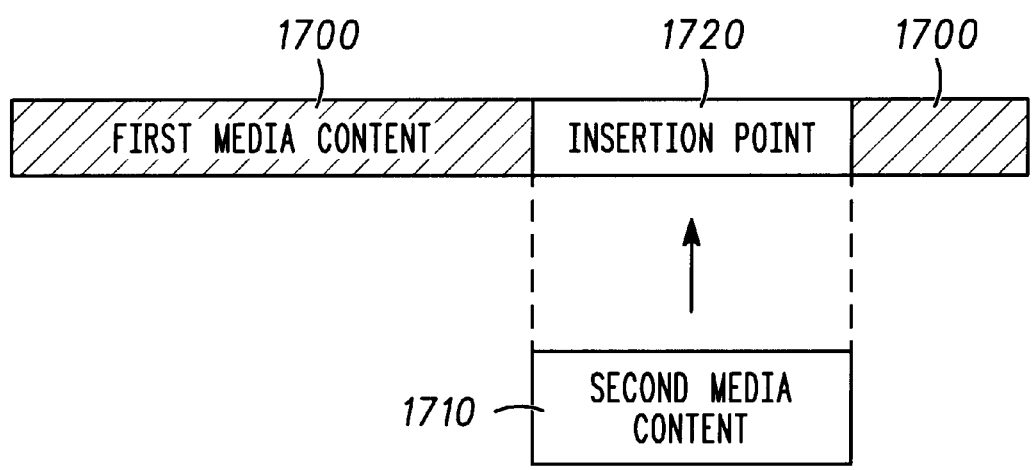
FIG. 59 is a block diagram representing an association between media contents of the present invention.

Referring to FIG. 59 in conjunction with FIG. 1, the herein-described components of the server 102 can interact with the player 133 (and optionally player 142) to provide personalized content to each of a plurality of end users of client apparatuses 104 and 106. Personalized content can be provided to a first user by: (i) communicating from the server 144 first audio content 1700 associated with a broadcast to a first user location 106, together with control data with information relating to the content, the broadcaster, the user or other attributes such as location of the user, examples of which are set out below; (ii) selecting (at the server 102) second content 1710 based upon a first user profile (preferably located at the server 102); and (iii) communicating a first signal to the first user location.

The first signal to the first user location comes from a server such as server 102 or 144, and the player (player 142 and player 133 in combination) causes switching of content from a first server 102 to a second server 144 or from the server 144 to another server (not shown), from which the inserted advertisement or other material is derived.

The switching of content can take place at the player 133 or at the player 142. In the former case, upon detection of the relevent code, the player 133 can cause the additional content to be inserted from either a local storage device 132 or from the additional content server (not shown in FIG. 1).

Upon registration of the client with the server 102 the server will preload a queue of advertisements or other content items into the storage device or will preload addresses or URLs for those content items into the storage device 132. Thereafter, as the client 106 receives content from the server 144 and as it identifies an insertion point 1720 from the associated data, instead of presenting any content that it receives from server 144 at that insertion point, the client will present one of the preloaded advertisements or other content items from its storage device 132.

These advertisements can be of appropriate length in the case of audio advertisements such that an insertion point 1720 that indicates an opportunity for (for example) a twenty or thirty second sound advertisement can cause such an advertisement to be retrieved from the storage device 132. Alternatively, these insertion points 1720 can indicate addresses or URLs which cause the client 106 to turn to another server (not shown) to find a content item to be inserted at that point, and that other server will decide what that content should be.

Another example of an insertion item could be a complete song from a local artist, and the insertion point 1720 indicates that this should be the item inserted, whereupon the client refers to the local server and the server delivers whatever is the selected local song for the selected local artist.

Instead of using insertion points 1720 identifiable in the data stream from the primary content server 144, the server 102 can provide the client 106 with a schedule of insertion times and the client 106 can maintain a real time clock and at the designated insertion times it will turn to its next insertion item for insertion into the content being received from server 144. It is preferred, in the case of streaming audio, that data is interleaved into the audio indicating such information as to the artist or song currently being played. This interleaved data can be used by the client 106 as the trigger for causing a replacement of the data being received from server 144. For example an entire song could be replaced. Alternatively, that data could have a separate logical connection rather than being interleaved into the audio.

Of particular interest are cases in which the first audio content 1700 and the first signal are communicated via an electronic network including at least one of the Internet, an intranet, and an extranet. The first signal synchronizes playback of the second content with respect to playback of the first audio content 1700.

The second content 1710 can include a first at least one image selected in dependence upon the first user profile 150. In this case, the first signal is to synchronize display of the first at least one image to playback of the first audio content 1700. The first at least one image can be selected further in dependence upon content within the first audio content 1700. Of particular interest are cases in which the first image is a content-specific image and/or a broadcaster-specific image.

Personalized visual content can be provided to a second user 104 by communicating the first audio content 1700 associated with the broadcast (from server 144) to a second user location 104, selecting a second at least one image based upon second user profile stored in customer profile 150, and communicating a second signal to the second user location (e.g. from server 102 or from another server not shown). The second signal synchronizes display of the second at least one image to playback of the first audio content 1700. The second at least one image can differ from the first at least one image.

The second content 1710 can include second audio content selected in dependence upon the first user profile. In this case, the first signal is to synchronize playback of the second audio content with respect to playback of the first audio content 1700. The second audio content can be synchronized for insertion within the first audio content 1700. Of particular interest are cases in which the second content 1710 includes at least one of advertising content and programming content.

Personalized audible content can be provided to the second user by communicating the first audio content 1700 associated with the broadcast to the second user location, selecting third audio content based upon the second user profile, and communicating a second signal to the second user profile, and communicating a second signal to the second user location to synchronize playback of the third audio content with respect to playback of the first audio content 1700. To personalize the content, the third audio content can differ from the second audio content. The third audio content can be synchronized for insertion within the first audio content 1700.

Each user profile is updated by monitoring information associated with user-specific, apparatus-independent use of a plurality of audio content player apparatus via the electronic network. For example, the user profile for a user can be based upon his/her use at both the client apparatus 106 and the client apparatus 104. Each user profile can include transaction information, demographic information, psychographic information, geographic information, sonagraphic information, and listening behavior information for its associated user.

Thus, there has been described herein several embodiments including preferred embodiments of audio content player methods, systems, and articles of manufacture.

Embodiments of the present invention can provide an Internet-based digital audio service that combines an easy-to-use, customizable audio player interface with a wide variety of audio content. Users are able to access audio-on-demand through an archive of music and spoken word titles, and are able to tune to live radio broadcasts from around the world. Further, content information is integrated with content distribution. In this way, an end user can obtain information about content to which he/she is listening. Additionally, the end user is provided a means for purchasing the content, such as music content, to which he/she is listening.

User preferences and behavior are tracked to generate information of interest for each user. This information can relate to his/her music taste, geographical location, and/or other personalized criteria. The information can also be used by radio stations and record labels to determine which music is worth playing.

Embodiments of the player advantageously support browsing of audio content on the Internet using two metaphors: (i) a radio station metaphor and (ii) a record store listening booth metaphor.

Additional features include: concurrent display of visual information based on material broadcast by a radio station; paging of the end user for scheduled events; an interactive schedule for radio programming; listing available stations for a day; and a map to show a location of origin of a radio station.

It is noted that as an alternative or in addition to providing audio content, the herein-described methods and systems can be used to provide video content.

It will be apparent to those skilled in the art that the disclosed embodiments may be modified in numerous ways and may assume many forms other than the preferred form specifically set out and described above.

Accordingly, it is intended that the appended claims cover all such modifications which fall within the true spirit and scope of the invention.

What is claimed is:

1. A method of operation for a server that interacts with a plurality of client apparatuses to provide personalized content to each client apparatus, the method comprising the steps of:

communicating a first media content and control data associated with the first media content from the server to a particular client apparatus of the plurality of client apparatuses, wherein the control data indicates at least one insertion point of the first media content;

retrieving a user profile associated with the particular client apparatus;

selecting a second media content based on the user profile; and communicating the second media content and a control signal associated with the second media content from the server to the particular client apparatus, wherein the control signal instructs the particular client apparatus to insert the second media content at the at least one insertion point of the first media content.

2. The method of claim 1, wherein the broadcast is communicated via wireless communication to at least one wireless receiver and via wireline communication to the particular client apparatus.

3. The method of claim 2, wherein the at least one wireless receiver and the particular client apparatus receive the first media content, but only the particular client apparatus may receive the second media content.

4. The method of claim 1, further comprising the step of retrieving the user profile from a second server separate from the server.

5. The method of claim 1, further comprising the step of retrieving the second media content from a second server separate from the server.

6. The method of claim 1, further comprising the step of storing at least one of the second media content and an address of the second media content in a queue of the particular client apparatus.

7. The method of claim 6, further comprising the steps of:

detecting the at least one insertion point based on the control signal; and in response to detecting the at least one insertion point, presenting the second media content at the at the particular client apparatus instead of any content of the first media content at the at least one insertion point.

8. The method of claim 1, wherein the first media content includes at least one of an audio content, an image content, and a video content.

9. The method of claim 1, wherein the first media content, the control data, and the control signal are communicated to the particular client apparatus via an electronic network including at least one of an Internet, an intranet, and an extranet.

10. The method of claim 1, wherein the control signal synchronizes playback of the second media content with playback of the first media content.

11. The method of claim 1, wherein the second media content includes at least one image selected based on the user profile.

12. The method of claim 1, wherein the second media content includes at least one image selected based on the first media content.

13. The method of claim 12, wherein the at least one image is one of either a content-specific image and a broadcaster-specific image.

14. The method of claim 1, wherein the second media content includes at least one of an advertising content and a programming content.

15. The method of claim 1, further comprising the step of generating the user profile before the step of accessing the broadcast intended for communication to the plurality of client apparatuses.

16. The method of claim 1, wherein the user profile is updated by monitoring operational activity of the particular client apparatus.

17. The method of claim 1, wherein the user profile is updated by monitoring operational activity of a particular group of client apparatuses.

18. The method of claim 1, wherein the user profile includes at least two of: transaction information, demographic information, psychographic information, geographic information, sonagraphic information, and listening behavior information.

19. The method of claim 1, wherein:

the step of communicating the first media content and the control data to a particular client apparatus includes the step of communication the first media content and the control data to a second client apparatus;

the step of retrieving a user profile associated with the particular client apparatus includes the step of retrieving a second user profile associated with the second client apparatus;

the step of selecting a second media content based on the user profile includes the step of selecting a third media content based on the second user profile, wherein the third media content is different from the second media content; and the step of communicating the second media content and a control signal associated with the second media content to the particular client apparatus includes the step of communicating the third media content and a second control signal associated with the third media content to the second client apparatus, wherein the second control signal instructs the second client apparatus to insert the third media content at the at least one insertion point of the first media content.

20. A method of operation for a server that interacts with a plurality of client apparatuses to provide personalized content to each client apparatus, the method comprising the steps of:

communicating a first media content and control data associated with the first media content from the server to a particular client apparatus of the plurality of client apparatuses, wherein the control data indicates a schedule of insertion times;

retrieving a user profile associated with the particular client apparatus;

selecting a second media content based on the user profile; and communicating the second media content from the server to the particular client apparatus, wherein the particular client apparatus maintains a time clock to determine when to insert the second media content into the first media content based on the control data.

* * * * *